(12) United States Patent
Grube et al.

(10) Patent No.: US 10,120,755 B2
(45) Date of Patent: *Nov. 6, 2018

(54) MANAGING MEMORY UTILIZATION IN A DISTRIBUTED STORAGE AND TASK NETWORK

(71) Applicant: CLEVERSAFE, INC., Chicago, IL (US)

(72) Inventors: Gary W. Grube, Barrington Hills, IL (US); Timothy W. Markison, Mesa, AZ (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,092

(22) Filed: Sep. 2, 2015

(65) Prior Publication Data

US 2015/0378824 A1 Dec. 31, 2015

Related U.S. Application Data

(63) Continuation of application No. 13/865,679, filed on Apr. 18, 2013, now Pat. No. 9,141,468, which is a
(Continued)

(51) Int. Cl.
*H03M 13/00* (2006.01)
*G06F 11/10* (2006.01)
*H04L 29/08* (2006.01)

(52) U.S. Cl.
CPC .......... *G06F 11/1076* (2013.01); *G06F 11/10* (2013.01); *G06F 11/1044* (2013.01);
(Continued)

(58) Field of Classification Search
CPC ... H04L 1/0057; H04L 1/0061; H04L 1/0041; H04L 1/0083; H04L 1/0072
(Continued)

(56) References Cited

U.S. PATENT DOCUMENTS

| | | | |
|---|---|---|---|
| 6,516,436 B1 * | 2/2003 | Dave | H04L 1/0041 714/18 |
| 6,532,562 B1 * | 3/2003 | Chou | H04L 1/0002 714/752 |

(Continued)

FOREIGN PATENT DOCUMENTS

EP 1903750 A1 3/2008

OTHER PUBLICATIONS

International Business Machines; Response to EP communication dated May 26, 2017; Nov. 1, 2017; 5 pgs.
(Continued)

*Primary Examiner* — Albert Decady
*Assistant Examiner* — Enam Ahmed
(74) *Attorney, Agent, or Firm* — Garlick & Markison; Timothy W. Markison; Randy W. Lacasse

(57) ABSTRACT

A method includes encoding data into pluralities of sets of encoded data slices. The method further includes outputting the pluralities of sets of encoded data slices to DST units, wherein each of the DST units stores a slice grouping of encoded data slices. The method further includes dividing the task into a decode threshold number of partial tasks. The method further includes sending a slice deletion policy to the DST units. On a data chunkset by data chunkset basis: the method further includes selecting a decode threshold number of DST units; assigning the decode threshold number of partial tasks to the decode threshold number of DST units; executing the decode threshold number of partial tasks on the slice groupings to produce partial results; and deleting the plurality of sets of encoded data slices of the given data chunkset in accordance with the slice deletion policy.

12 Claims, 52 Drawing Sheets

Related U.S. Application Data continuation-in-part of application No. 13/707,490, filed on Dec. 6, 2012, now Pat. No. 9,304,857.

(60) Provisional application No. 61/569,387, filed on Dec. 12, 2011.

(52) U.S. Cl.
CPC ...... G06F 11/1092 (2013.01); H04L 67/1097 (2013.01); *G06F 2211/1028* (2013.01)

(58) Field of Classification Search
USPC .......................................................... 714/776
See application file for complete search history.

(56) References Cited

U.S. PATENT DOCUMENTS

| | | | |
|---|---|---|---|
| 7,487,423 B2* | 2/2009 | Lobo ..................... | H03M 13/63 375/224 |
| 8,341,504 B2* | 12/2012 | Hassan ............. | H03M 13/3738 714/776 |
| 8,769,383 B2* | 7/2014 | Lamy-Bergot ........ | H04L 1/0057 348/456 |
| 2003/0163507 A1 | 8/2003 | Chang et al. | |
| 2007/0165709 A1* | 7/2007 | Walker .................. | H04L 1/0041 375/219 |
| 2009/0327842 A1* | 12/2009 | Liu ....................... | H04L 1/0057 714/776 |
| 2011/0066924 A1* | 3/2011 | Dorso ................. | H04L 65/1069 714/776 |
| 2011/0071988 A1 | 3/2011 | Resch et al. | |
| 2013/0097470 A1* | 4/2013 | Hwang ................. | H04L 1/0041 714/758 |
| 2013/0263201 A1* | 10/2013 | Chung-How ......... | H04L 1/0003 725/116 |

OTHER PUBLICATIONS

Communication pursuant to Article 94(3) EPC; EP Application No. 12856963.9; May 26, 2017; 9 pages.

\* cited by examiner

FIG. 32

| DST allocation info 242 | data partition info 320: ⊠ data ID; No. of partitions; Addr. info for each partition; format conversion indication |
|---|---| task execution info 322

| task 326 | task ordering 328 | data partition 330 | set of DT EX mods 332 | intermediate result info 324 ||||
|---|---|---|---|---|---|---|---|
| | | | | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

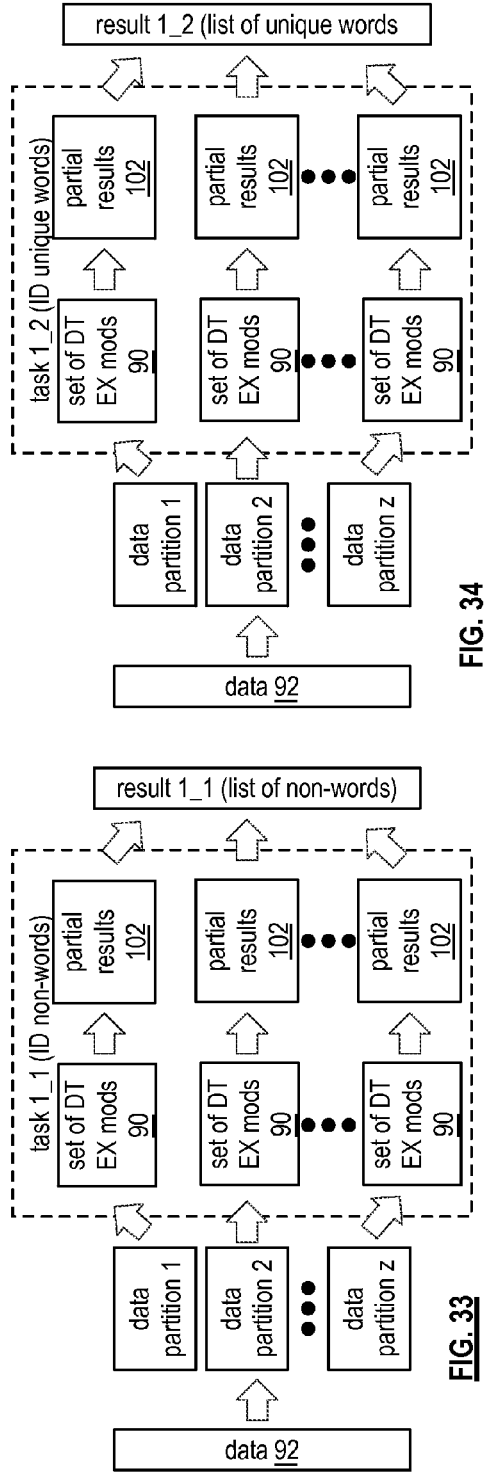
FIG. 33
FIG. 34
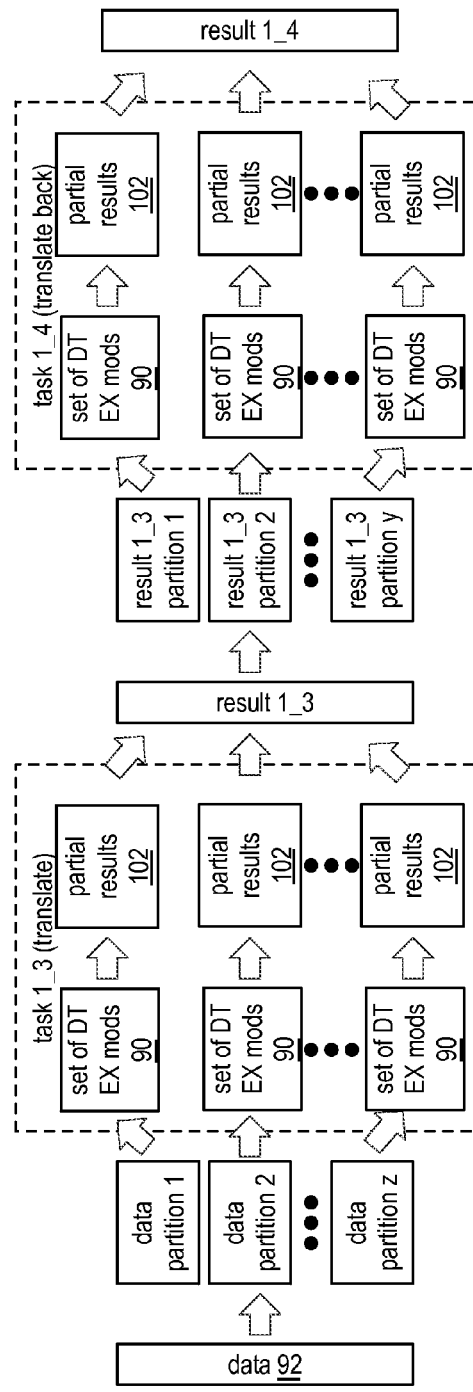
FIG. 35

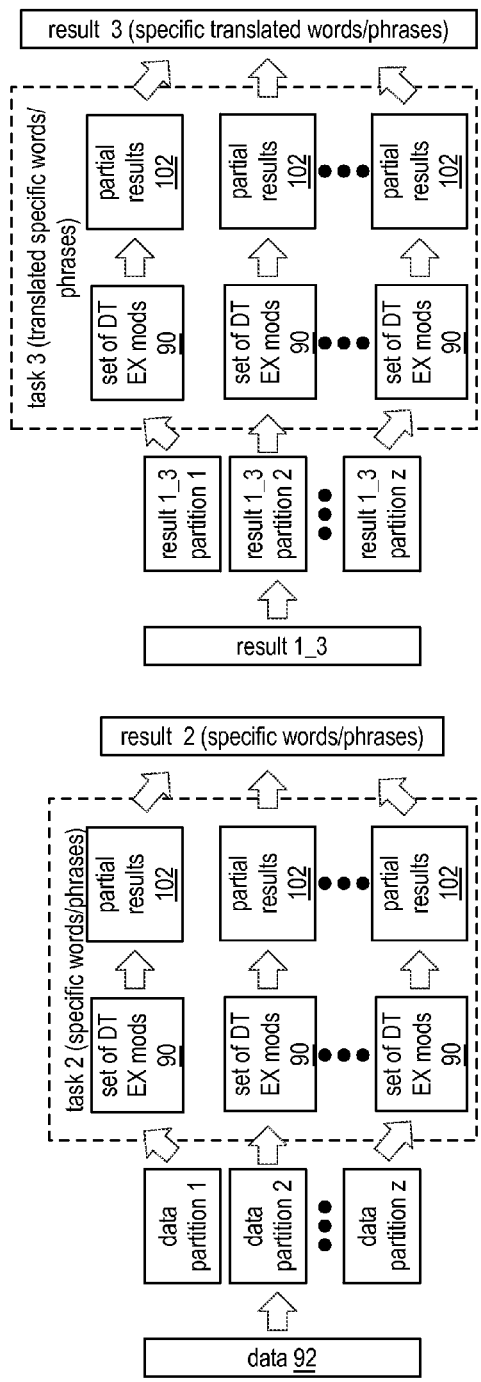
FIG. 38
FIG. 37
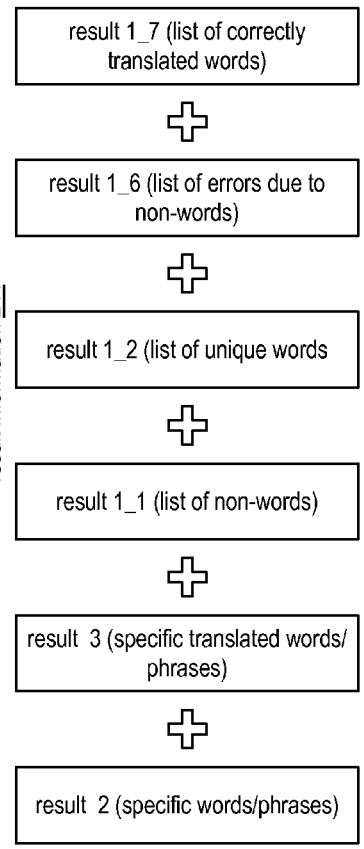
FIG. 39

MANAGING MEMORY UTILIZATION IN A DISTRIBUTED STORAGE AND TASK NETWORK

CROSS REFERENCE TO RELATED PATENTS

The present U.S. Utility Patent Application claims priority pursuant to 35 U.S.C. § 120 as a continuation of U.S. Utility application Ser. No. 13/865,679, entitled "MANAGING MEMORY UTILIZATION IN A DISTRIBUTED STORAGE AND TASK NETWORK", filed Apr. 18, 2013, which is a continuation-in-part of U.S. Utility application Ser. No. 13/707,490, entitled "RETRIEVING DATA FROM A DISTRIBUTED STORAGE NETWORK", filed Dec. 6, 2012, both of which are hereby incorporated herein by reference in their entirety and made part of the present U.S. Utility Patent Application for all purposes.

U.S. Utility patent application Ser. No. 13/707,490 claims priority pursuant to 35 U.S.C. § 119(e) to U.S. Provisional Application No. 61/569,387, entitled "DISTRIBUTED STORAGE AND TASK PROCESSING", filed Dec. 12, 2011.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

DETAILED DESCRIPTION OF THE INVENTION

Figure 1:
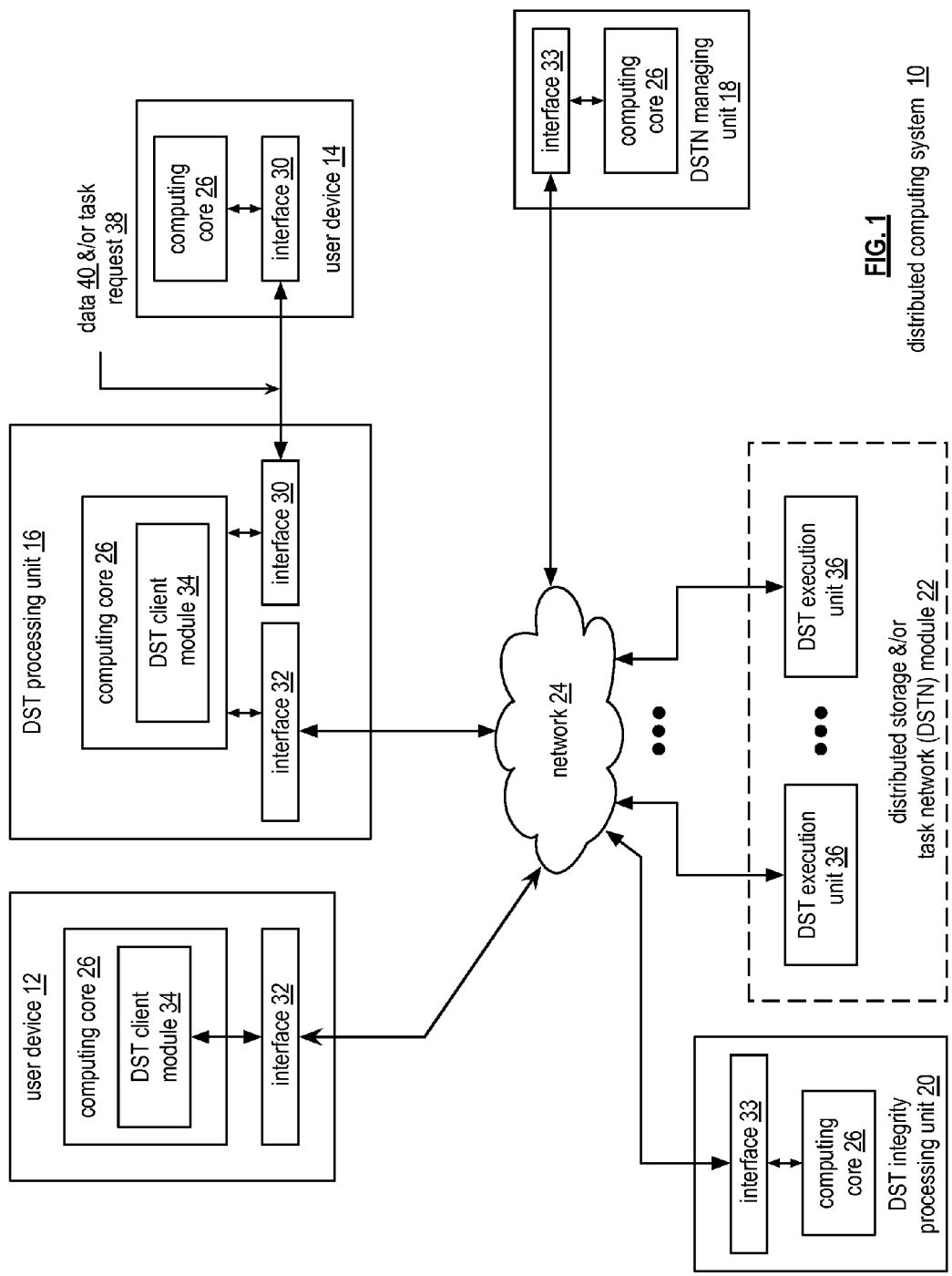
FIG. 1 is a schematic block diagram of an embodiment of a distributed computing system in accordance with the present invention.

FIG. 1 is a schematic block diagram of an embodiment of a distributed computing system 10 that includes user devices 12 and/or user devices 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
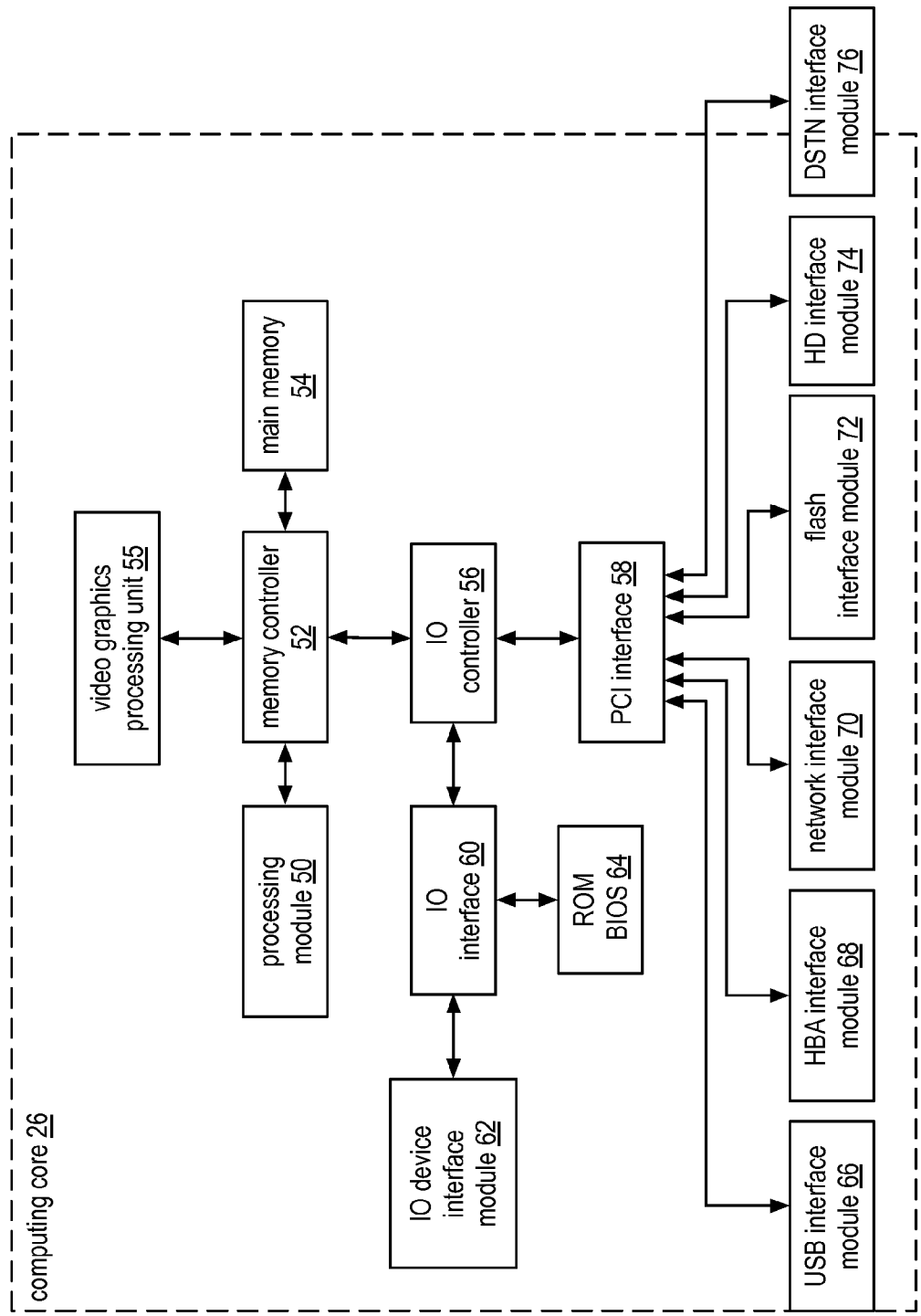
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
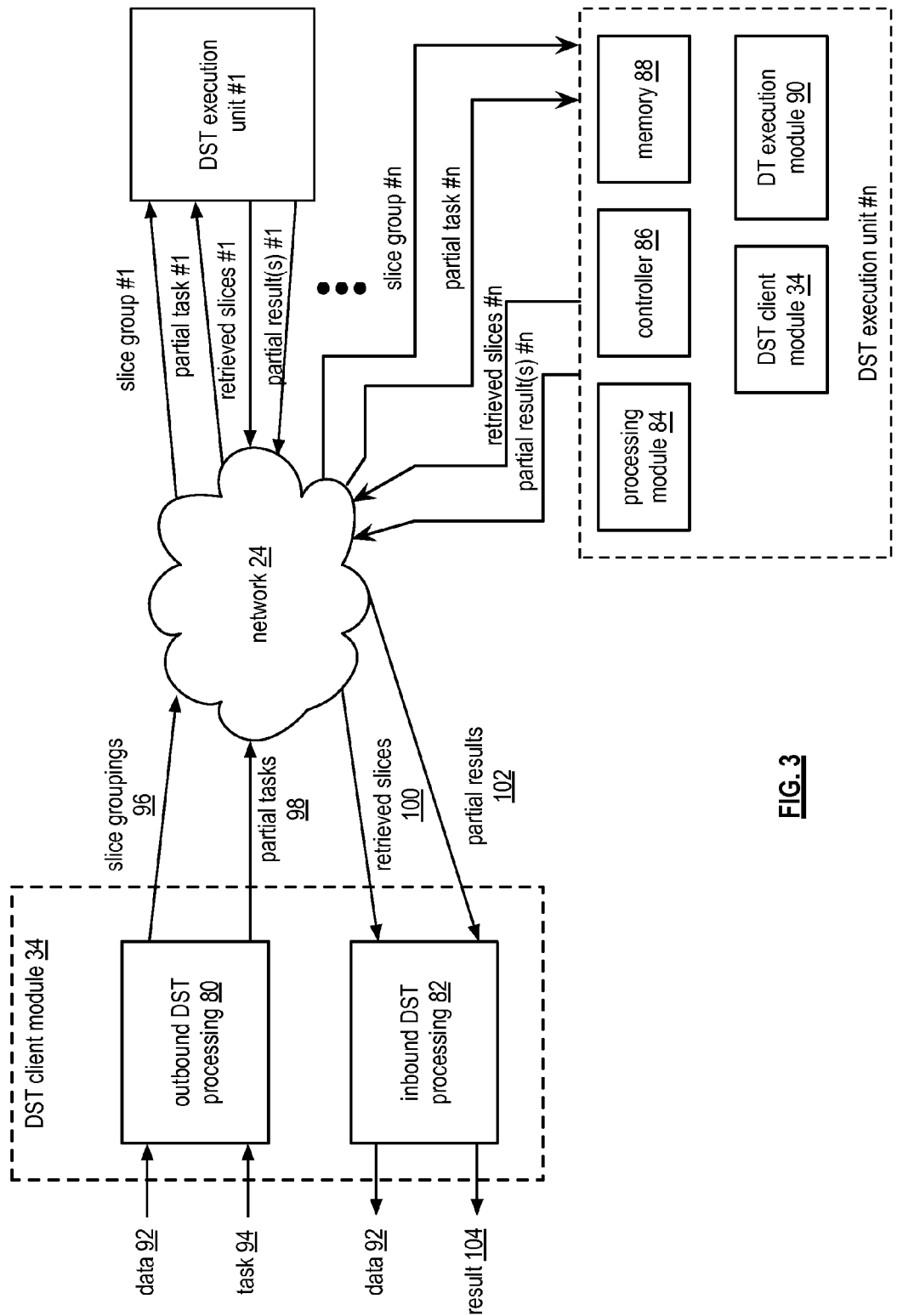
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
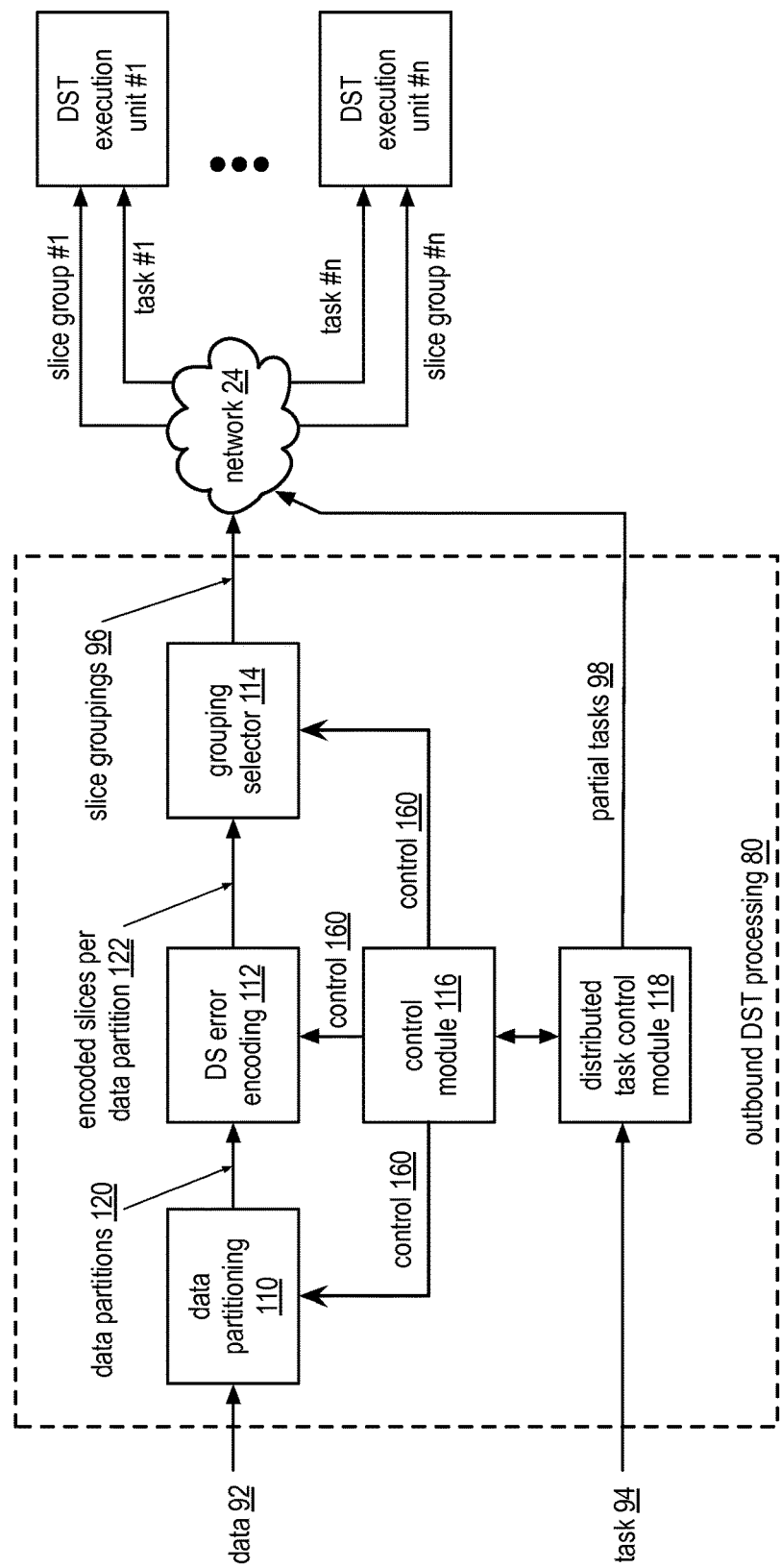
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
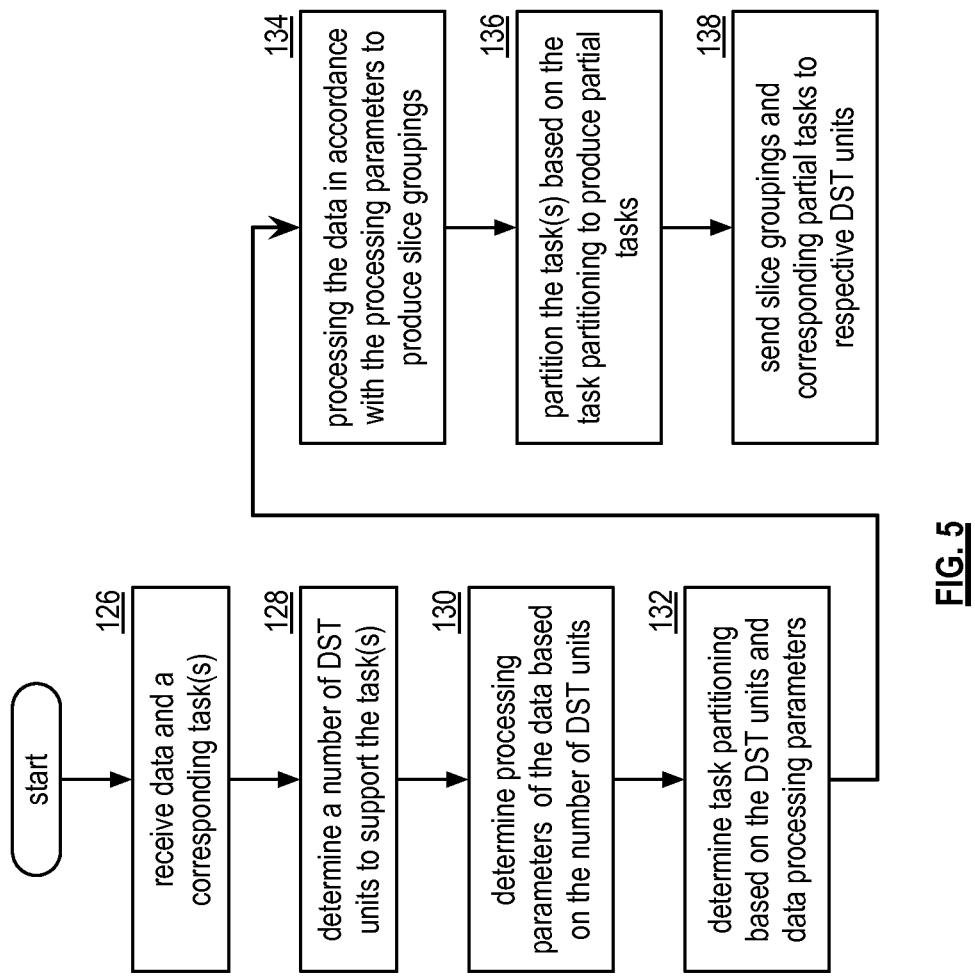
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if, the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to the respective DST units.

Figure 6:
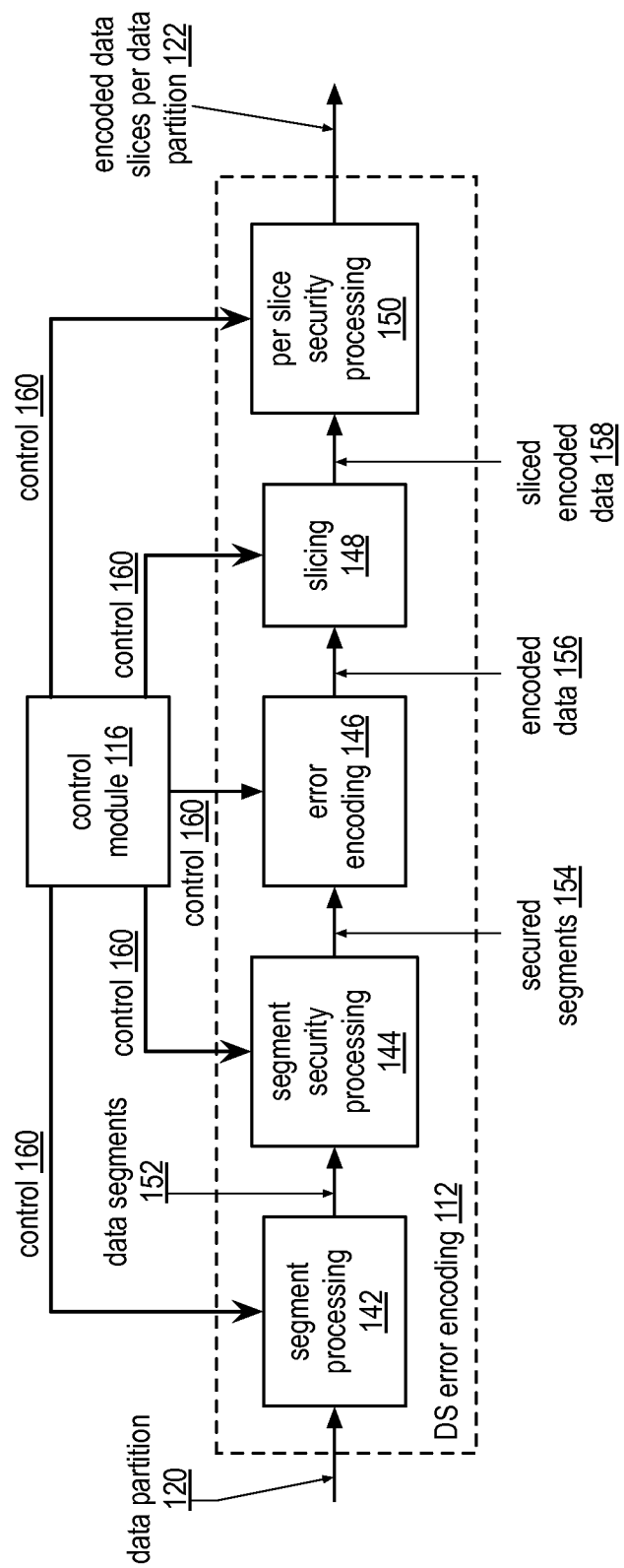
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
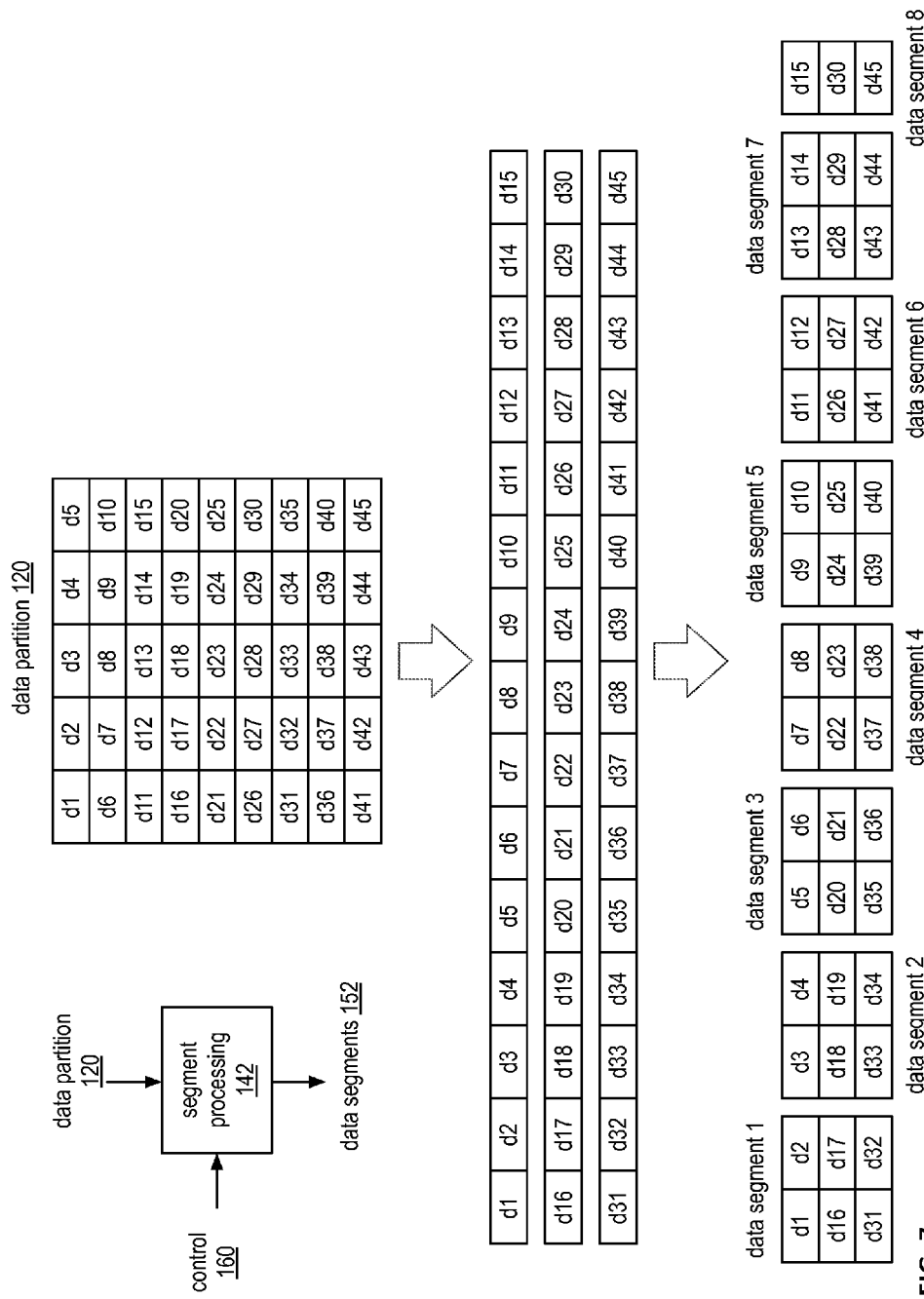
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
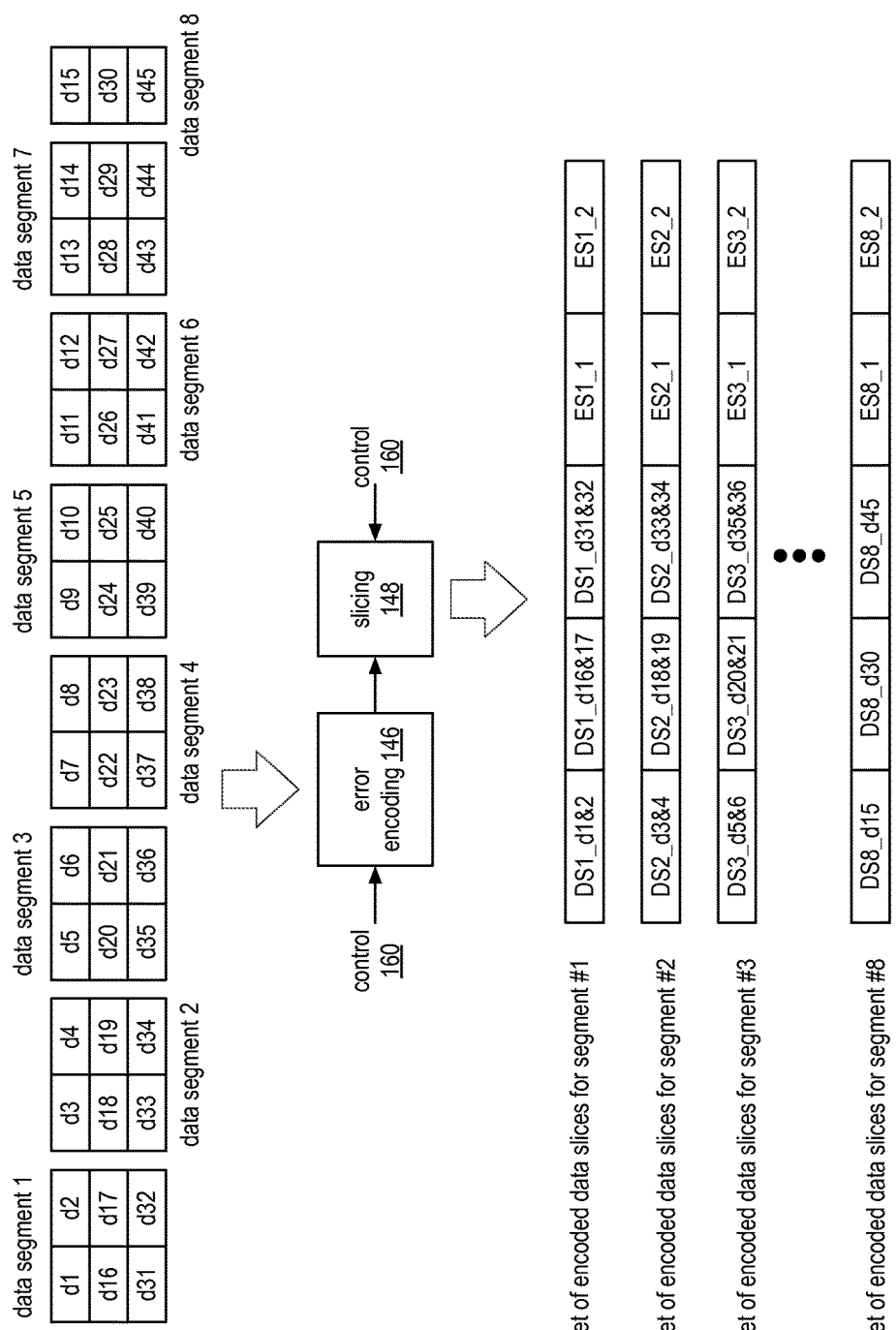
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
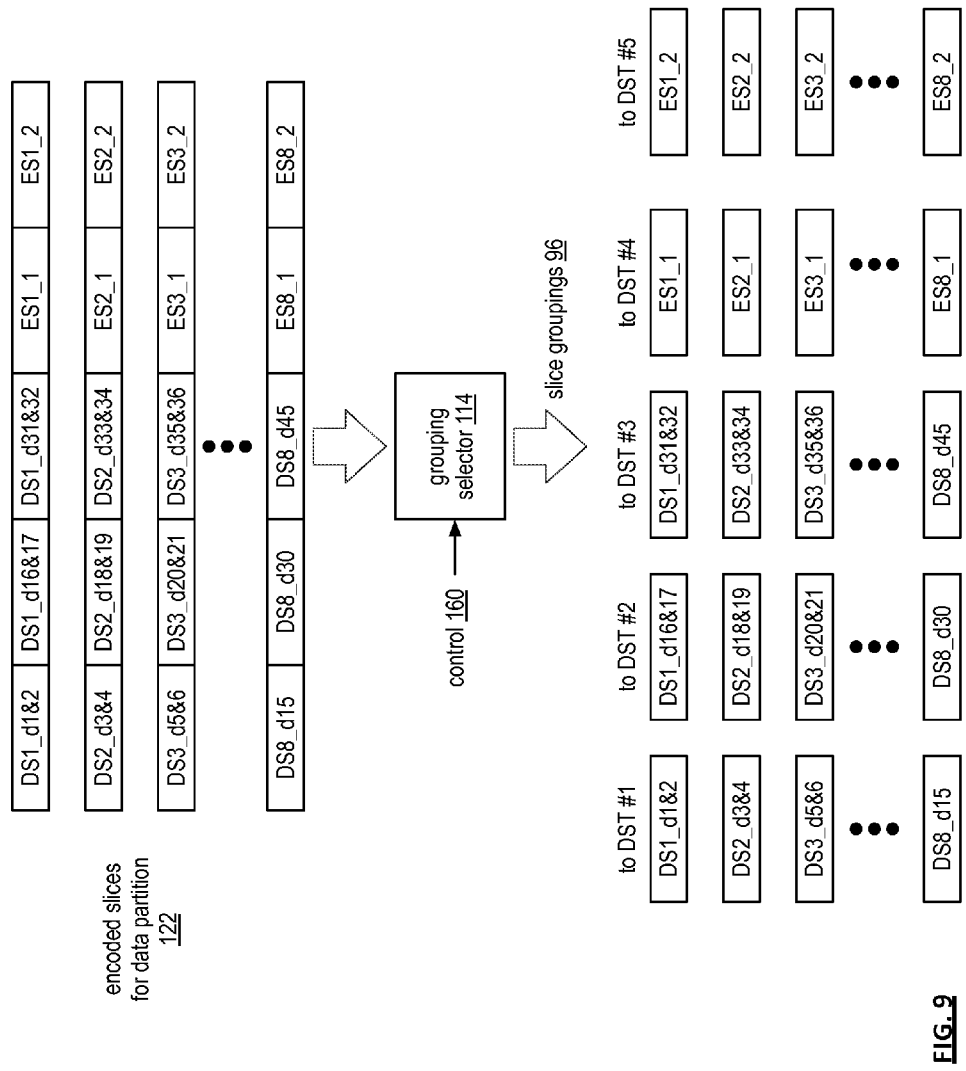
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
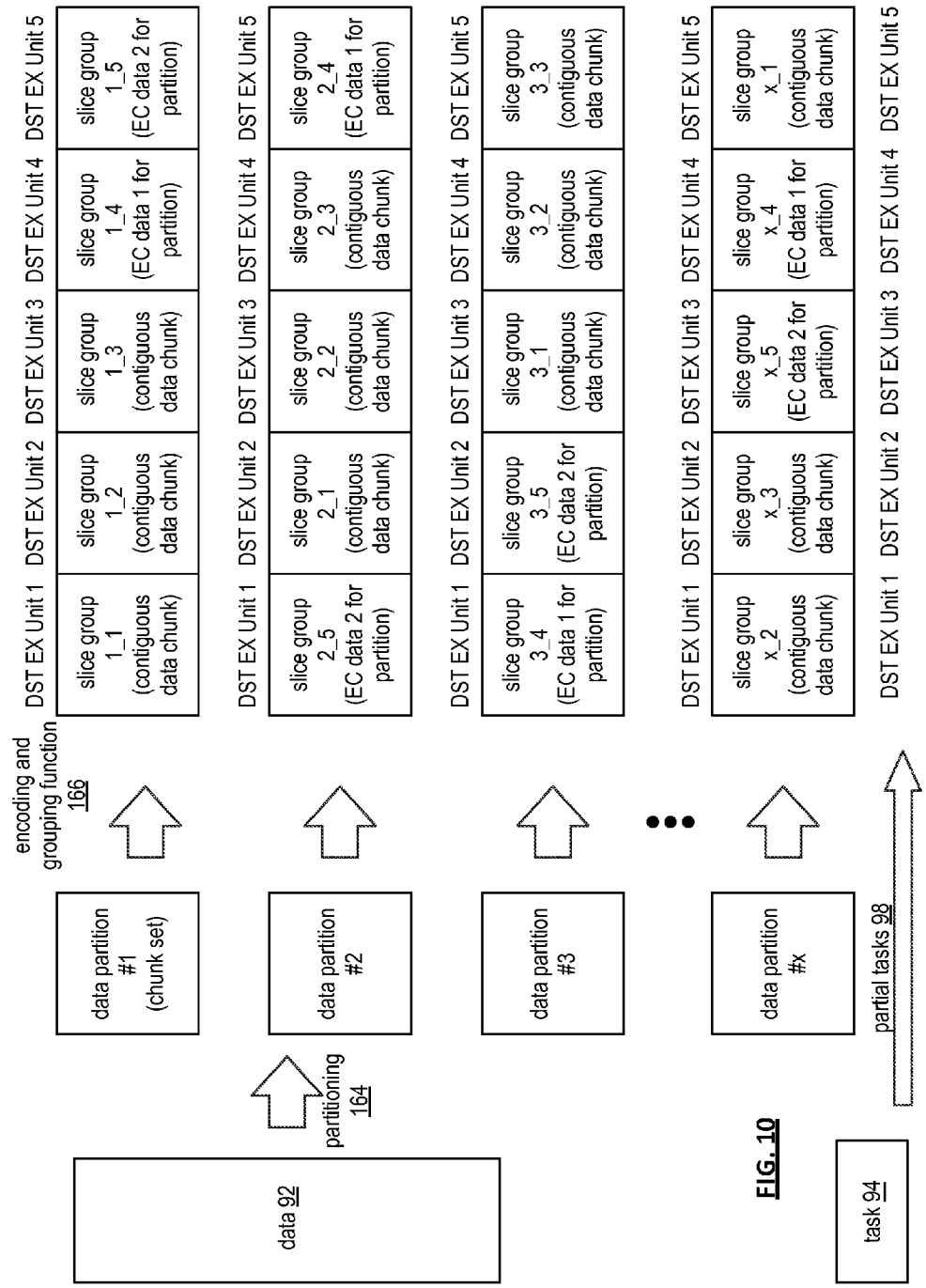
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
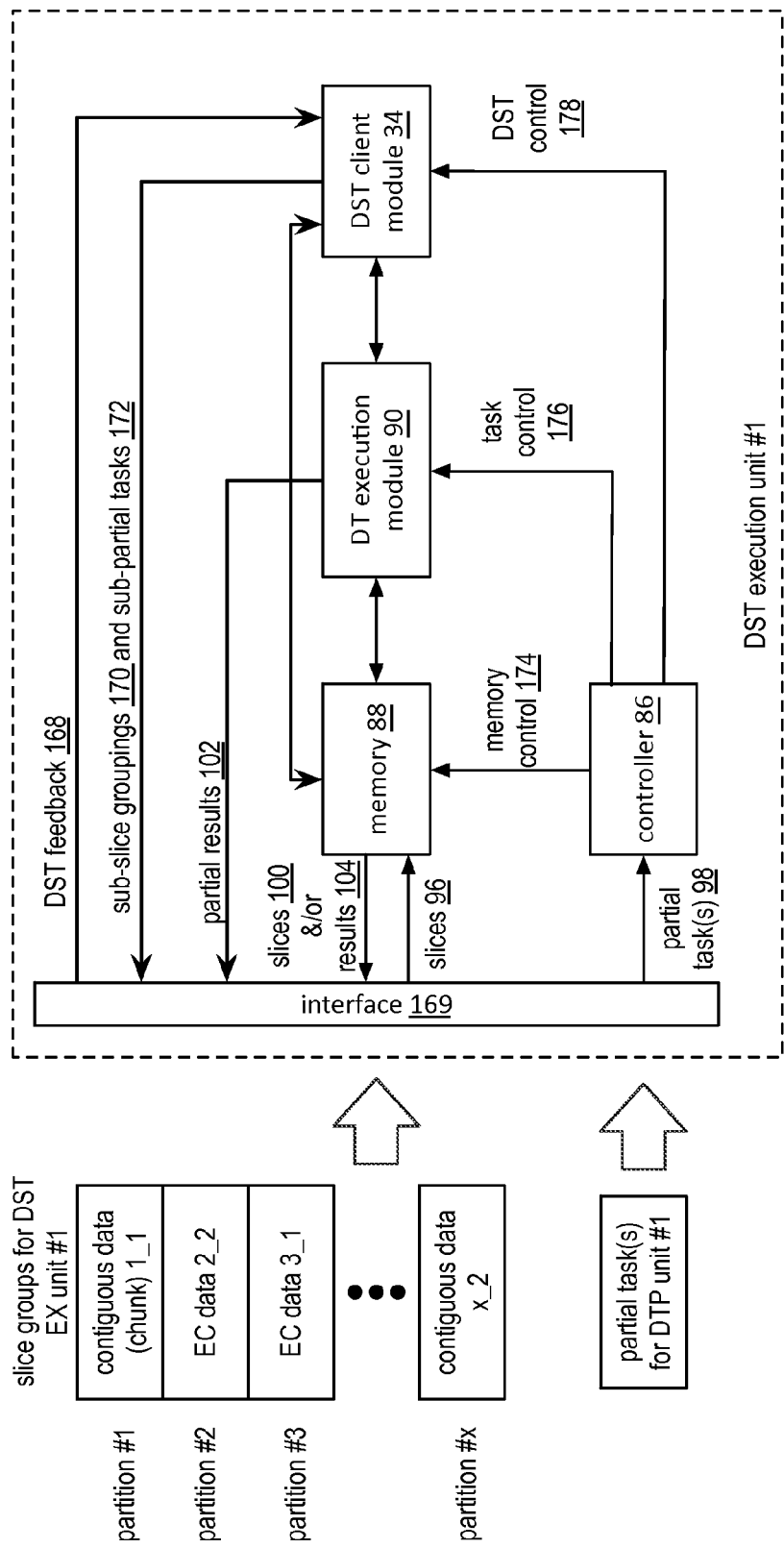
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST execution units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
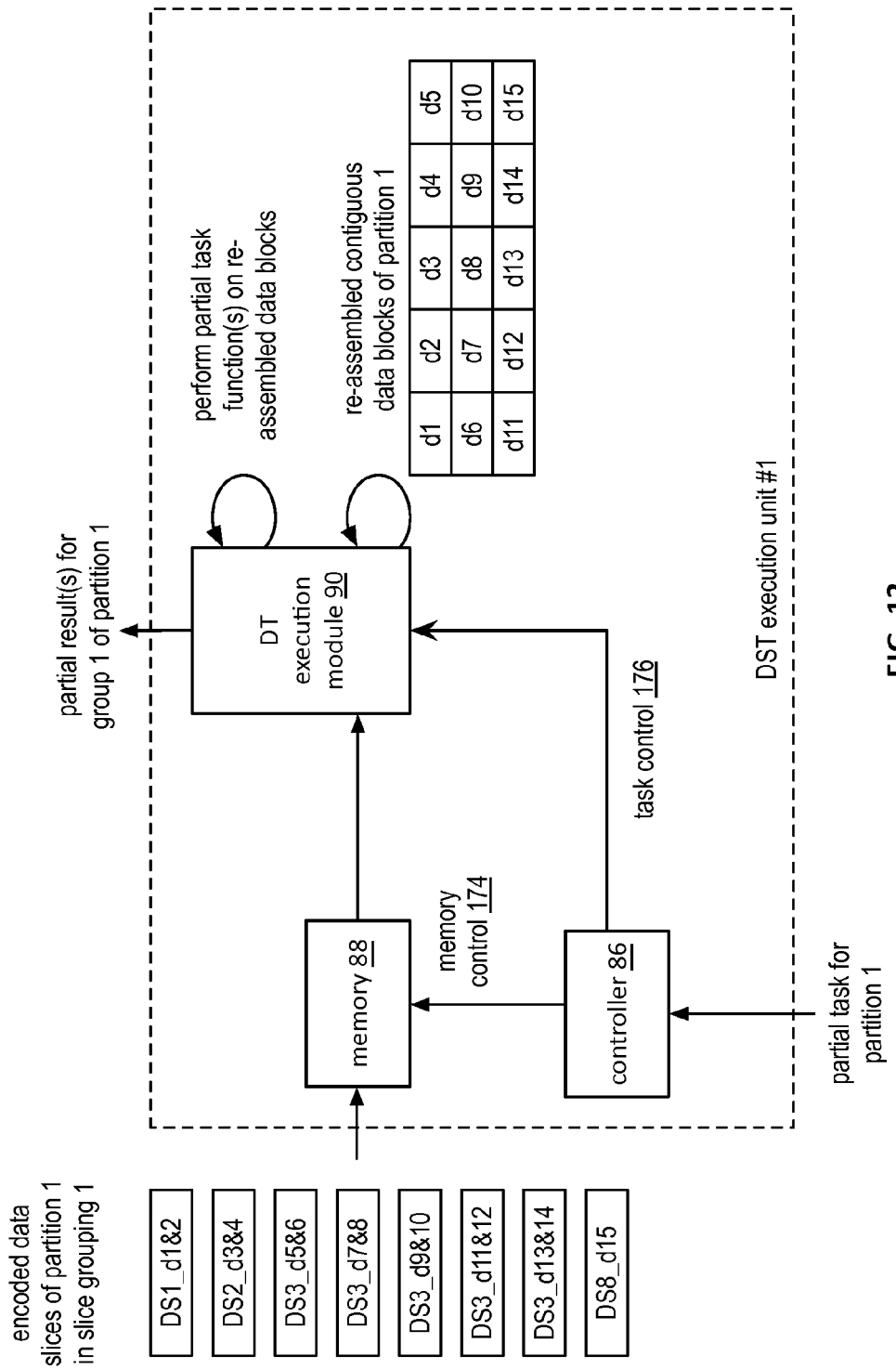
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
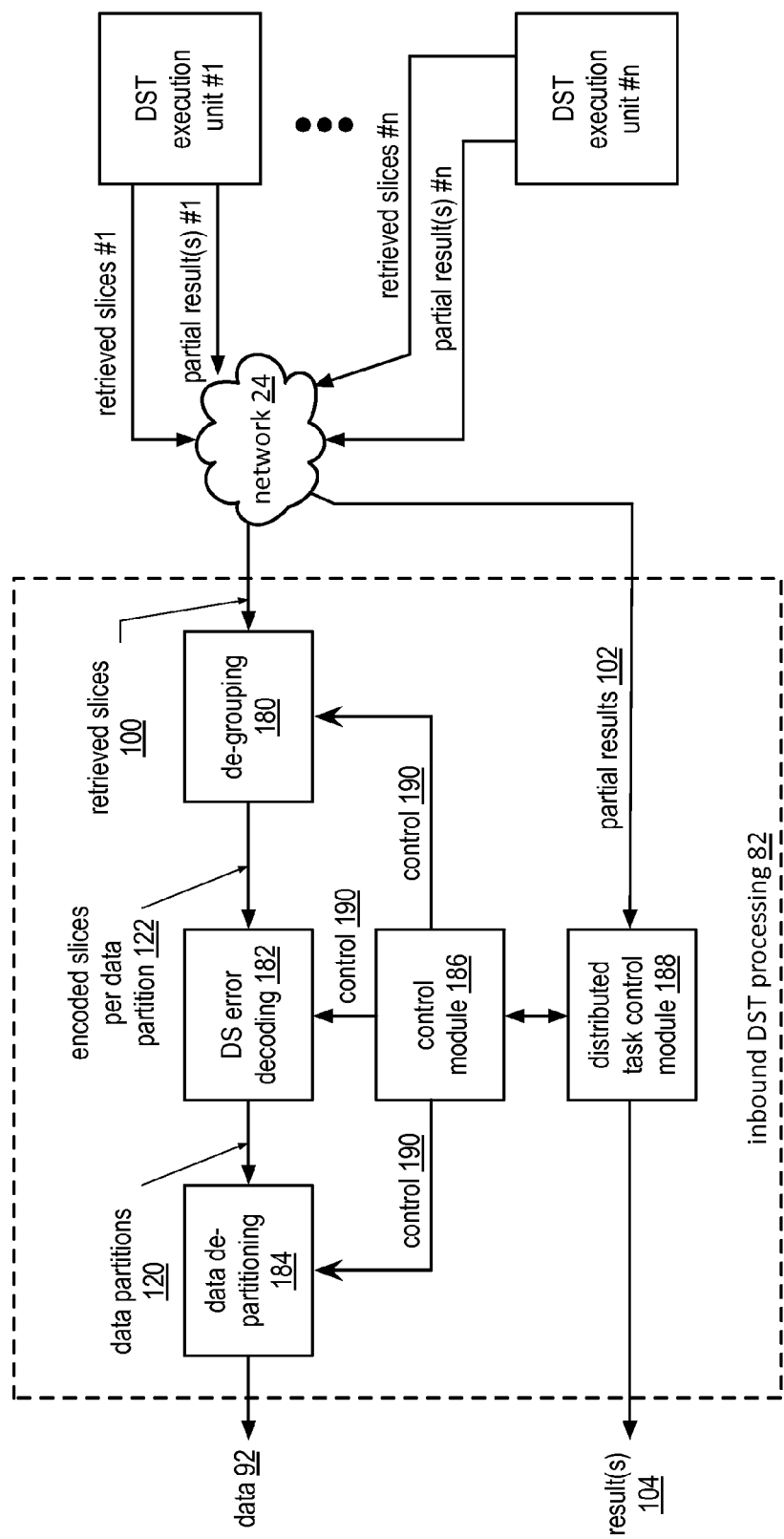
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180; provides the DS error encoding parameters to the DS error decoding module 182; and provides de-partitioning information to the data de-partitioning module 184.

Figure 14:
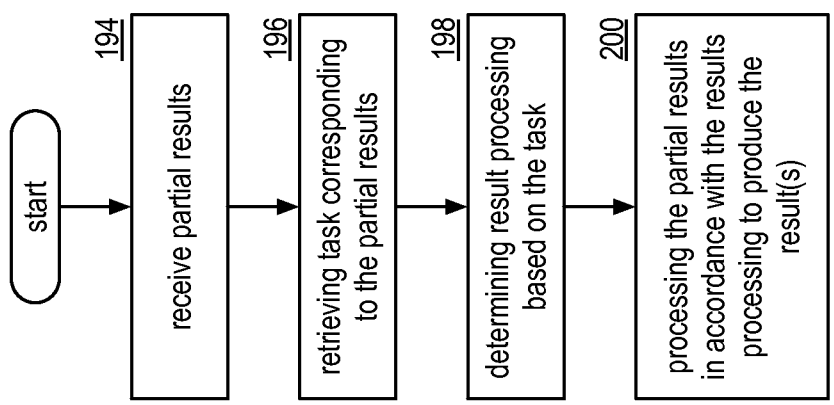
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, the results of processing information would indicate to add the partial results to produce the final results. The method continues at step 200 where the DST client module processes the partial results in accordance with the result processing information to produce the final result, or results.

Figure 15:
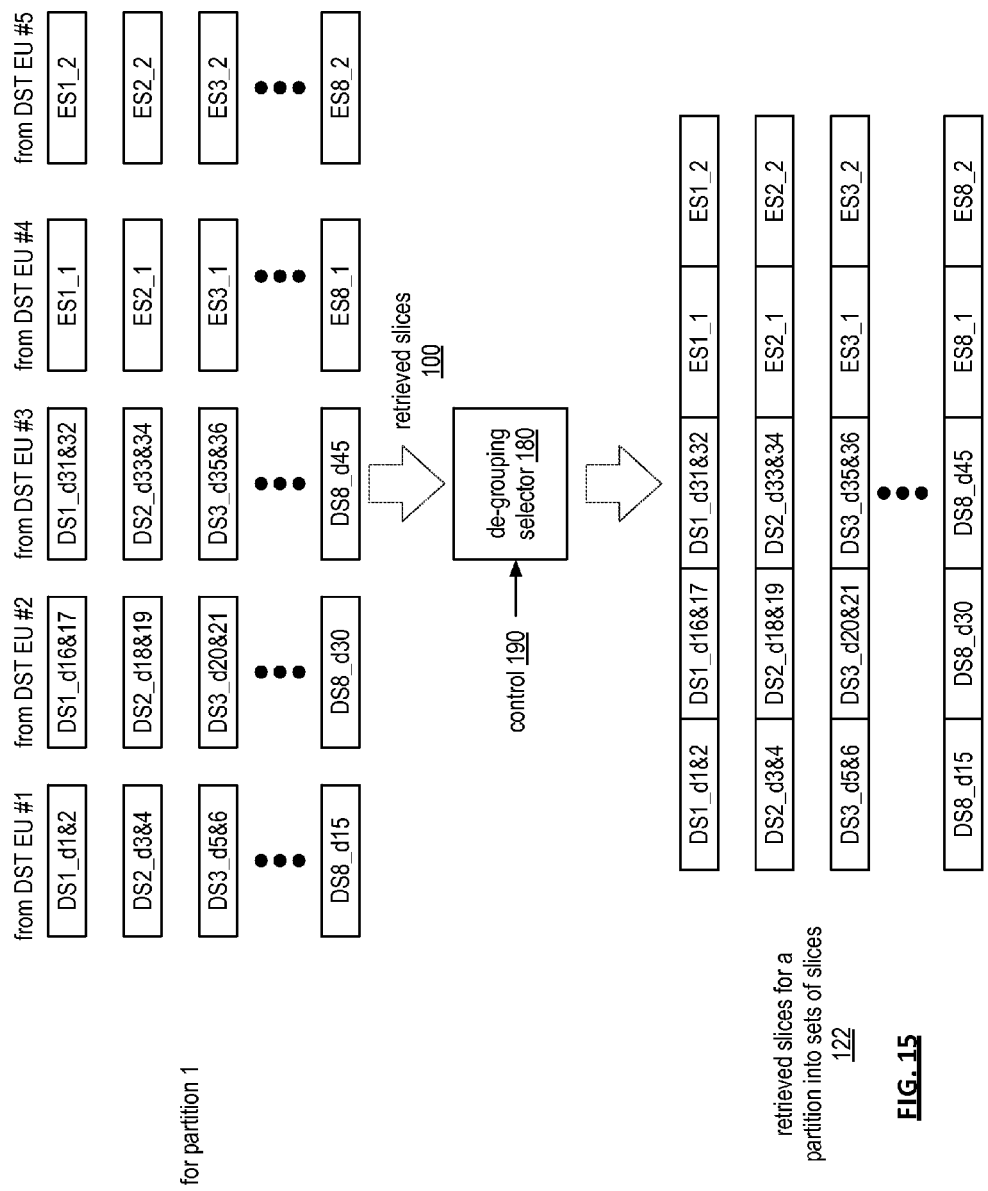
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
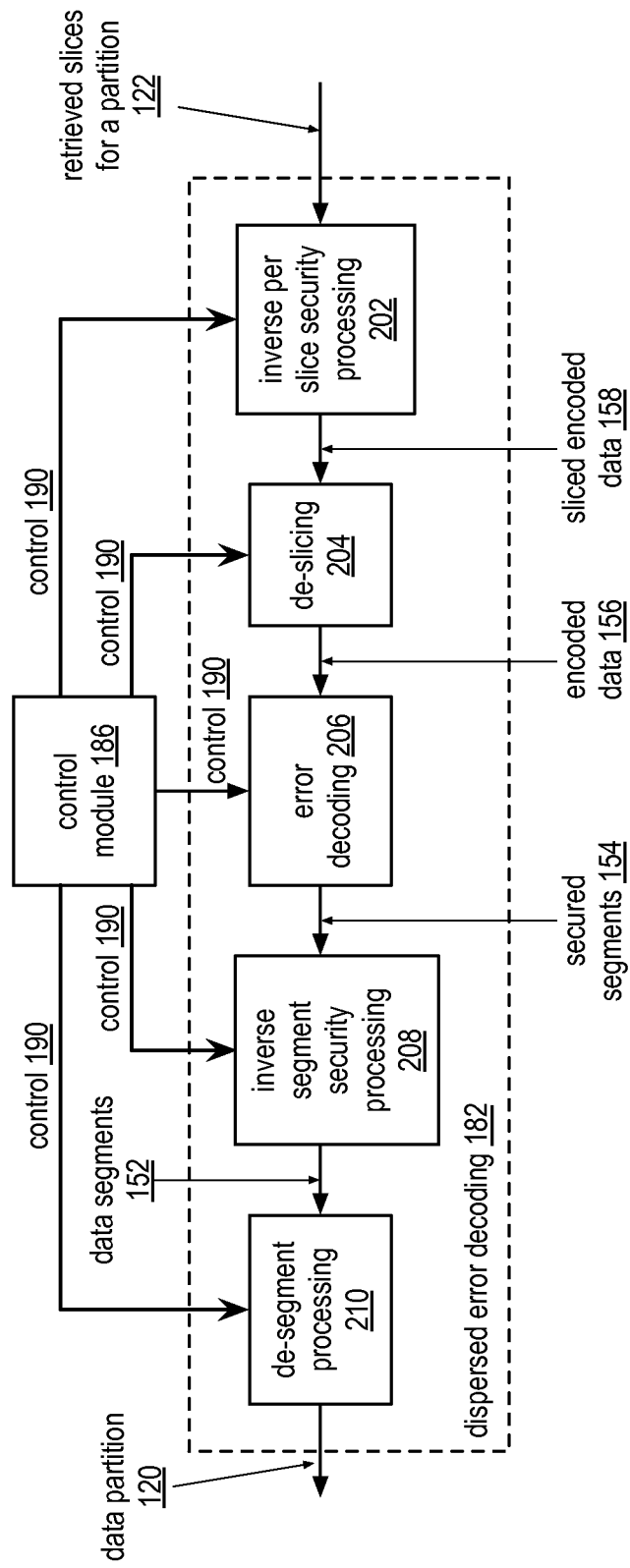
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
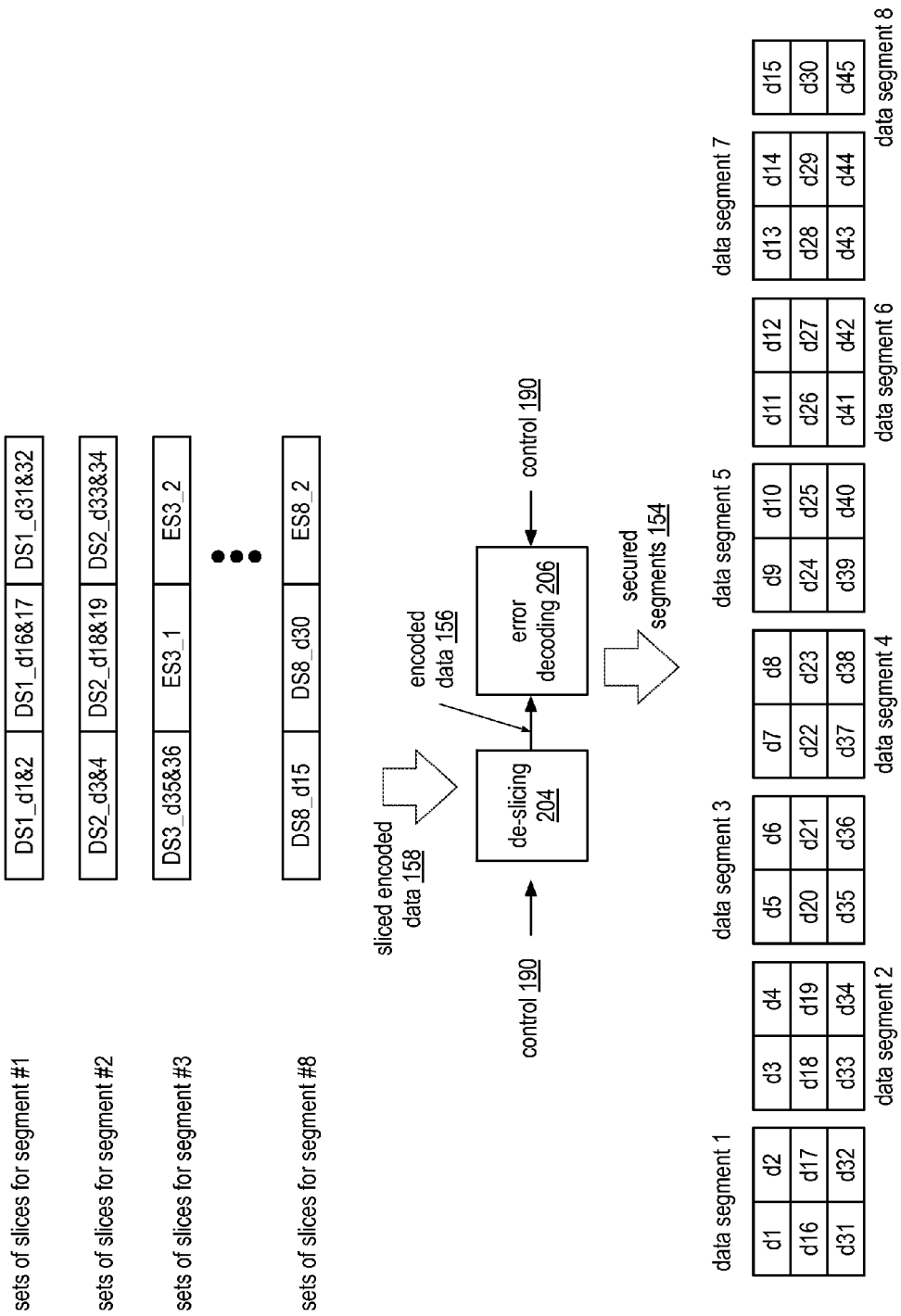
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
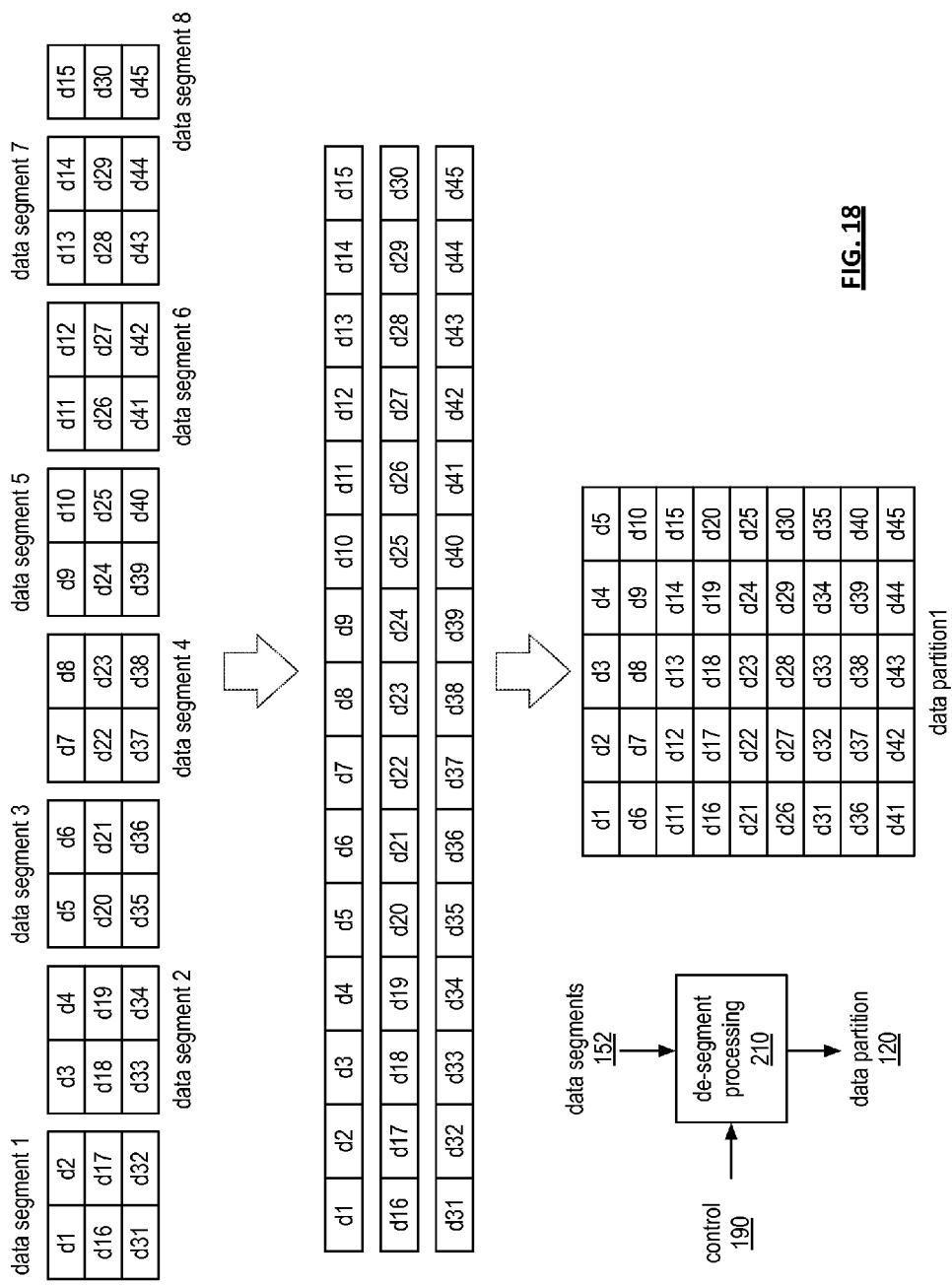
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
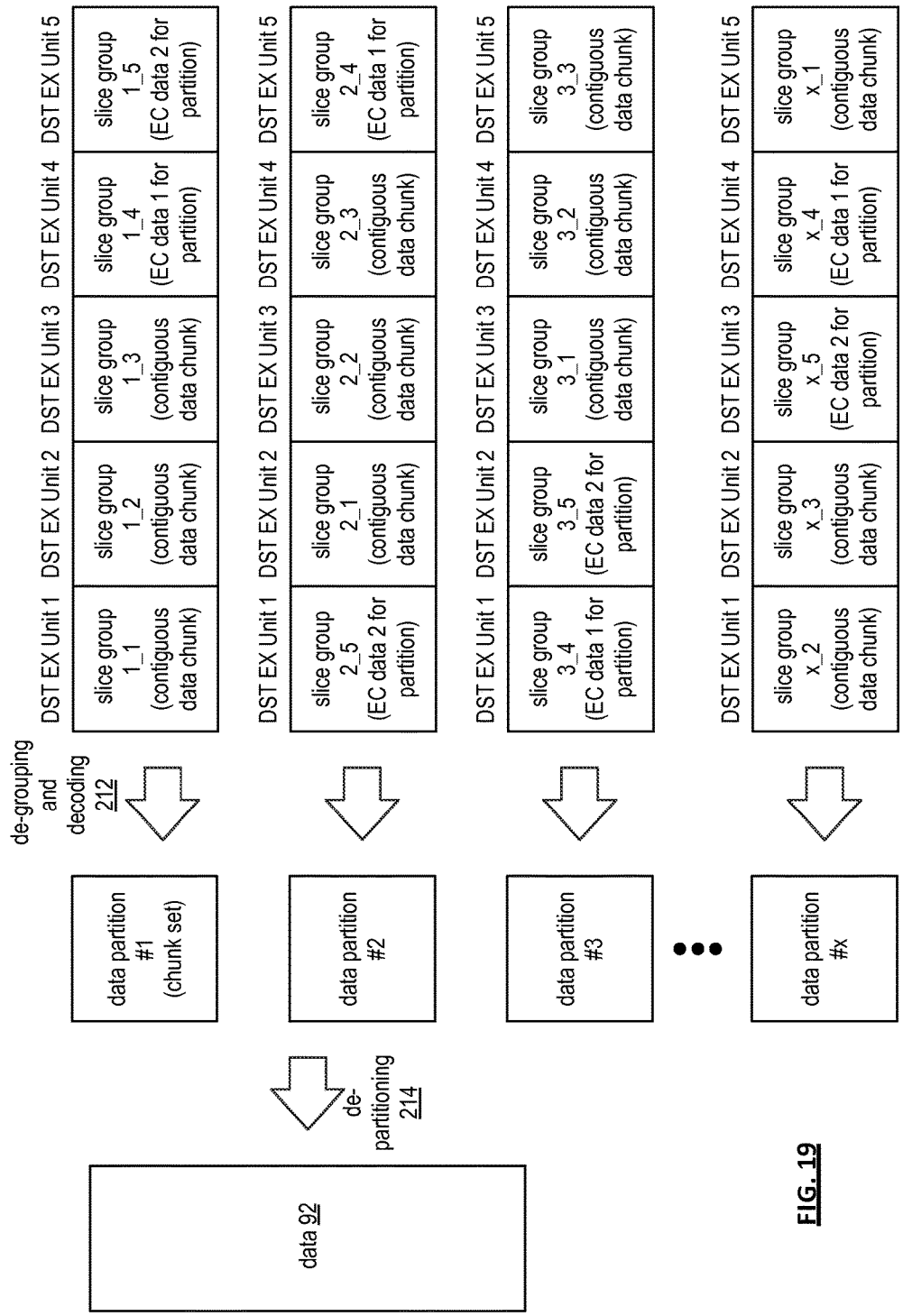
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
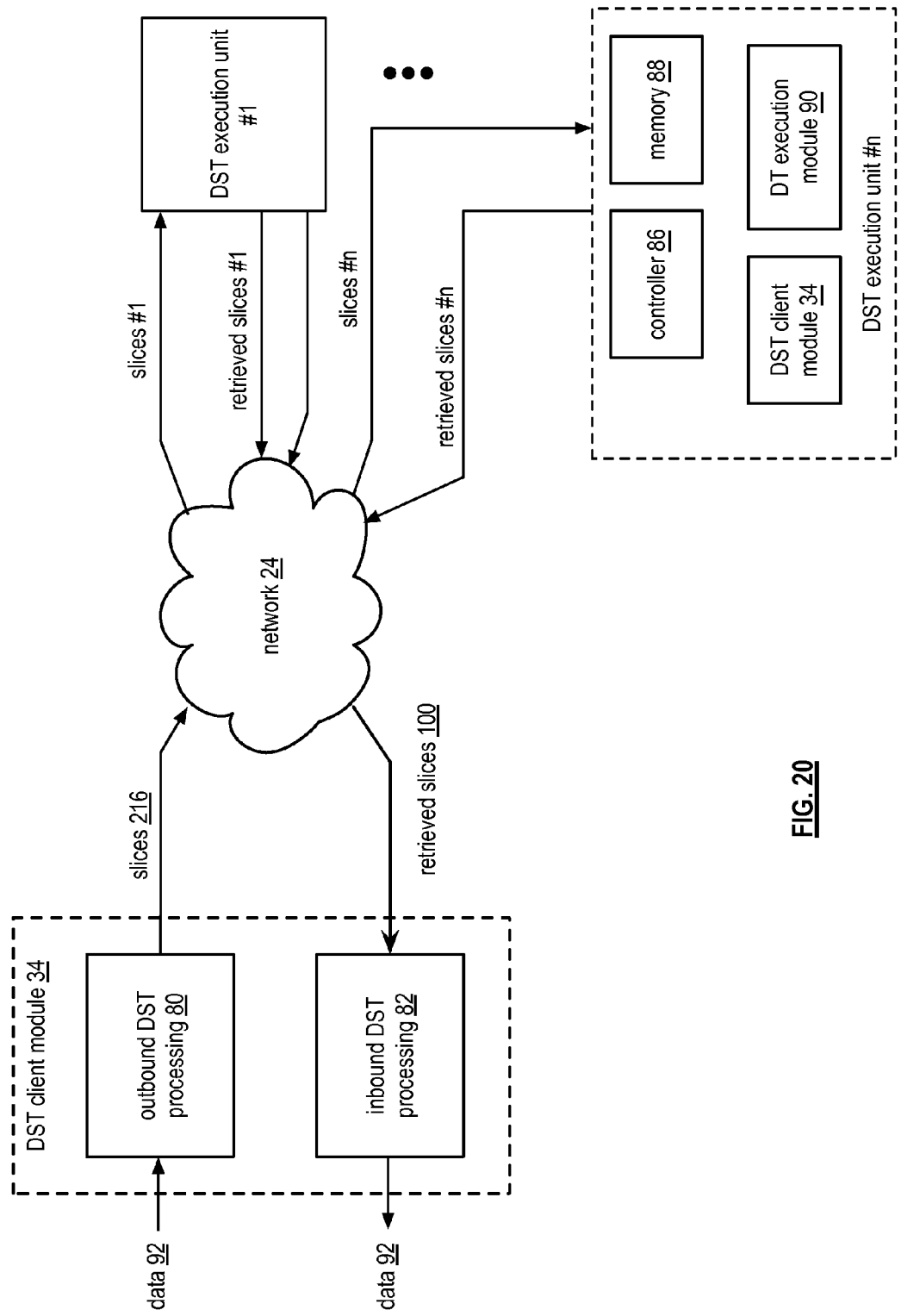
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
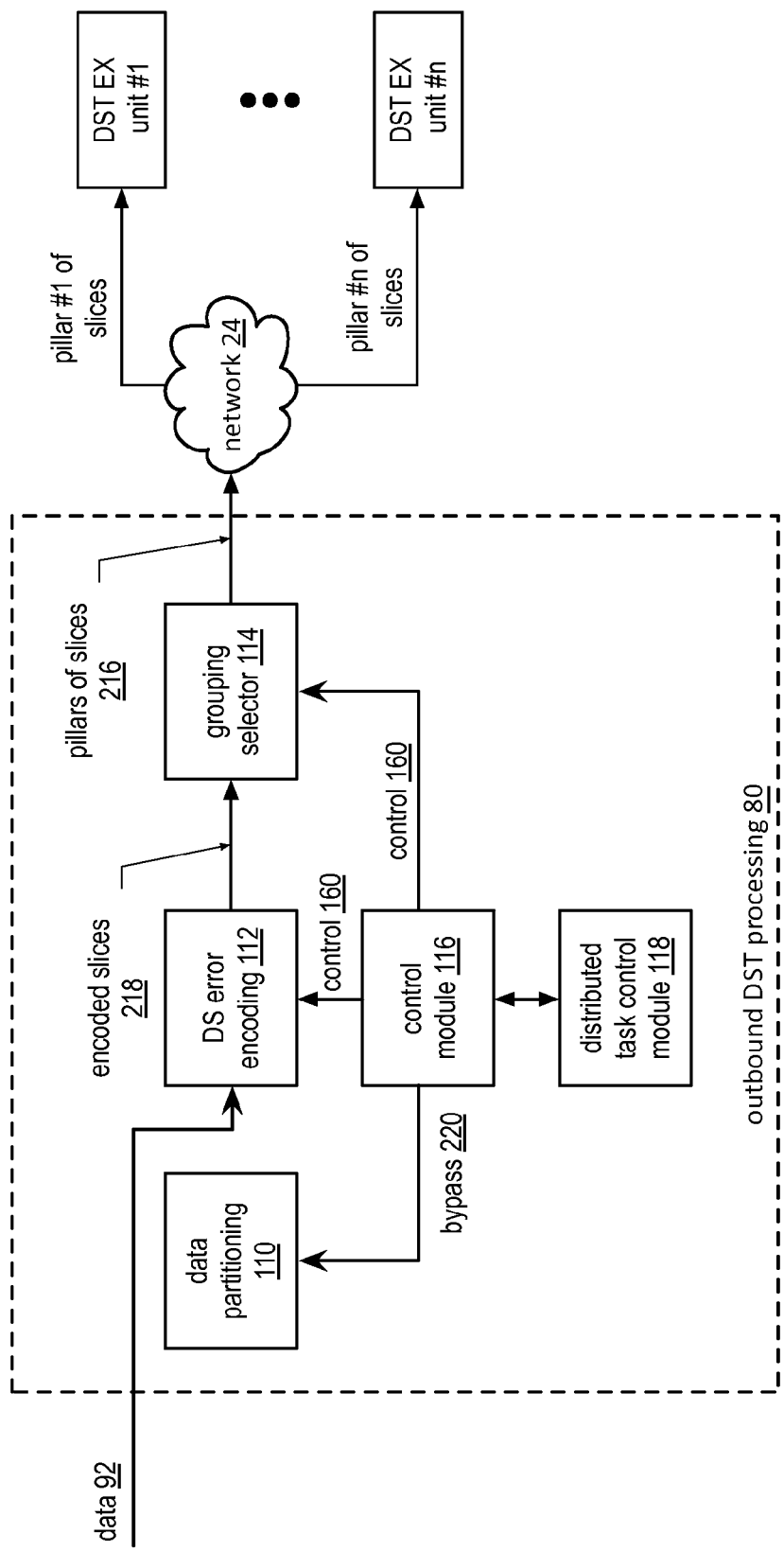
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
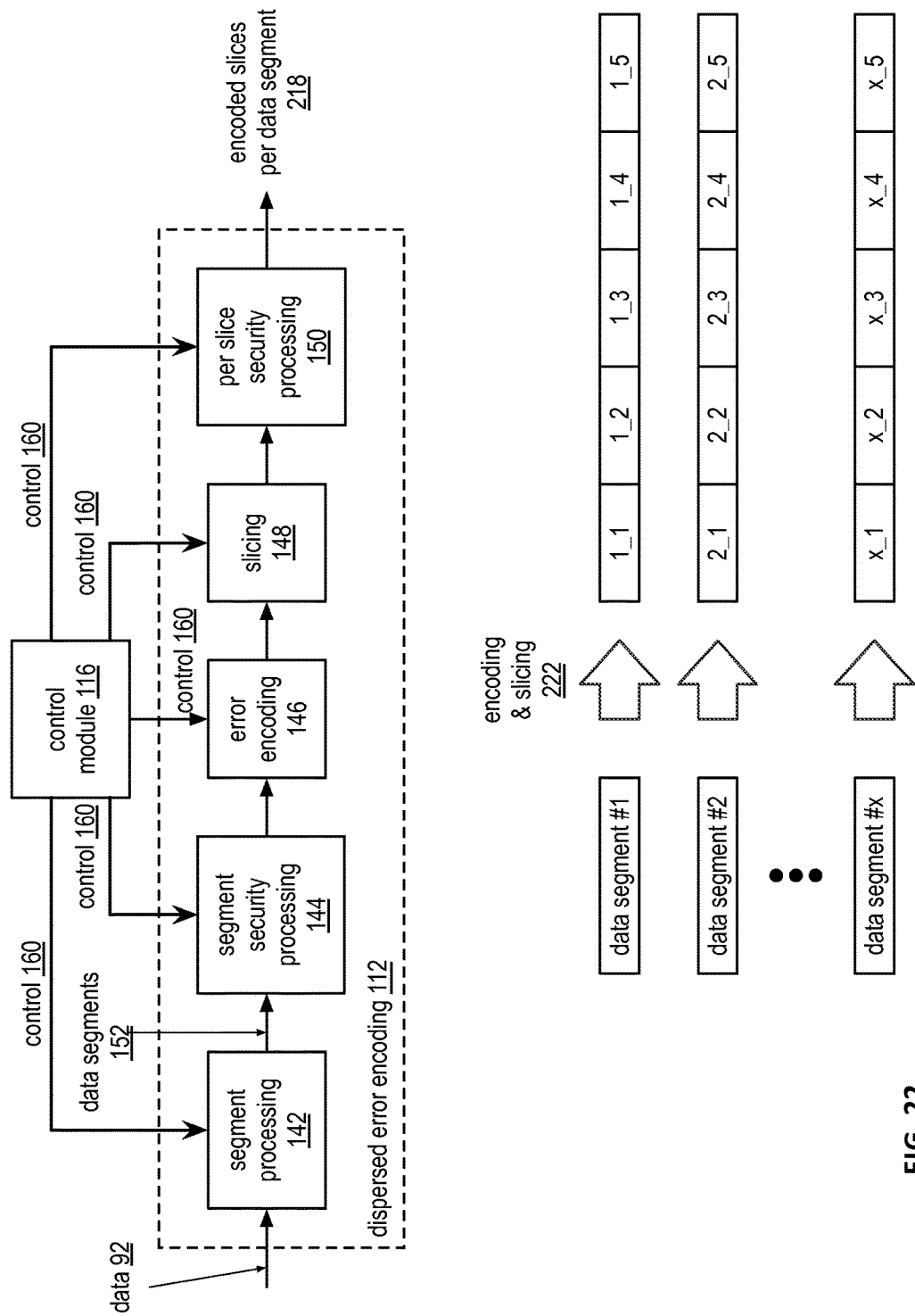
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
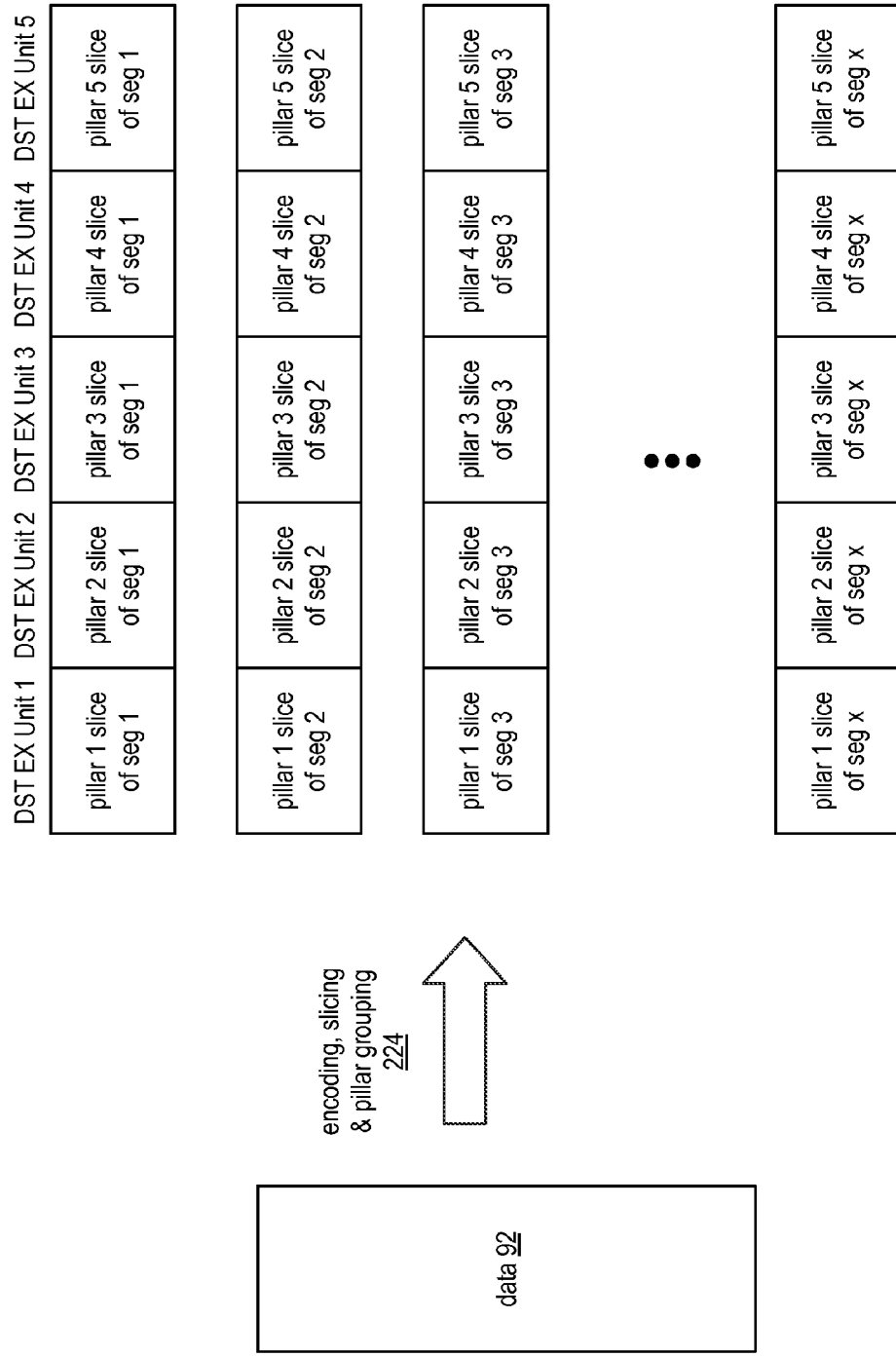
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
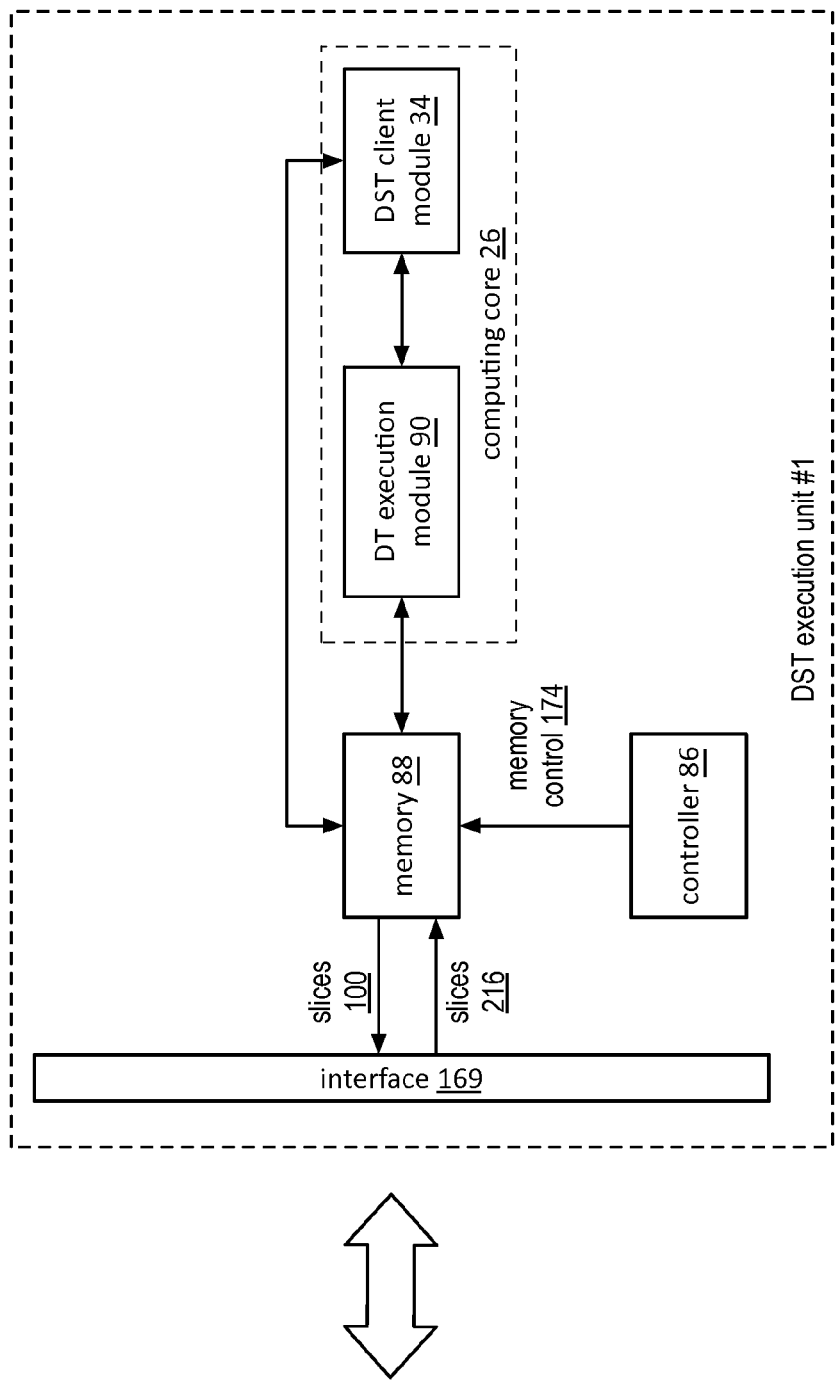
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
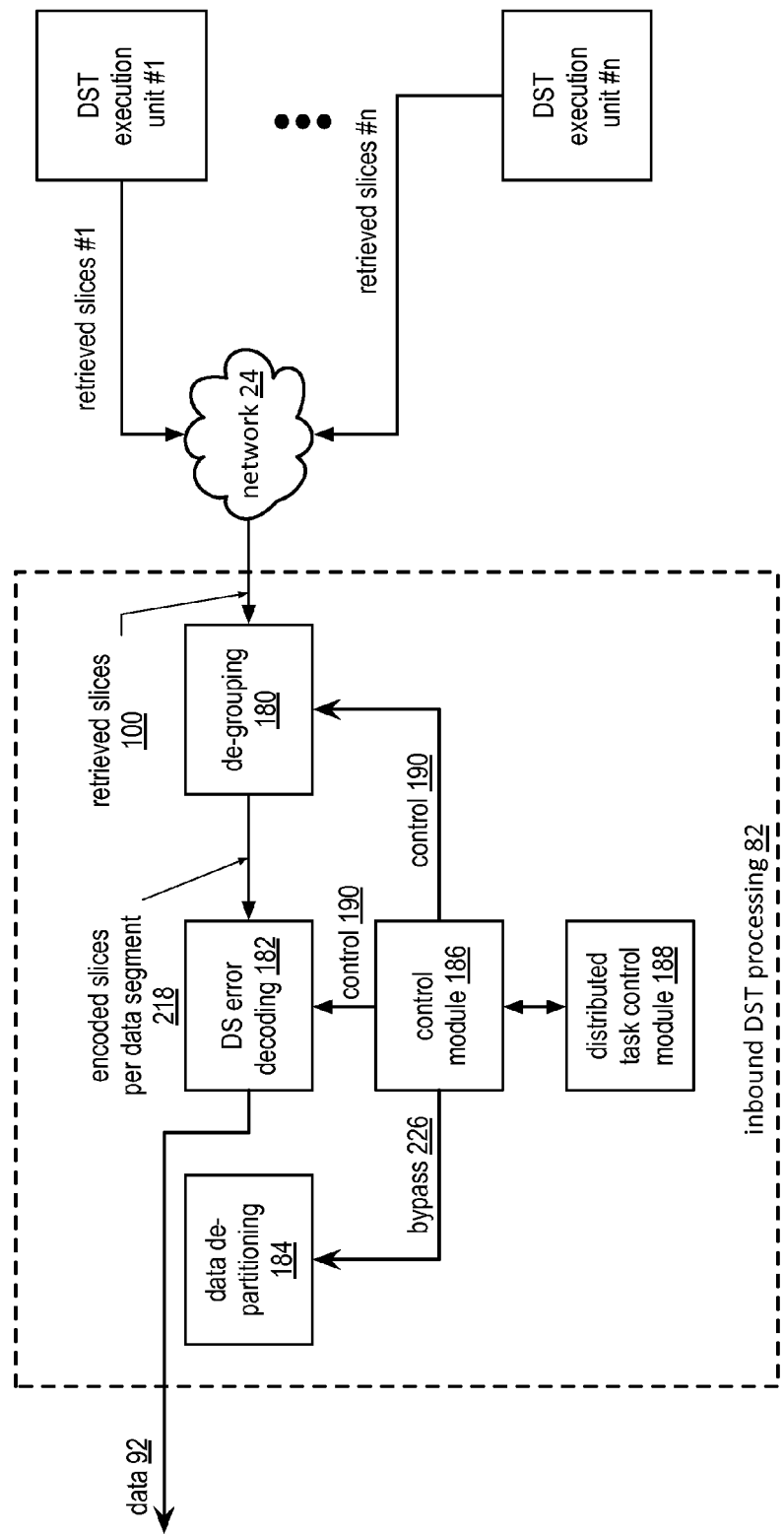
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
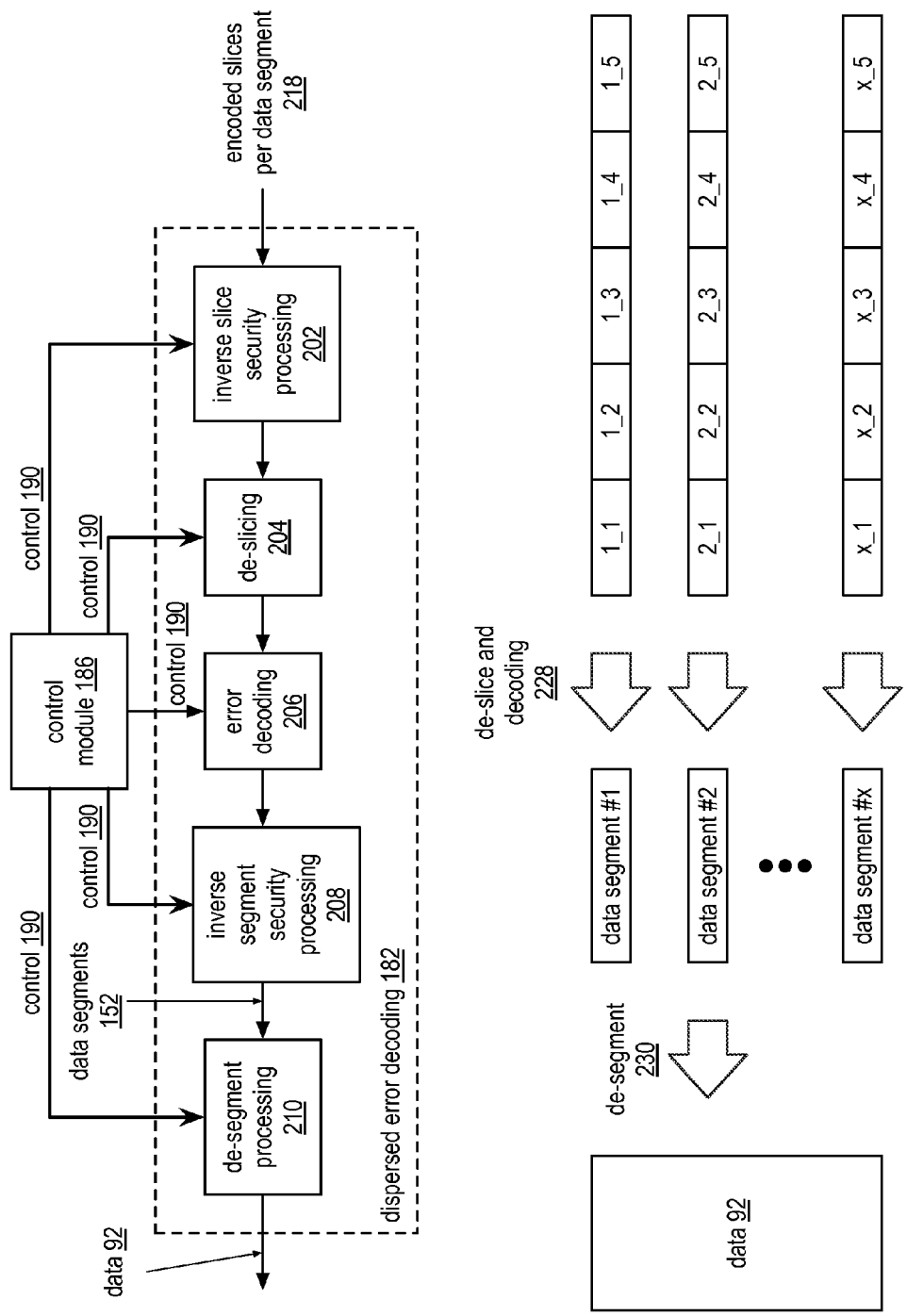
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from the control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
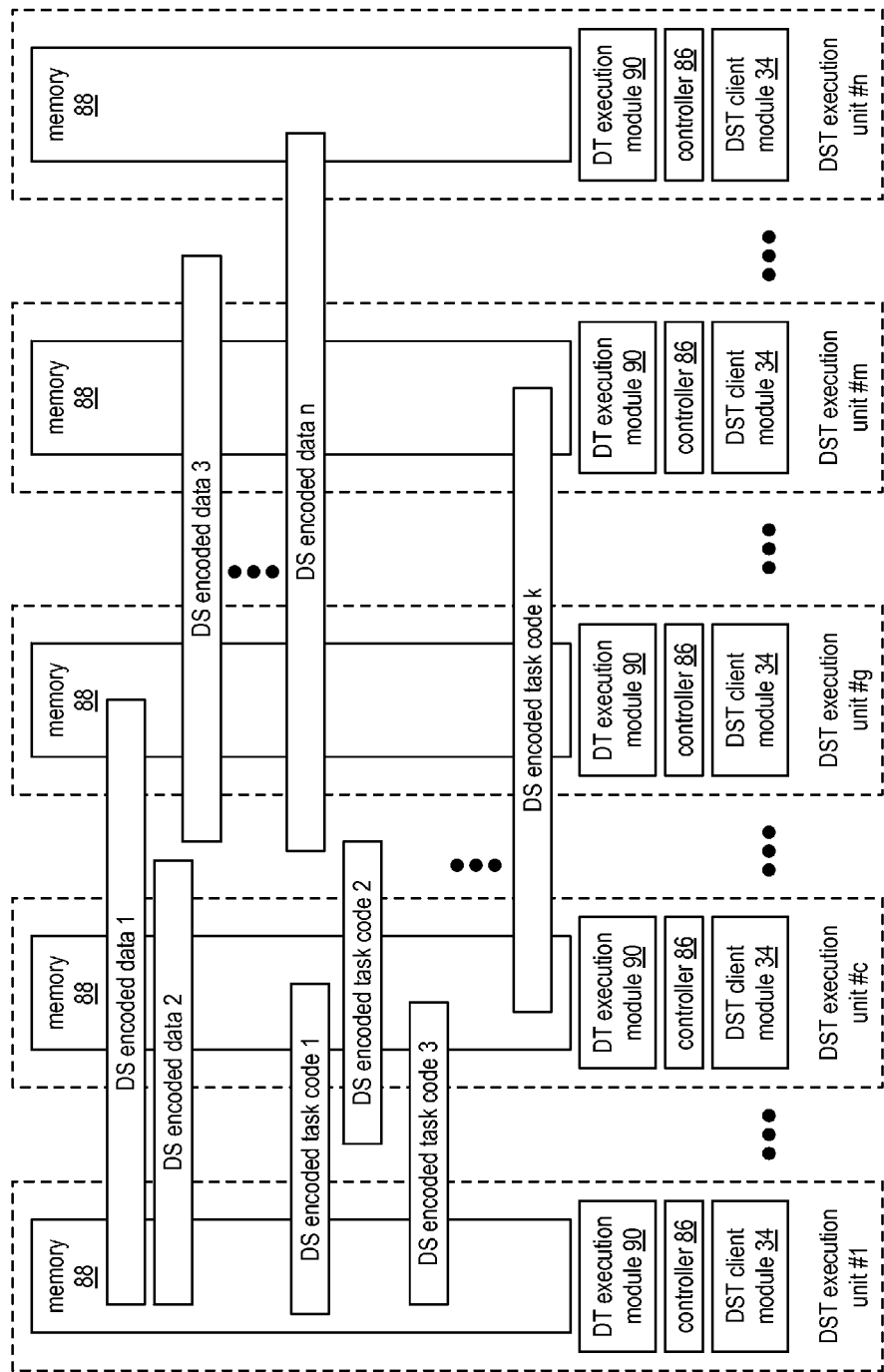
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
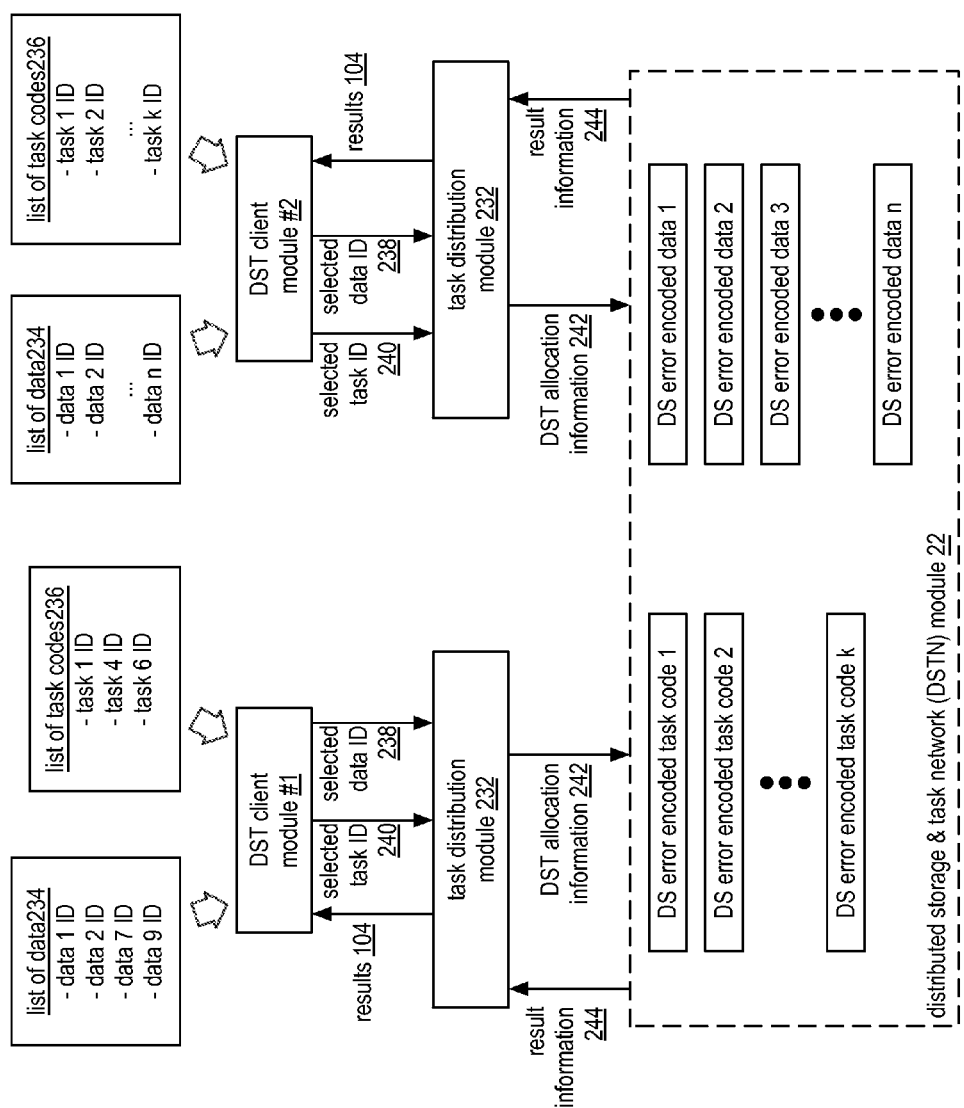
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distributions module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
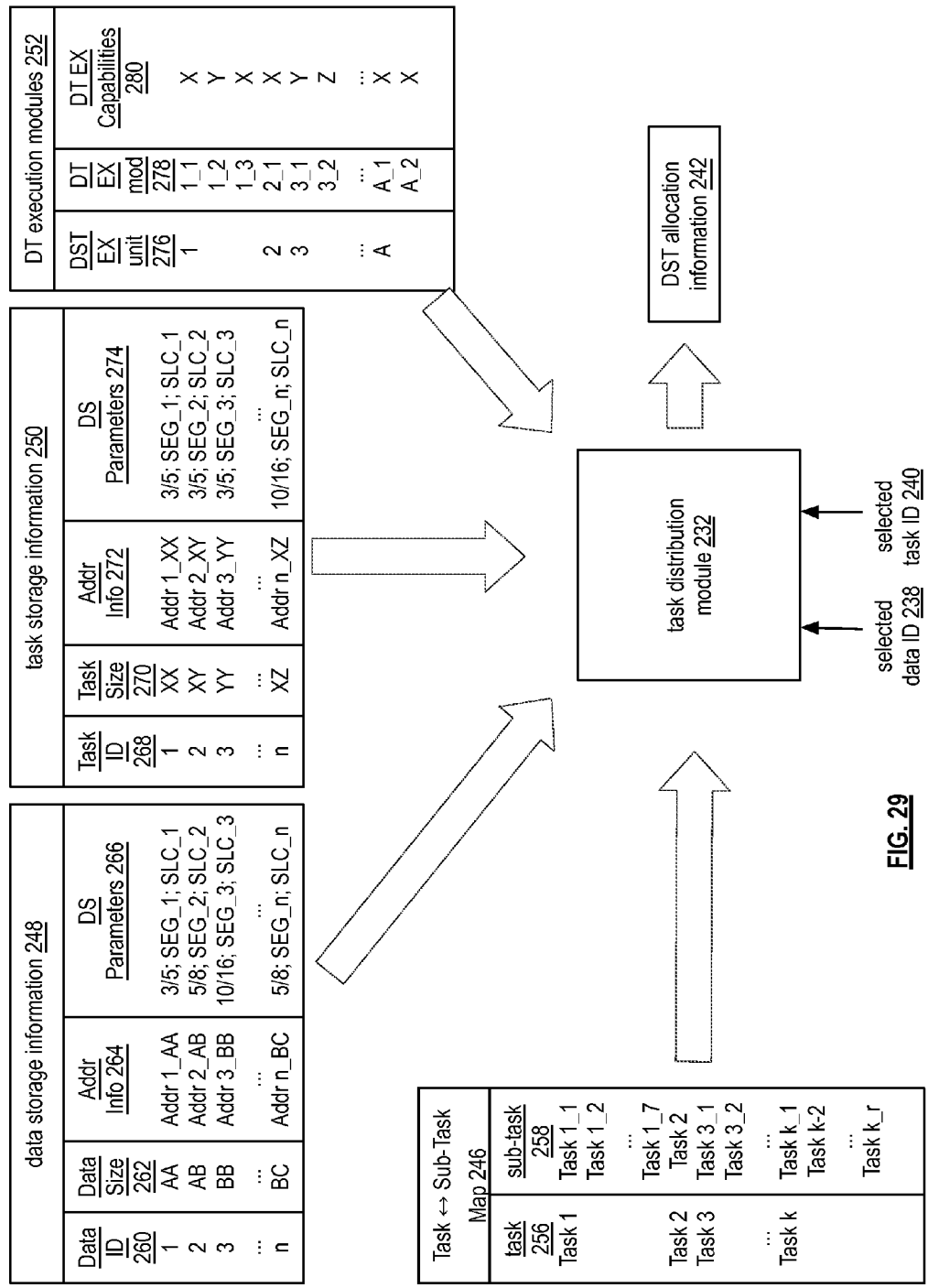
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of ⅗; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/ pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
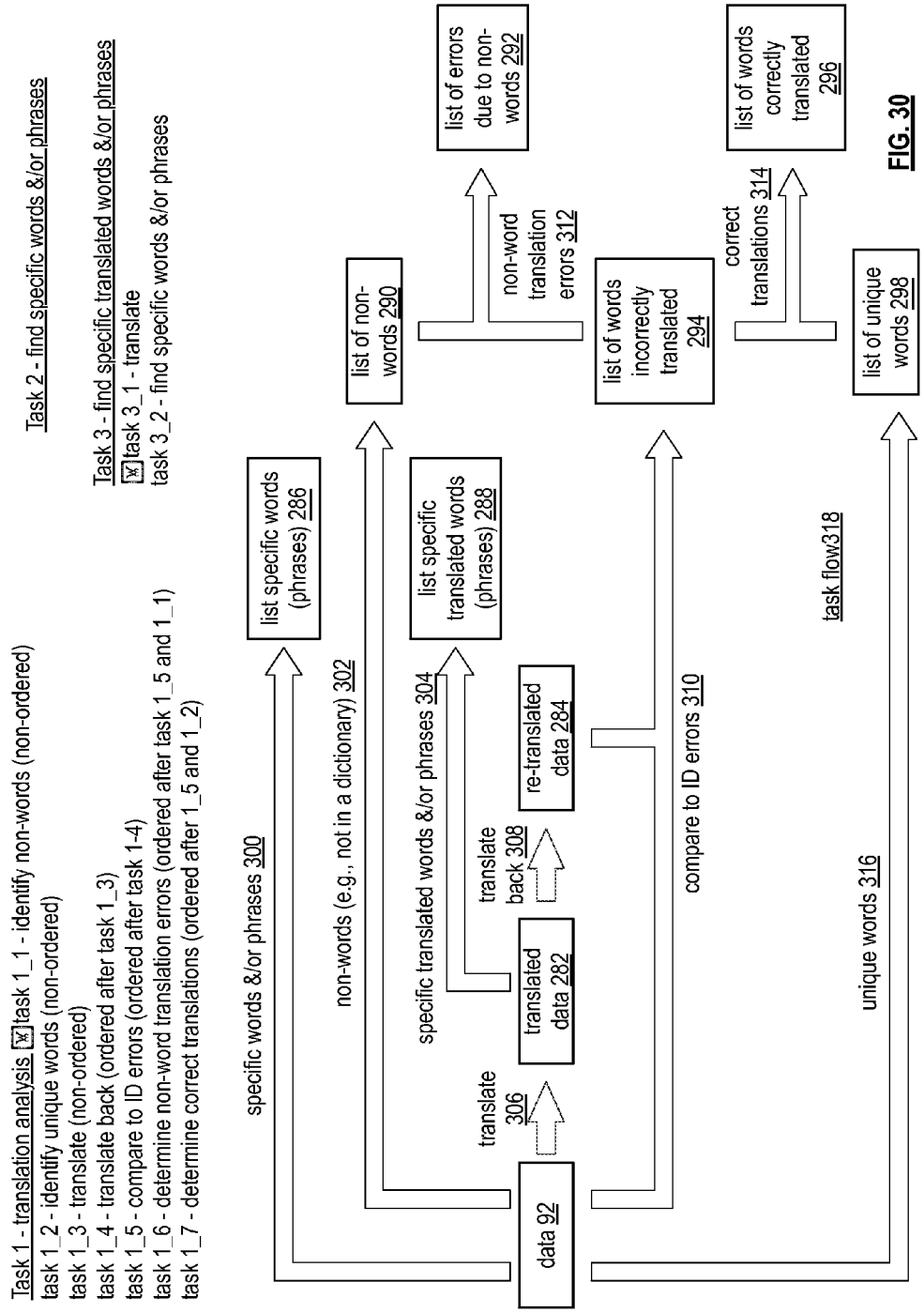
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6-determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
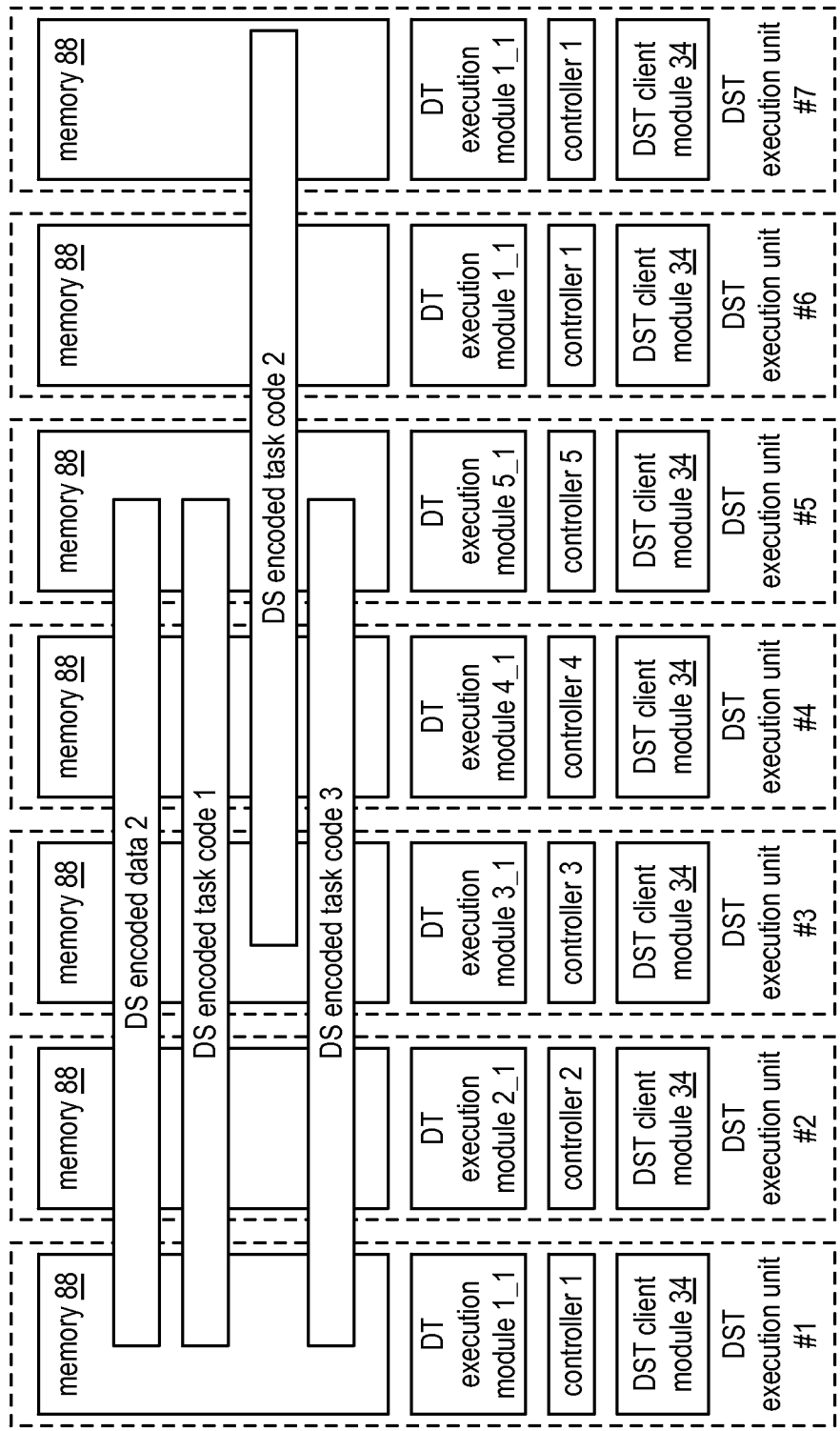
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of ⅗ for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 22, 32, 42, and 52. For instance, DT execution modules 12, 22, 32, 42, and 52 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_$y$). For each partition of the third intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_$z$). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_$z$). For each partition of the fourth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 3-7 per the DST allocation information).

Figure 36:
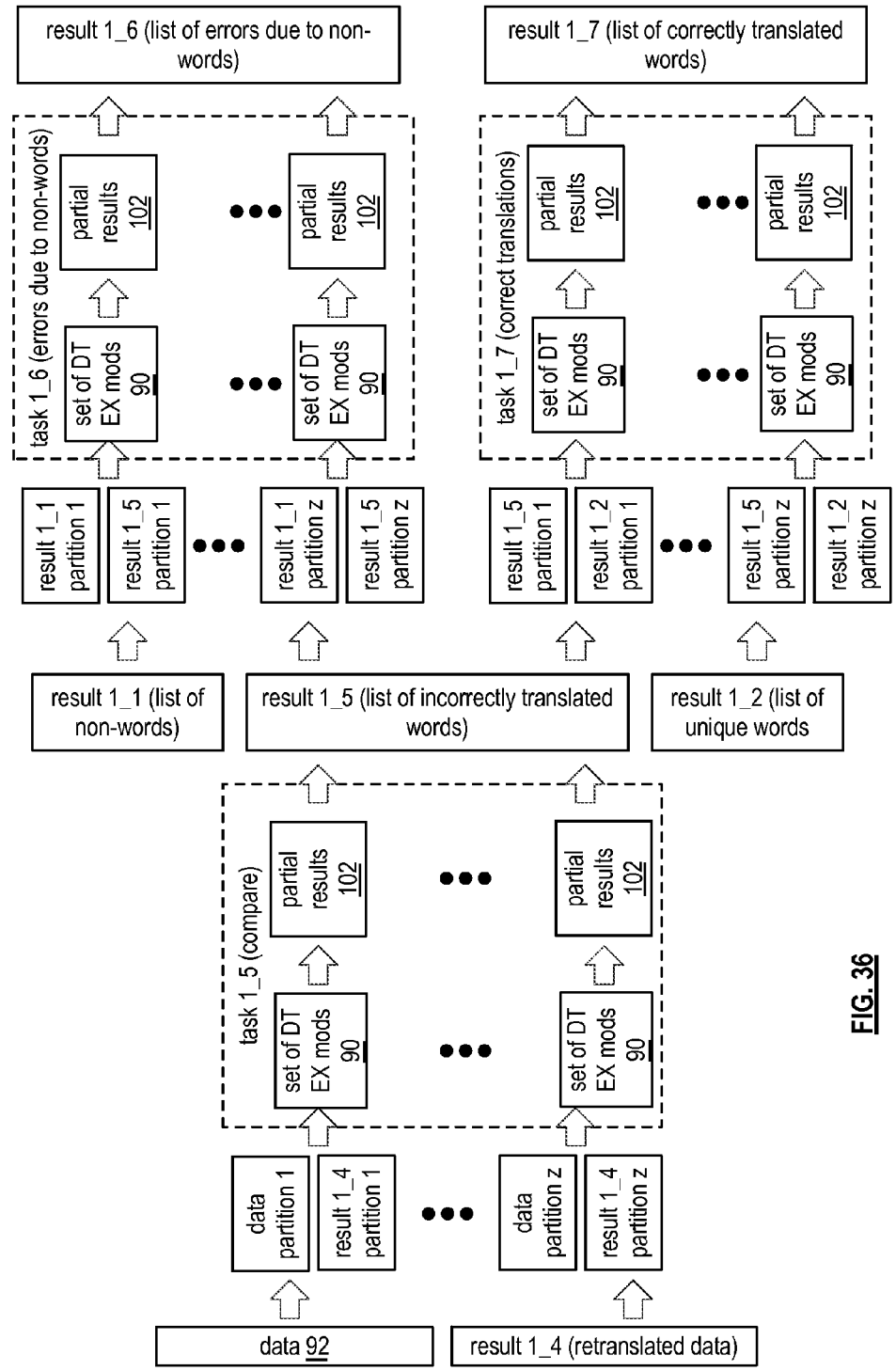

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_$z$). For each partition of the fifth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1' through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1st through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1st through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
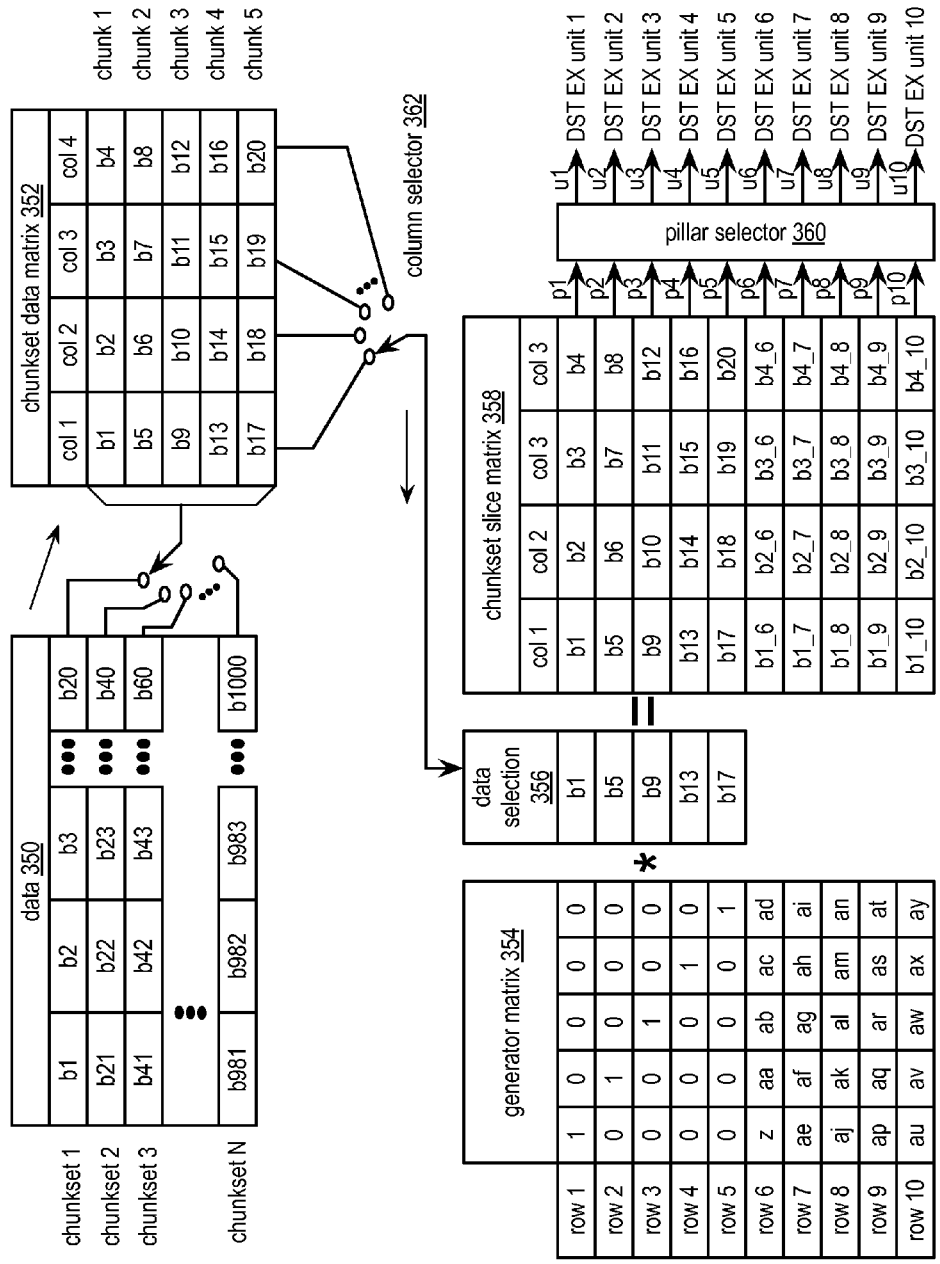
FIG. 40A is a diagram illustrating encoding of data in accordance with the present invention.

FIG. 40A is a diagram illustrating encoding of data 350 that includes data organized as a plurality of chunksets 1-N (e.g., a data partition, or portion thereof), a chunkset data matrix 352 for each of the plurality of chunksets 1-N that includes a row for each chunk, a column selector 362, a generator matrix 354 to encode each chunkset to produce a corresponding chunkset matrix 358 of slices, a data selection 356, and a pillar selector 360 to route slices of each chunkset to a corresponding distributed storage and task execution (DST EX) unit for task processing. A number of chunks per chunkset is determined as a number of required parallel DST execution units to process parallel task processing to complete an overall task within a desired task execution time period. A decode threshold of an information dispersal algorithm (IDA) is determined as the number of chunks. A pillar width number of the IDA is determined based on one or more of the decode threshold, a number of available DST EX units, an availability requirement, and a reliability requirement. For example, the decode threshold is set at 5 when the number of chunks is 5 and the pillar width is set at 10 in accordance with a reliability requirement that includes utilizing a pillar width that is at least twice the decode threshold number. As another example, the decode threshold is set at 5 when the number of chunks is 5 and the pillar width is set at 8 in accordance with a reliability requirement that includes utilizing a pillar width that is less than twice the decode threshold number.

A chunk size of each chunkset is determined to match a chunk size requirement for task processing. For example, a chunk size is determined as 4 bytes when a DST EX unit indicates that a task processing data size limit is 4 bytes. A chunkset size is the number of chunks multiplied by the chunk size. For example, the chunkset is 20 bytes when the chunk size is 4 bytes and the number of chunks is 5. A number of chunksets N is determined as a size of the data divided by the size of the chunkset. For example, there are 50 chunksets (e.g., N=50) when the chunks are 20 bytes and the size of the data is 1000 bytes.

The generator matrix 354 is determined in accordance with the IDA and includes a decode threshold number of columns and a pillar width number of rows. A unity matrix is utilized in a top square matrix to facilitate generation of contiguous data slices that match contiguous data of chunks. Other rows of the generator matrix 354 facilitate generating error coded slices (e.g., encoded data slices) for remaining rows of the chunkset slice matrix 358.

For each chunkset, the generator matrix 354 is matrix multiplied by a column of the corresponding chunkset data matrix as the data selection 356 (e.g., a data selection as selected by a column selector) to generate a column of the chunkset slice matrix for the corresponding chunkset. For example, row 1 of the generator matrix is multiplied by column 1 of the chunkset data matrix 352 to produce a row 1 byte of column 1 of the chunkset slice matrix 358, row 2 of the generator matrix 354 is multiplied by column 1 of the chunkset data matrix 352 to produce a row 2 byte of column 1 of the chunkset slice matrix 358, etc. As another example, row 1 of the generator matrix 354 is multiplied by column 2 of the chunkset data matrix 352 to produce a row 1 byte of column 2 of the chunkset slice matrix 358, row 2 of the generator matrix 354 is multiplied by column 2 of the chunkset data matrix 352 to produce a row 2 byte of column 2 of the chunkset slice matrix 358, etc.

A segment may be considered as one or more columns of the chunkset data matrix 352 and slices that correspond to the segment are the rows of the chunkset slice matrix 358 that correspond to the one or more columns of the chunkset data matrix. For example, row 1 column 1 of the chunkset slice matrix form slice 1 when column 1 of the chunkset data matrix 352 is considered as a corresponding segment. Slices of a common row of the chunkset slice matrix 358 are of a chunk of contiguous data of the data and share a common pillar number and may be stored in a common DST EX unit to facilitate a distributed task function on slices of the common pillar.

The pillar selector 360 routes slices of each pillar to a DST EX unit in accordance with a pillar selection scheme. For example, four slices of row 1 (e.g., bytes from columns 1-4) of the chunkset slice matrix 358 are sent to DST EX unit 1 as a contiguous chunk of data that includes 4 bytes when the pillar selection scheme maps pillars 1-5 (e.g., associated with slices of contiguous data), to DST EX units 1-5 and maps pillars 6-10 (e.g., associated with error coded slices) to DST EX units 6-10 for a first chunkset.

To facilitate load leveling of tasks executed by the DST EX units, the pillar selection scheme may include rotating assignments of pillars to different DST EX units for each chunkset. For example, four slices of row 10 of the chunkset slice matrix 358 are sent to DST EX unit 1 as error coded data slices that includes 4 bytes when the pillar selection scheme maps pillar 10 (e.g., associated with error coded slices), to DST EX units 1 and maps pillar 1 (e.g., associated with slices of contiguous data) to DST EX unit 10 for another chunkset.

To facilitate execution options of partial tasks associated with the slices, the pillar selection scheme may include sending a slice to two or more DST execution units. For example, four slices of row 1 of the chunkset slice matrix 358 are sent to DST execution unit 1, a fourth slice of the first row of the chunkset slice matrix 358 is sent to DST execution unit 2, four slices of row 2 of the chunkset slice matrix 358 are sent to DST execution unit 2, and a first slice of row 2 of the chunkset slice matrix 358 is sent to DST execution unit 1. As such, DST execution unit 1 may process partial tasks on the first slice of row 2 when DST execution unit 2 is not able to execute those tasks in a timely manner. In addition, DST execution unit 2 may process partial tasks on the fourth slice of row 1 when DST execution unit 1 is not able to execute those tasks in a timely manner.

Figure 40B:
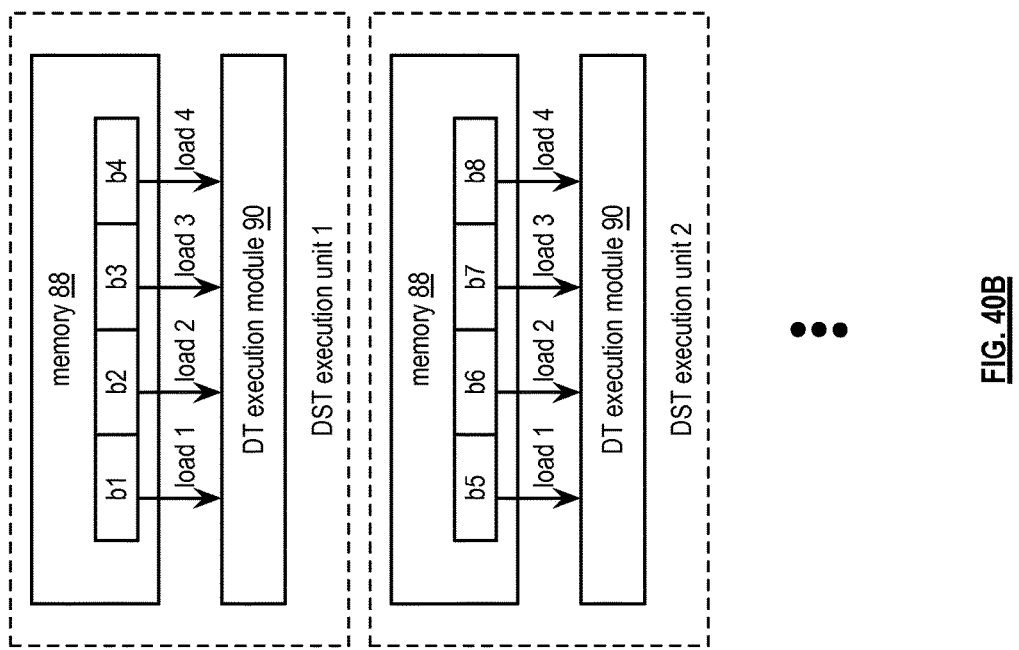
FIG. 40B is a schematic block diagram of a set of DST execution units processing slice groupings in accordance with the present invention.

FIG. 40B is a schematic block diagram of a set of distributed storage and task (DST) execution units 1-2 processing slice groupings. Each DST execution unit of the set of DST execution units includes a memory 88 and a distributed task (DT) execution module 90. The set of DST execution units 1-2 may include a pillar width number of DST execution units utilized to store one or more sets of slices of the slice groupings. The memory 88 functions to store one or more slices of each slice grouping. For example, DST execution unit 1 receives a slice grouping that includes bytes b1-b4 as slices 1-4 and stores bytes b1-b4 in memory of DST execution unit 1. As another example, DST execution unit 2 receives a slice grouping that includes bytes b5-b8 as slices 5-8 and stores bytes b5-b8 in memory of DST execution unit 2.

Each DST execution unit receives partial tasks associated with a slice grouping and executes the partial tasks on the slice grouping to produce partial results. The partial tasks may include execution ordering information. The execution ordering information may include information with regards to which partial task to execute first, second, etc. and may include information with regards to which slice to process first, second, etc. For example, the DT execution module 90 of DST execution unit 1 loads b1 first to execute a partial task on b1 to produce a partial result corresponding to b1 and loads b2 second to execute a partial task on b2 to produce a partial result corresponding to b2 when the execution ordering information indicates to start with byte b1 and then process b2. As another example, the DT execution module 90 of DST execution unit 2 loads b5 first to execute a partial task on b5 to produce a partial result corresponding to b5 and loads b6 second to execute a partial task on b6 to produce a partial result corresponding to b6 when the execution ordering information indicates to start with byte b5 and then process b6 etc.

Figure 40C:
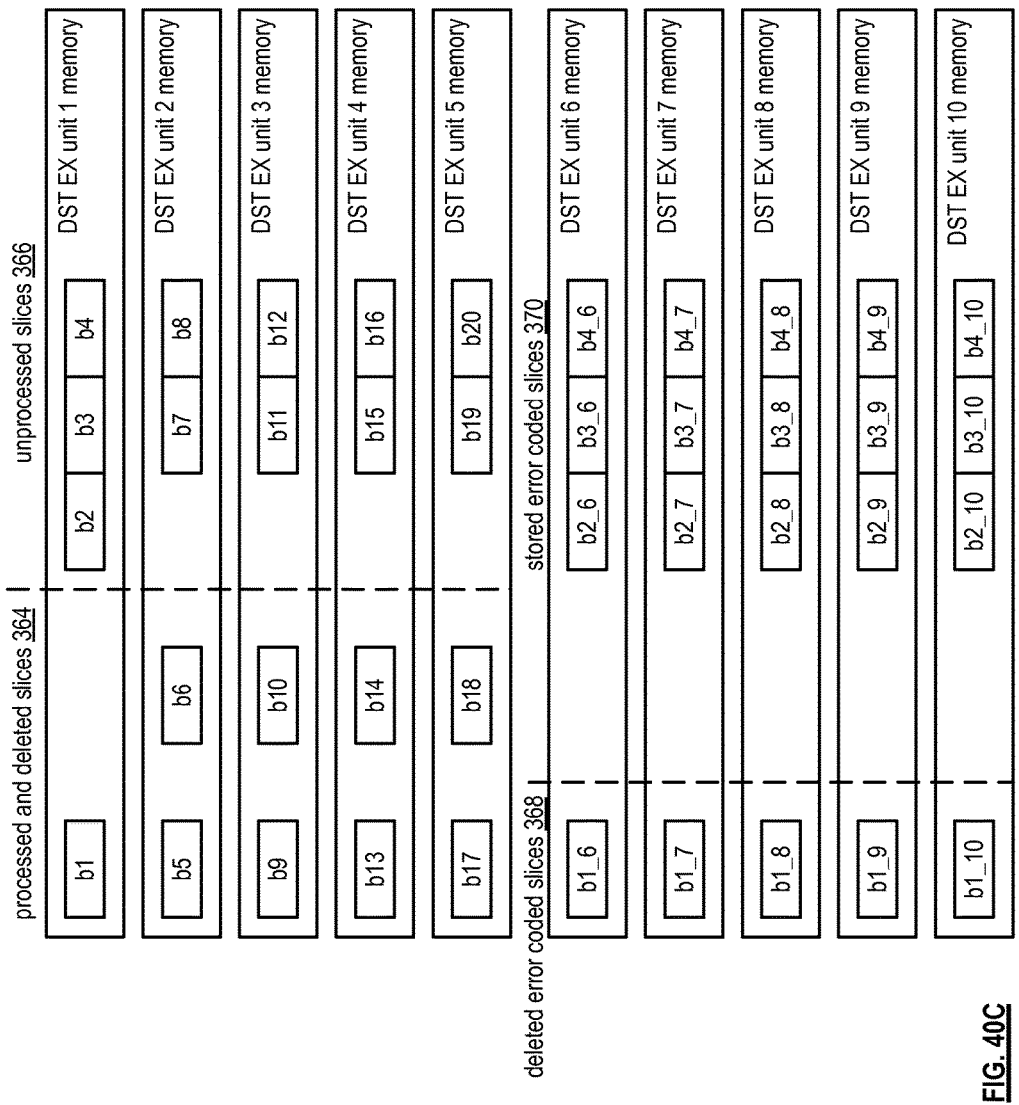
FIG. 40C is a schematic block diagram of a set of DST execution unit memories in accordance with the present invention.

FIG. 40C is a schematic block diagram of a set of distributed storage and task (DST) execution unit memories 1-10. Each DST execution unit memory of the set of DST execution units memories 1-10 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-10. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-10 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory, slices b1_9 through b4_9 in DST execution unit 9 memory, slices b1_10 through b4_10 in DST execution unit 10 memory) of remaining slices of a pillar width number of slices when the decode threshold number is 5 and a pillar width number is 10.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2, b3, and b4 of DST execution unit 1 memory remain as unprocessed slices 366 and slice b1 has been processed and deleted, as part of processed and deleted slices 364, in accordance with a partial task that indicates slices are to be processed to produce partial results and are no longer required for further processing. As such, a slice stored in a DST execution unit memory may be deleted to provide more storage capacity when no further processing is required on the slice and the slice is not required to rebuild another slice that is still required for processing. For example, at time t1, each data slice (e.g., b1, b5, b9, b13, b17) of a first data segment has been processed and deleted since there is no requirement to store the data segment after it has been processed.

In another example, at time t1, processed data slices b6, b10, b14, and b18 of a common data segment have been deleted since they are not required for further processing after processing of associated sub-tasks and they are not required for rebuilding any remaining data slices (e.g., b2) of the common data segment since there is at least a decode threshold plus 1 number of other slices available for rebuilding (e.g., including the remaining data slice b2 and corresponding error coded slices b2_6 through b2_10). In an example of rebuilding, error coded slices b2_6 through b2_10 may be utilized to rebuild data slice b2 when data slice b2 is in a slice error condition (e.g., a missing slice, a corrupted slice) and data slice b2 is still required for processing a sub-task.

Error coded slices 370 that correspond to slices of a data segment that has not been deleted are maintained in corresponding DST execution unit memories 6-10 as the error coded slices may be required to rebuild one or more data slices of the data segment when the one or more data slices are in the slice error condition. Error coded slices that correspond to slices of a deleted data segment may also be deleted. For example, error coded slices b1_6 through b1_10 368 are deleted when the corresponding data slices (e.g., b1, b5, b9, b13, b17) have been deleted subsequent to processing of the data slices. A method to process sub-tasks on data slices that includes deleting the data slices is described in greater detail with reference to FIG. 40D.

Figure 40D:
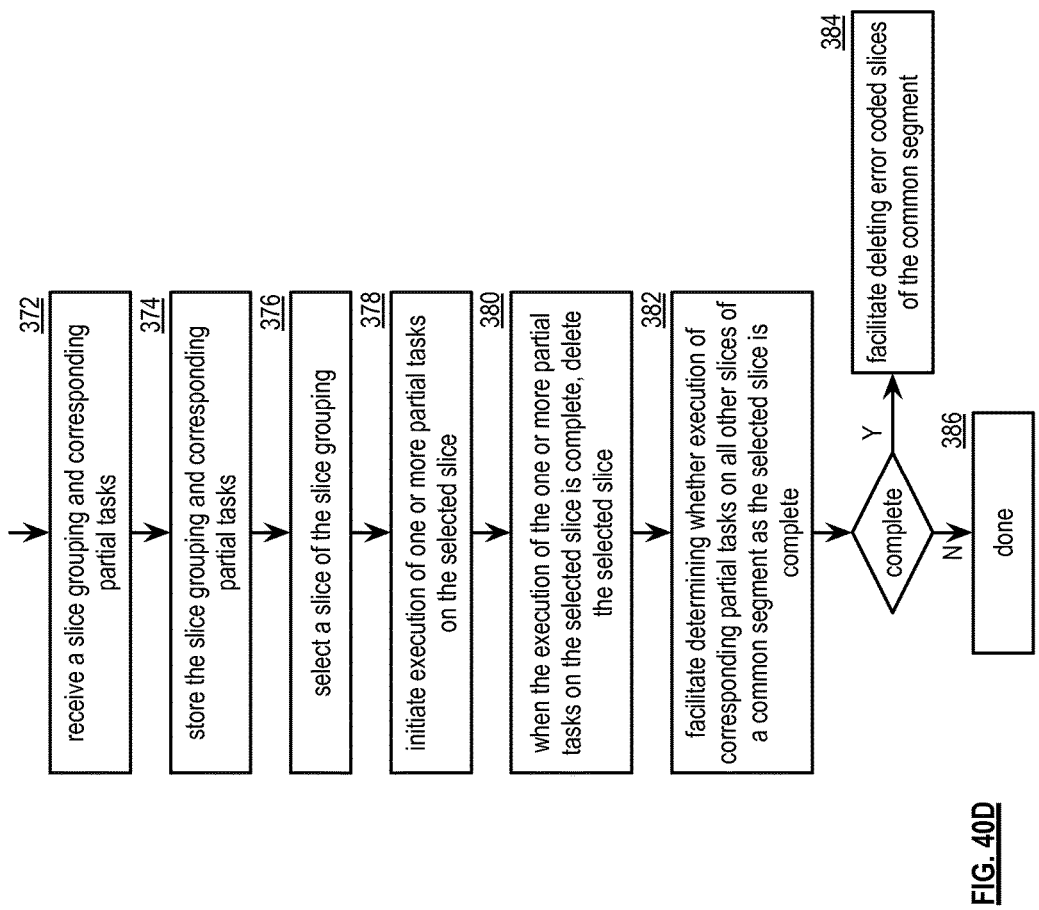
FIG. 40D is a flowchart illustrating an example of processing sub-tasks on a slice in accordance with the present invention.

FIG. 40D is a flowchart illustrating an example of processing sub-tasks on a slice. The method begins at step 372 where a processing module (e.g., of a distributed storage and task (DST) execution module) receives a slice grouping and corresponding partial tasks. The method continues at step 374 where the processing module stores the slice grouping and corresponding partial tasks (e.g., in a local memory). The method continues at step 376 where the processing module selects a slice of the slice grouping. The selecting may be based on one or more of a processing order of the corresponding partial tasks, a previous processing order, a previous partial task, a predetermination, and a look up. For example, processing module selects a first slice of the slice grouping when the processing order of the corresponding tasks indicates to start with the first slice and to execute each successive slice in order.

The method continues at step 378 where the processing module initiates execution of one or more partial tasks on the selected slice. For example, the processing module executes a first partial task of the one or more partial tasks on the selected slice to produce a first partial result and executes a second partial task of the one or more partial tasks on the selected slice to produce a second partial result etc. until execution of a last partial task of the one or more partial tasks on the selected slice to produce a last partial result. Completion of execution of the partial tasks may include one or more of outputting the partial results, outputting an indication that the selected slice has been processed, receiving an indication that another data slice of a common data segment with the selected slice has been processed, receiving an indication to enable deletion of the selected slice, and receiving an indication that another data slice of the common data segment has been deleted.

When execution of the one or more partial tasks on the selected slice is complete, the method continues at step 380 where the processing module deletes the selected slice in accordance with a slice deletion policy of the one or more partial tasks. The deleting may include one or more of deleting the selected slice from the local memory and outputting an indication that the selected slice has been deleted to one or more DST execution units associated with data slices and/or error coded slices of the common data segment. For example, the processing module immediately deletes the selected slice when the slice deletion policy indicates to immediately delete the selected slice when a decode threshold number of DST execution units are utilized to store a decode threshold number of error coded slices of a common data segment that may be utilized to rebuild any data slice of a decode threshold number of data slices of the common data segment. As such, any of the data slices may be immediately deleted after processing since any of the data slices can be rebuilt based on utilization of the error coded slices.

The method continues at step 382 where the processing module facilitates determining whether execution of corresponding partial tasks on all other slices of the common data segment as the selected slice is complete. The facilitating includes at least one of the initiating a status query, sending a request to a DST client module requesting that the DST client module perform the determining, and receiving an indication from all other DST execution units associated with the common data segment that all corresponding data slices of the common data segment have been processed. For example, the processing module determines that execution of partial tasks on the common data segment have been completed when the processing module receives an indication from DST execution units 1-5 that a corresponding data slice of the common data segment has been processed. The method completes at step 386 when the processing module determines that execution of the corresponding partial tasks of the common data segment is not complete. As such, another slice may be selected for execution of more partial tasks as described above. The method continues to step 384 when the processing module determines that execution of the corresponding partial tasks of the common data segment is complete. The method continues at step 384 where the processing module facilitates deleting error coded slices of the common data segment. The deleting includes sending a delete request to each DST execution unit associated with storing the error coded slices and sending a request to a DST client module to perform the deleting.

Figure 41A:
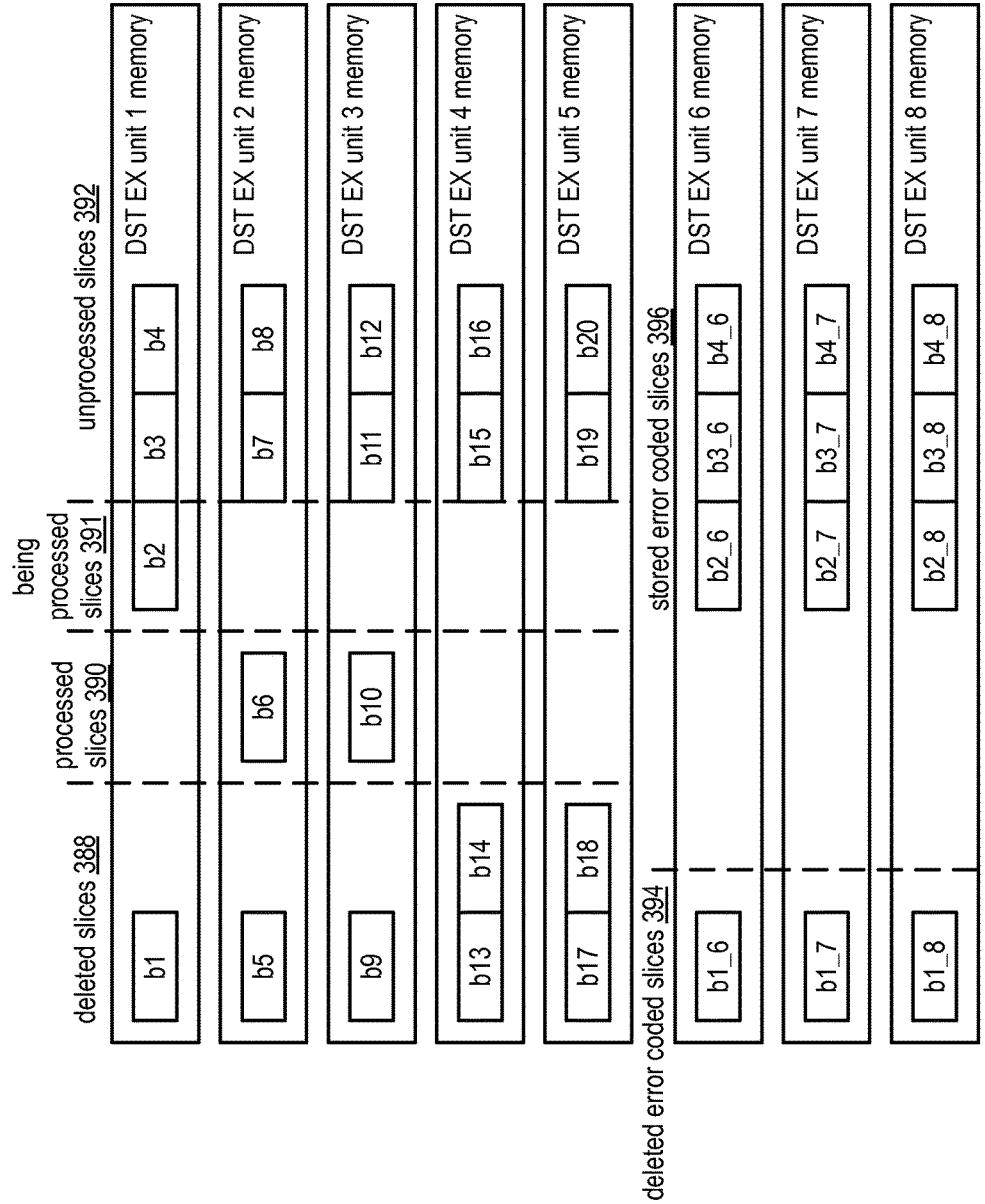
FIG. 41A is a schematic block diagram of another set of DST execution unit memories in accordance with the present invention.

FIG. 41A is a schematic block diagram of another set of distributed storage and execution (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory) of remaining slices of a pillar width number of slices when the decode threshold number is 5 and a pillar width number is 8.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2, b3, and b4 of DST execution unit 1 memory remain unprocessed where slices b3 and b4 are included in unprocessed slices 392 and slice b2 is included in slice is actively being processed 391. Slice b1 has been processed and deleted, it is included in deleted slices 388, in accordance with a partial task that indicates slices are to be processed to produce partial results and are no longer required for further processing. As such, a slice stored in a DST execution unit memory may be deleted to provide more storage capacity when no further processing is required on the slice and the slice is not required to rebuild another slice that is still required for processing. For example, at time t1, each data slice (e.g., b1, b5, b9, b13, b17) of a first data segment has been processed and deleted since there is no requirement to store the data segment after it has been processed.

When a data slice has been processed, the data slice may be deleted in accordance with a data slice deletion policy. The policy may include a requirement to maintain at least a decode threshold number of data slices and/or error coded slices of a common data segment to enable rebuilding any one of the data slices. For example, at time t1, data slices b6, b10, b14, and b18 of a second common data segment have been processed and data slices b14 and b18 have been deleted leaving a decode threshold plus 1 number of data slices and/or error coded slices (e.g., data slices b10, b6, and b2 where slices b6 and b10 are included in processed slices 390 (e.g., but not deleted); error coded slices b2_6, b2_7, and b2_8 are included in stored error coded slices 396). In an instance of rebuilding, data slices b10, b6, error coded slices b2_6, b2_7, and b2_8 form a decode threshold number of slices which may be utilized to rebuild data slice b2 when data slice b2 is in a slice error condition (e.g., a missing slice, a corrupted slice) and data slice b2 is still required for processing a sub-task.

Error coded slices that correspond to slices of a data segment that has not been deleted are maintained in corresponding DST execution unit memories 6-8 as the error coded slices may be required to rebuild one or more data slices of the common data segment when the one or more data slices are in the slice error condition. Error coded slices that correspond to slices of a deleted data segment may also be deleted. For example, error coded slices b1_6 through b1_8 are deleted, and are included in deleted error coded slices 394, when corresponding data slices (e.g., b1, b5, b9, b13, b17) have been deleted subsequent to processing of the data slices.

Figure 41B:
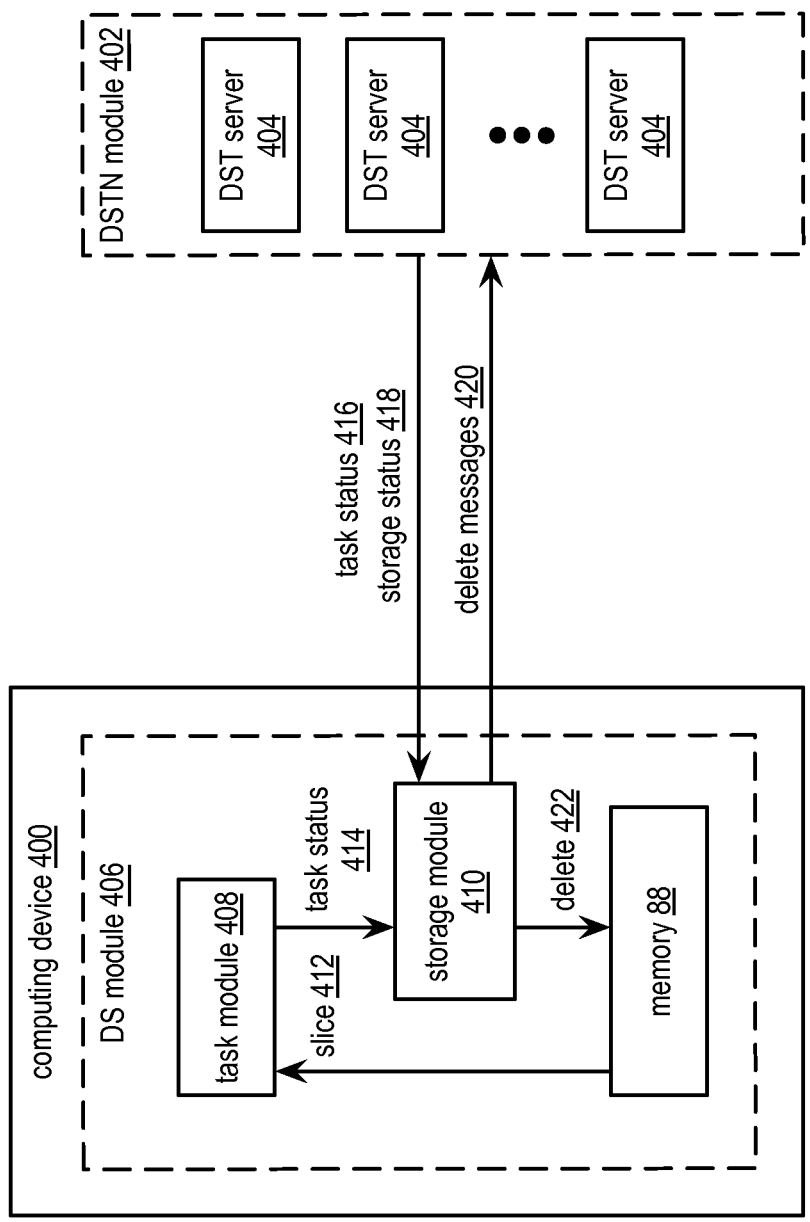
FIG. 41B is a schematic block diagram of another embodiment of a distributed computing system in accordance with the present invention.

FIG. 41B is a schematic block diagram of another embodiment of a distributed computing system that includes a computing device 400 and a distributed storage and task network (DSTN) module 402. The DSTN module 402 includes a set of distributed storage and task (DST) servers 404. Each DST server 404 of the set of DST servers 404 may be implemented utilizing one or more of a storage node, a dispersed storage unit, a storage server, a storage unit, a storage module, a memory device, a memory, a user device, a DST processing unit, a DST execution unit, a computing server, and a DST processing module. The computing device 400 may be implemented utilizing at least one of a server, a computer, and a DST server. At least one DST server 404 of the set of DST servers 404 may include the computing device 400. For example, the computing device 400 is implemented as a first DST server 404 of the set of DST servers 404. The computing device 400 includes a distributed storage (DS) module 406. The DS module 406 includes a task module 408, a storage module 410, and a memory 88 (e.g., a local memory).

The system functions to store data as a plurality of sets of encoded data slices in the set of DST execution units 404, execute one or more partial tasks of a set of partial tasks from a task on at least some encoded data slices of the plurality of sets of encoded data slices, and deletes encoded data slices based on execution of the one or more partial tasks. With regards to the storing of the data, at least one of the computing device 400, a DST server unit 404, and a DST processing module, encodes and stores the data. The encoding and storing includes a series of encoding and storing steps. In a first encoding and storing step, the data is divided into a plurality of data segments. In a second encoding and storing step, a data segment of the plurality of data segments is dispersed storage error encoded to produce a set of encoded data slices such that the data is encoded into a plurality of sets of encoded data slices, where a recovery number of encoded data slices of the set of encoded data slices is required to recover the data segment. In a third encoding and storing step, the task is divided into a set of partial tasks. In a fourth encoding and storing step, the plurality of sets of encoded data slices is stored across the multiple DST servers 404, where encoded data slices of the plurality of sets of encoded data slices are grouped into groups of encoded data slices. Each of the multiple DST servers 404 stores an individual one of the groups of encoded data slices. In a fifth encoding and storing step, the set of partial tasks is assigned to at least some of the multiple DST servers 404 such that the computing device 400 (e.g., when utilized as a DST server 404) is assigned a partial task of the set of partial tasks to execute upon the individual group of encoded data slices stored in the computing device 400 (e.g., in memory 88).

The dispersed storage error encoding of the data segment may include a series of encoding steps. A first encoding step includes encoding the data segment into coded data blocks and coded error correction blocks. A second encoding step includes creating a first type of encoded data slices of the set of encoded data slices to include the coded data blocks. A third encoding step includes creating a second type of encoded data slices of the set of encoded data slices to include the coded error correction blocks. A fourth encoding step includes storing the first type of encoded data slices in the at least some of the multiple DST servers 404 assigned the set of partial tasks. A fifth encoding step includes storing the second type of encoded data slices in DST servers 404 not assigned to one of the set of partial tasks.

With regards to executing the one or more partial tasks of the set of partial tasks from the task on the at least some encoded data slices of the plurality of sets of encoded data slices, the task module 408 autonomously executes the individually assigned partial task on a stored encoded data slice 412 of the individual group of encoded data slices. For example, the task module 408 retrieves the encoded data slice 412 from memory 88 and executes the individually assigned partial task on encoded data slice 412 to produce a partial result. When execution of the individual partial task on the stored encoded data slice 412 is completed, the task module 408 provides a task status 414 to indicate completion of the individual partial task.

With regards to deleting the encoded data slices based on the execution of the one or more partial tasks, the storage module 410 deletes (e.g., outputs a delete command 422 to the memory 88) the stored encoded data slice 412 when the task is completed for a particular data segment corresponding to a particular set of encoded data slices that includes the stored encoded data slice 412 or when execution of the individual partial task on the stored encoded data slice 412 is completed and at least a retrieval number of encoded data slices of the particular set of encoded data slices is currently stored by other DST servers 404 of the multiple DST servers 404 when execution of the task on the particular data segment is not completed. The retrieval number is equal to or greater than the recovery number. The deleting includes determining whether the task is completed for the particular data segment. The determining includes receiving at least one task status 416 from at least one other DST server 404 of the multiple DST servers 404 and indicating that the task is completed when the task status 414 and the at least one task status 416 corresponding to each first type of encoded data slice of the particular set of encoded data slices indicates that the individual partial tasks have been completed. The deleting may further include determining whether the at least a retrieval number of encoded data slices of the particular set of encoded data slices is currently stored by other DST servers 404. The determining includes receiving a storage status 418 from one or more of the multiple DST servers 404 indicating whether a corresponding encoded data slice of the particular set of encoded data slices is currently stored by the one or more of the multiple DST servers 404.

When execution of the individual partial task on the stored encoded data slice 412 is completed, the retrieval number of encoded data slices is currently stored by other DST servers 404, the execution of the task on the particular data segment is not completed, and the storage module 410 maintains storage of the stored encoded data slice 412 in the memory 88. When execution of the task on the particular data segment is complete, the storage module 410 issues delete messages 420 to DST servers 404 storing remaining stored encoded data slices of the particular set of encoded data slices.

Figure 41C:
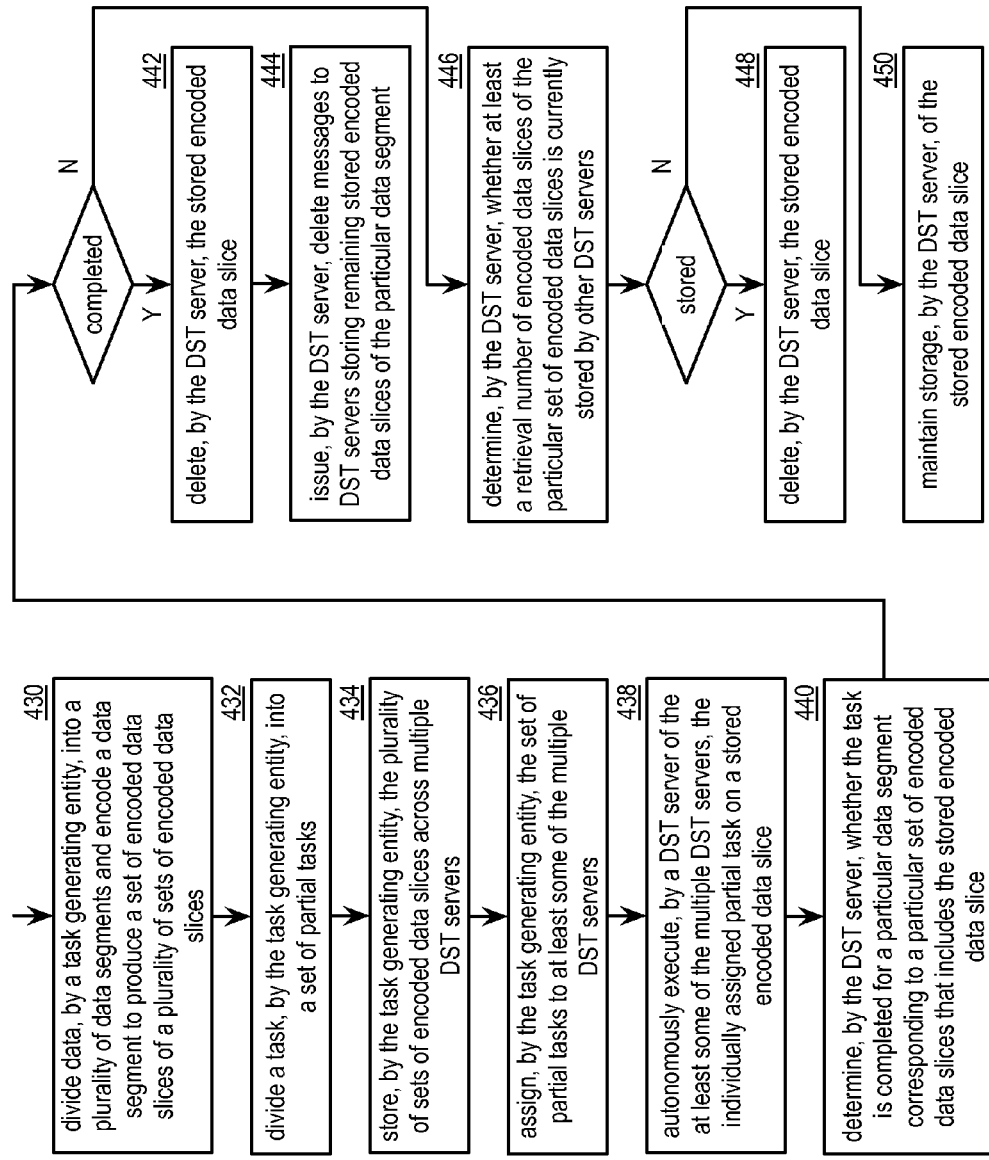
FIG. 41C is a flowchart illustrating an example of executing a task in accordance with the present invention.

FIG. 41C is a flowchart illustrating an example of executing a task. The method begins at step 430 where a task generating entity (e.g., a computing device, a distributed storage and task (DST) processing module) divides data, for execution of the task, into a plurality of data segments. The task generating entity dispersed storage encodes a data segment of the plurality of data segments to produce a set of encoded data slices such that the data is encoded into a plurality of sets of encoded data slices. A recovery number of encoded data slices of the set of encoded data slices is required to recover the data segment.

The method continues at step 432 where the task generating entity divides the task into a set of partial tasks. The method continues at step 434 where the task generating entity stores the plurality of sets of encoded data slices across multiple DST servers where encoded data slices of the plurality of sets of encoded data slices are grouped into groups of encoded data slices. Each of the multiple DST servers stores an individual one of the groups of encoded data slices. The dispersed storage error encoding and storing steps may include a series of encoding steps. A first encoding step includes the task generating entity encoding the data segment into coded data blocks and coded error correction blocks. A second encoding step includes the task generating entity creating a first type of encoded data slices of the set of encoded data slices to include the coded data blocks. A third encoding step includes the task generating entity creating a second type of encoded data slices of the set of encoded data slices to include the coded error correction blocks. A fourth encoding step includes the task generating entity storing the first type of encoded data slices in the at least some of the multiple DST servers assigned the set of partial tasks. A fifth encoding step includes the task generating entity storing the second type of encoded data slices in DST servers not assigned to one of the set of partial tasks.

The method continues at step 436 where the task generating entity assigns the set of partial tasks to at least some of the multiple DST servers such a DST server of the multiple DST servers is assigned a partial task of the set of partial tasks to execute upon the individual group of encoded data slices stored in the DST server. The method continues at step 438 where each DST server of the at least some of the multiple DST servers autonomously executes the individually assigned partial task on a stored encoded data slice of the individual group of encoded data slices (e.g., to produce a partial result). The method continues at step 440 where the DST server determines whether the task is completed for a particular data segment corresponding to a particular set of encoded data slices that includes the stored encoded data slice. The determining includes receiving task status from the at least some of the multiple DST servers where the task status indicates whether a corresponding partial task of the set of partial tasks has been completed. The method branches to step 446 when the task is not completed. The method continues to step 442 when the task is completed.

The method continues at step 442 where the DST server deletes the stored encoded data slice (e.g., from a local memory of the DST server) when the task is completed for the particular data segment corresponding to the particular set of encoded data slices that includes the stored encoded data slice. When execution of the task on the particular data segment is complete, the method continues at step 444 where the DST server issues delete messages to DST servers storing remaining stored encoded data slices of the particular set of encoded data slices.

The method continues at step 446 where the DST server determines whether at least a retrieval number of encoded data slices of the particular set of encoded data slices is currently stored by other DST servers of the multiple DST servers when execution of the task on the particular data segment is not completed. The retrieval number is equal to or greater than the recovery number. The determining includes receiving a storage status from the other DST servers where the storage status indicates whether a corresponding encoded data slice of the particular set of encoded data slices is currently stored by the other DST servers. The method branches to step 450 when the at least a retrieval number of encoded data slices of the particular set of encoded data slices is not currently stored by the other DST servers. The method continues to step 448 when the at least a retrieval number of encoded data slices of the particular set of encoded data slices is currently stored by the other DST servers.

The method continues at step 448 where the DST server deletes the stored encoded data slice when execution of the individual partial task on the stored encoded data slice is completed and the at least a retrieval number of encoded data slices of the particular set of encoded data slices is currently stored by the other DST servers of the multiple DST servers. Alternatively, when execution of the individual partial task on the stored encoded data slice is completed, the retrieval number of encoded data slices is currently stored by other DST servers, the execution of the task on the particular data segment is not completed, the DST server maintains storage of the stored encoded data slice (e.g., when a flag is set to maintain encoded data slices until the task has been completed). When execution of the individual partial task on the stored encoded data slice is completed, the retrieval number of encoded data slices is not currently stored by other DST servers, the execution of the task on the particular data segment is not completed, and the method continues at step 450 where the DST server maintains storage of the stored encoded data slice.

Figure 41D:
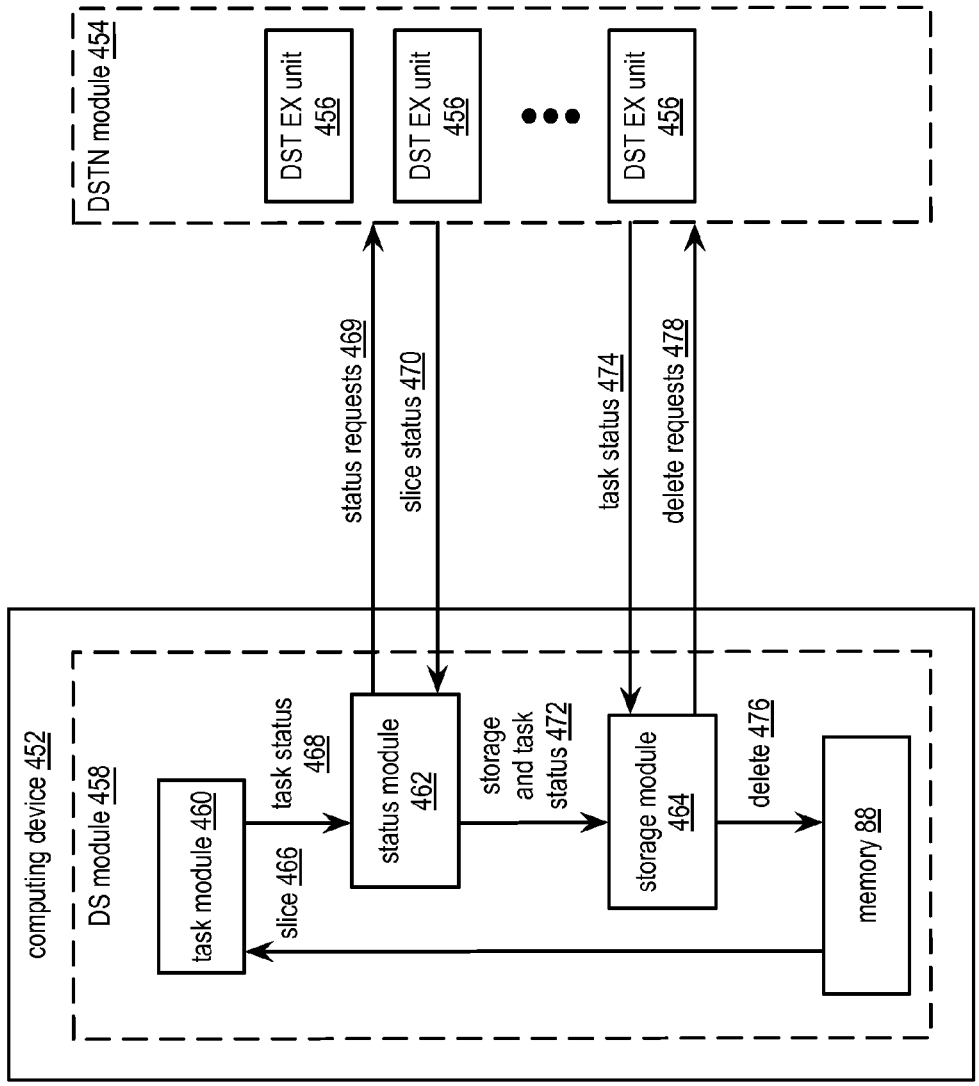
FIG. 41D is a schematic block diagram of another embodiment of a distributed computing system in accordance with the present invention.

FIG. 41D is a schematic block diagram of another embodiment of a distributed computing system that includes a computing device 452 and a distributed storage and task network (DSTN) module 454. The DSTN module 454 includes a set of distributed storage and task (DST) execution units 456. Each DST execution unit 456 of the set of DST execution units 456 may be implemented utilizing one or more of a storage node, a dispersed storage unit, a storage server, a storage unit, a storage module, a memory device, a memory, a user device, a DST processing unit, a computing server, and a DST processing module. The computing device 452 may be implemented utilizing at least one of a server, a computer, and a DST execution unit. At least one DST execution unit 456 of the set of DST execution units 456 may include the computing device 452. For example, the computing device 452 is implemented as a first DST execution unit 456 of the set of DST execution units 456. The computing device 452 includes a distributed storage (DS) module 458. The DS module 458 includes a task module 460, a status module 462, a storage module 464, and a memory 88 (e.g., a local memory).

The system functions to execute a partial task on a data slice 466 of a data segment, determine whether enough slices are available to recover the data segment, and delete the data slice 466 based on execution of the partial task and ability to recover the data segment. With regards to executing the partial task on the data slice 466, the task module 460 performs a series of task executing steps. In a first task executing step, the task module 460 retrieves the data slice 466 from the memory 88 for execution of a partial task on the data slice 466 where the data segment is dispersed storage error encoded to produce a set of slices for storage in the set of DST execution units 456 that includes the computing device 452 (e.g., the first DST execution unit). The set of slices includes error coded slices and a decode threshold number of data slices that includes the data slice 466. The partial task is one of a set of partial tasks of a task being executed on the data segment. In a second task executing step, the task module 460 performs the partial task on the data slice 466 to produce a partial result. The task module 460 issues task status 468 indicating that the partial task has been completed on the data slice 466.

With regards to the determining whether enough slices are available to recover the data segment, when the performing of the partial task is complete (e.g., as indicated by task status 468), the status module 462 determines whether at least a retrieval number of slices of the set of slices is available from other DST execution units 456 of the set of DST execution units 456. The retrieval number may be based on dispersed storage error coding parameters. For example, retrieval number may include a decode threshold plus one. The status module 462 determines whether the at least a retrieval number of slices of the set of slices is available by at least one of a variety of approaches. A first approach includes the status module 462 initiating a slice status query (e.g., issuing a slice status request 469) to at least one other DST execution unit 456 of the set of DST execution units 456. A second approach includes the status module 462 performing a slice location table lookup. A third approach includes the status module 462 interpreting one or more slice status messages 470 from one or more DST execution units 456 of the set of DST execution units 456. The status module 462 issues a storage and task status 472 including an indication of completion of the partial task on the data slice 466 and an indication whether the at least a retrieval number of slices of the set of slices is available from the other DST execution units 456 (e.g., a data segment recovery indicator).

With regards to deleting the data slice 466 based on execution of the partial task and ability to recover the data segment, the storage module 464 deletes the data slice 466 from the memory 88 by issuing a delete command 476 to the memory 88 when the at least a retrieval number of slices of the set of slices is available. When the at least a retrieval number of slices of the set of slices is not available, the storage module 464 determines whether execution of the task on the data segment is complete. The storage module 464 determines whether the execution of the task on the data segment is complete by at least one of a varieties of task checking approaches. A first task checking approach includes the storage module 464 interpreting one or more partial results resulting from execution of partial task processing on the decode threshold number of data slices. A second task checking approach includes the storage module 464 initiating a pending partial task processing query to at least one other DST execution unit 456 of the set of DST execution units 456. A third task checking approach includes the storage module 464 interpreting one or more partial task processing messages 474 from one or more DST execution units 456 of the set of DST execution units 456. When execution of the task is complete, the storage module 464 issues the delete command 476 the memory 88 to delete the data slice from the memory 88.

When the at least a retrieval number of slices of the set of slices is not available and the execution of the task on the data segment is not complete, the storage module 464 maintains storage of the data slice 466 in the memory 88. When the execution of the task is complete, the storage module 464 identifies one or more other DST execution units 456 of the set of DST execution units 456 associated with one or more of the remaining slices and issues delete slice requests 478 to the one or more other DST execution units 456.

Figure 41E:
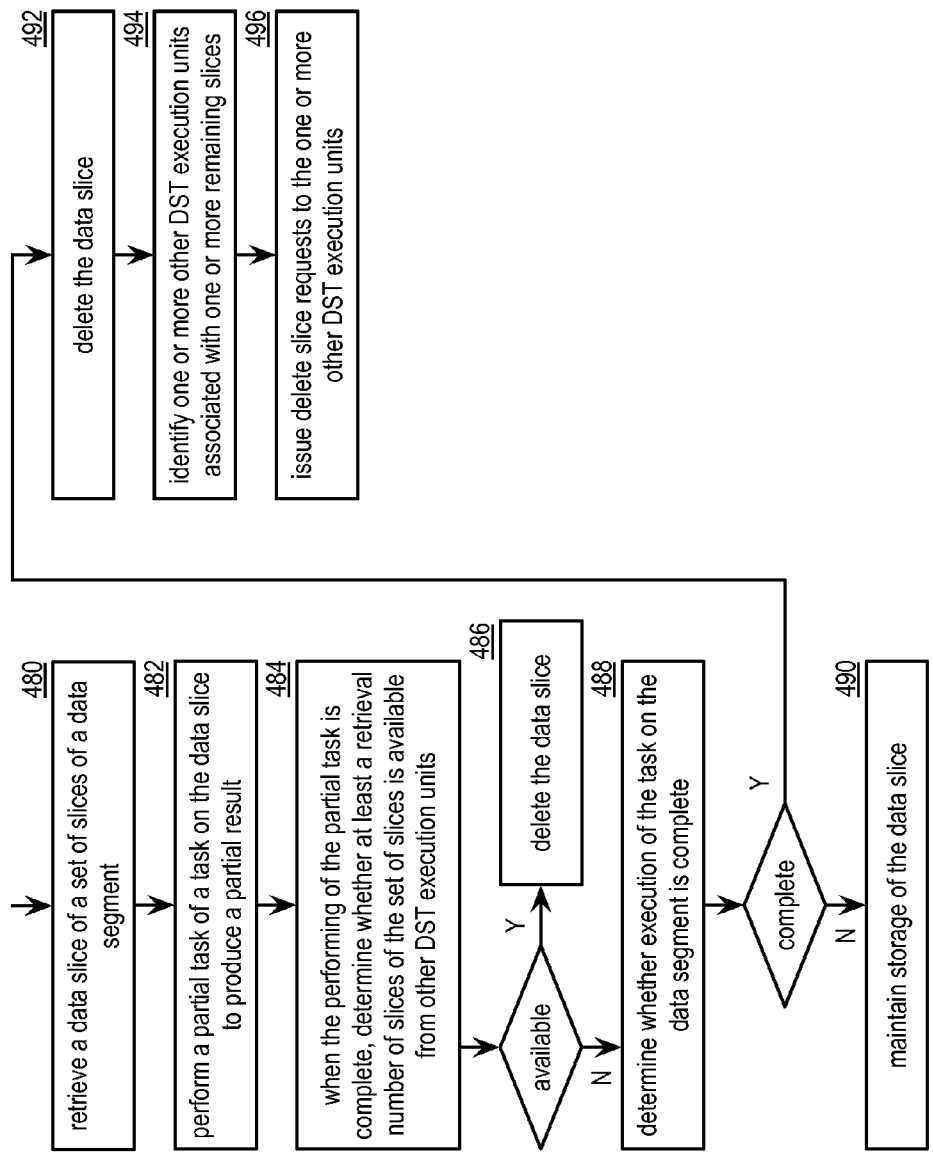
FIG. 41E is a flowchart illustrating an example of managing memory utilization in accordance with the present invention.

FIG. 41E is a flowchart illustrating an example of managing memory utilization in a distributed storage and task (DST) execution unit. The method begins at step 480 where a processing module of the DST execution unit retrieves a data slice from a local memory for execution of a partial task on the data slice, where a data segment is dispersed storage error encoded to produce a set of slices for storage in a set of DST execution units that includes the DST execution unit. The set of slices includes error coded slices and a decode threshold number of data slices that includes the data slice. The partial task is one of a set of partial tasks of a task being executed on the data segment. The method continues at step 482 where the processing module performs the partial task on the data slice to produce a partial result.

When the performing of the partial task is complete, the method continues at step 484 where the processing module determines whether at least a retrieval number of slices of the set of slices is available from other DST execution units of the set of DST execution units. The determining whether the at least a retrieval number of slices of the set of slices is available includes at least one of a variety of approaches. A first approach includes initiating a slice status query to at least one other DST execution unit of the set of DST execution units. A second approach includes performing a slice location table lookup. A third approach includes interpreting one or more slice status messages from one or more DST execution units of the set of DST execution units. The method branches to step 488 when the at least a retrieval number of slices of the set of slices is not available. The method continues to step 486 when the at least a retrieval number of slices of the set of slices is available. When the at least a retrieval number of slices of the set of slices is available, the method continues at step 486 where the processing module deletes the data slice from the local memory.

When the at least a retrieval number of slices of the set of slices is not available, the method continues at step 488 where the processing module determines whether execution of the task on the data segment is complete. The determining whether the execution of the task on the data segment is complete comprises at least one of a variety of approaches. A first approach includes interpreting one or more partial results resulting from execution of partial task processing on the decode threshold number of data slices. A second approach includes initiating a pending partial task processing query to at least one other DST execution unit of the set of DST execution units. A third approach includes interpreting one or more partial task processing messages from one or more DST execution units of the set of DST execution units. The method branches to step 492 when the execution of the task is complete. The method continues to step 490 when the execution of the task is not complete. When the at least a retrieval number of slices of the set of slices is not available and the execution of the task on the data segment is not complete, the method continues at step 490 where the processing module maintains storage of the data slice in the local memory.

When execution of the task is complete, the method continues at step 492 where the processing module deletes the data slice from the local memory. The method continues at step 494 where the processing module identifies one or more other DST execution units of the set of DST execution units associated with one or more remaining slices (e.g., a lookup, initiating a query, receiving a message). The method continues at step 496 where the processing module issues delete slice requests to the one or more other DST execution units.

Figure 42A:
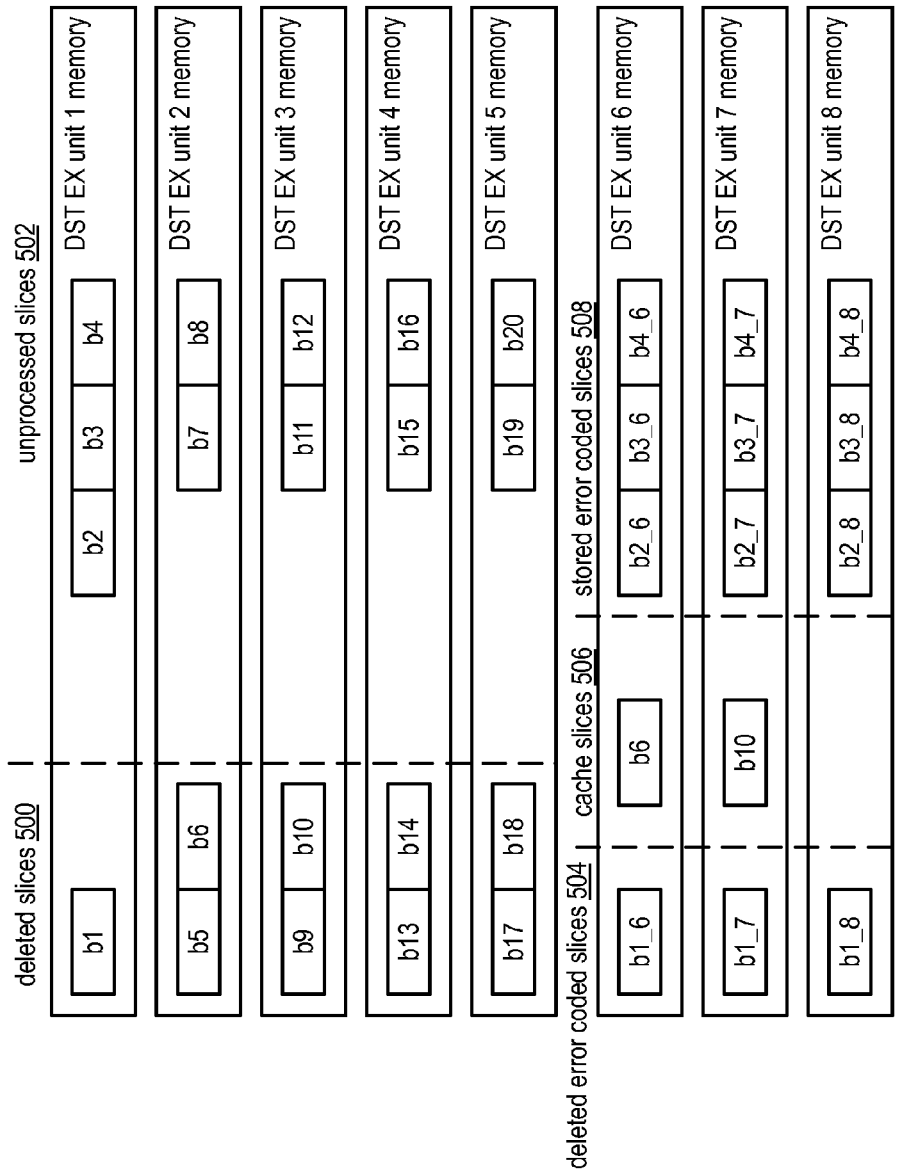
FIG. 42A is a schematic block diagram of another set of DST execution unit memories in accordance with the present invention.

FIG. 42A is a schematic block diagram of another set of distributed storage and execution (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory) of remaining slices of a pillar width number of slices when the decode threshold number is 5 and a pillar width number is 8.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2, b3, and b4 of DST execution unit 1 memory remain unprocessed as unprocessed slices 502 and slice b1 has been processed and deleted, as part of deleted slices 500, in accordance with a partial task that indicates slices are to be processed to produce partial results and are no longer required for further processing. As such, a slice stored in a DST execution unit memory may be deleted to provide more storage capacity when no further processing is required on the slice and the slice is not required to rebuild another slice that is still required for processing. For example, at time t1, each data slice (e.g., b1, b5, b9, b13, b17) of a first data segment has been processed and deleted (e.g., included in the deleted slices 500) since there is no requirement to store the data segment after it has been processed.

When a data slice has been processed, the data slice may be deleted in accordance with a data slice deletion policy. The policy may include a requirement to maintain at least a decode threshold number of data slices and/or error coded slices of a common data segment to enable rebuilding any one of the data slices. The policy may further include an indicator enabling a temporary transfer of a processed slice to another DST execution unit such that the processed slice may be deleted from a DST execution unit memory. For example, at time t1, data slices b6, b10, b14, and b18 of a second common data segment have been processed, data slices b6 and b10 have been transferred to DST execution units 6 and 7 as cache slices 506, and data slices b6, b10, b14, and b18 have been deleted from DST execution units 2-5 leaving a decode threshold plus 1 number of data slices and/or error coded slices (e.g., data slices b10 and b6 stored in DST execution units 6 and 7, and b2 stored in DST execution unit 1 as the cache slices 506; and error coded slices b2_6, b2_7, and b2_8 stored in DST execution units 6-8 as stored error coded slices 508). In an instance of rebuilding, data slices b10, and b6 and error coded slices b2_6, b2_7, and b2_8 form a decode threshold number of slices which may be utilized to rebuild data slice b2 when data slice b2 is in a slice error condition (e.g., a missing slice, a corrupted slice) and data slice b2 is still required for processing a sub-task.

Error coded slices that correspond to slices of a data segment that have not been deleted are maintained in corresponding DST execution unit memories 6-8 as one or more of the stored error coded slices 508 and the cache slices 506 may be required to rebuild one or more data slices of the common data segment when the one or more data slices are in the slice error condition. Error coded slices that correspond to slices of a deleted data segment may also be deleted and are included in deleted error coded slices 504. For example, error coded slices b1_6 through b1_8 are deleted when corresponding data slices (e.g., b1, b5, b9, b13, b17) have been deleted subsequent to processing of the data slices. A method to process sub-tasks on data slices that includes deleting the data slices is described in greater detail with reference to FIG. 42B.

Figure 42B:
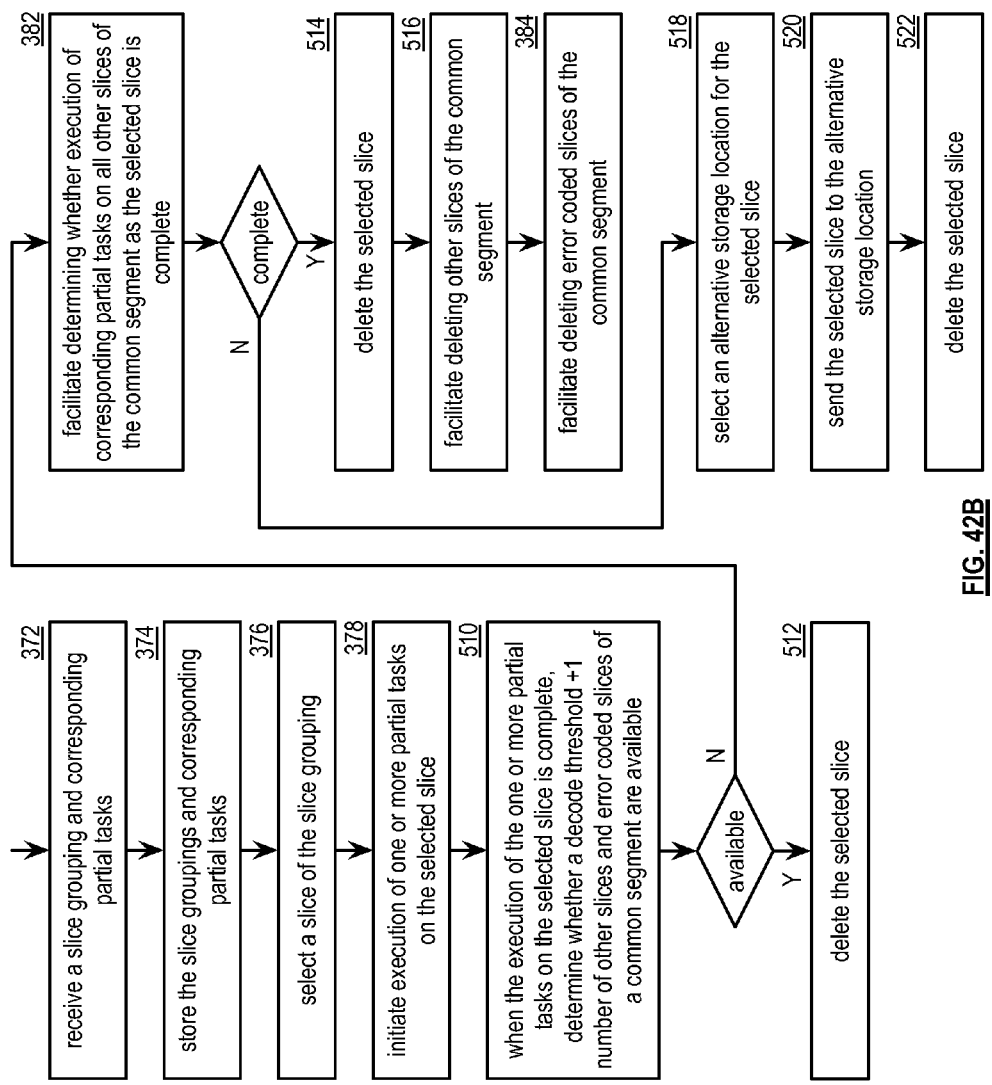
FIG. 42B is a flowchart illustrating another example of processing sub-tasks on a slice in accordance with the present invention.

FIG. 42B is a flowchart illustrating another example of processing sub-tasks on a slice, which includes similar steps to FIG. 40D. The method begins with steps 372-378 of FIG. 40D where a processing module (e.g., of a distributed storage and task (DST) execution module) receives a slice grouping and corresponding partial tasks, stores the slice grouping and corresponding partial tasks (e.g., in a local memory), selects a slice of the slice grouping, and initiates execution of one or more partial tasks on the selected slice.

When execution of the one or more partial tasks on the selected slice is complete, the method continues at step 510 where the processing module determines whether a decode threshold plus 1 number of other data slices and/or error coded slices of a common data segment of the selected slice are available. The determining includes identifying slices stored in a set of DST execution units. The method branches to step 382 of FIG. 40D when the processing module determines that the decode threshold plus 1 number of other slices and error coded slices of the common data segment are not available. The method continues to step 512 when the processing module determines that the decode threshold plus 1 number of other slices and error coded slices of the common data segment are available. The method continues at step 512 where the processing module deletes the selected slice (e.g., from a local memory, in a DST execution unit by issuing a delete slice request). The processing module may repeat the method for a different selected slice of the slice grouping.

The method continues with step 382 of FIG. 40D where the processing module facilitates determining whether execution of corresponding partial tasks on all other slices of the common data segment is complete when the processing module determines that the decode threshold plus 1 number of other slices and error coded slices of the common data segment are not available. The method branches to step 518 when the processing module determines that the execution of corresponding partial tasks on all other slices of the common data segment is not complete. The method continues to step 514 when the processing module determines that the execution of corresponding partial tasks on all other slices of the common data segment is complete.

The method continues at step 514 where the processing module deletes the selected slice (e.g., from the local memory, by issuing the delete request to another DST execution unit). The method continues at step 516 where the processing module facilitates deleting other slices of the common data segment, where the other slices includes slices transferred from a DST execution unit storing a data slice to a DST execution unit utilized to store error coded slices. The facilitating includes one or more of outputting a query to other DST execution units associated with the other data slices of the common data segment, outputting a delete slice request to the other DST execution units, and sending a request to delete the slices to a DST client module. The method continues with step 384 of FIG. 40D where the processing module facilitates deleting error coded slices of the common data segment.

The method continues at step 518 where the processing module selects an alternative storage location for the selected slice when the processing module determines that the execution of corresponding partial tasks on all other slices of the common data segment is not complete. The selecting may be based on one or more of a DST execution unit storage capacity level indicator, a DST execution unit performance level indicator, an estimated storage time indicator, a DST execution unit availability indicator, a predetermination, and a lookup. For example, the processing module selects a DST execution unit associated with storing an error coded slice of the common data segment as the alternative storage location when a DST exclusion unit storage capacity level indicator associated with the DST execution unit compares favorably to a storage capacity level threshold. The method continues at step 520 where the processing module sends the selected slice to the alternative storage location for storage therein. The sending may include generating a write slice request that includes the selected slice, sending the write slice request to the alternative storage location, and updating a slice storage location table to indicate that the selected slice is associated with the alternative storage location. The method continues at step 522 where the processing module deletes the selected slice (e.g., from the local memory, by issuing the delete request to another DST execution unit).

Figure 43A:
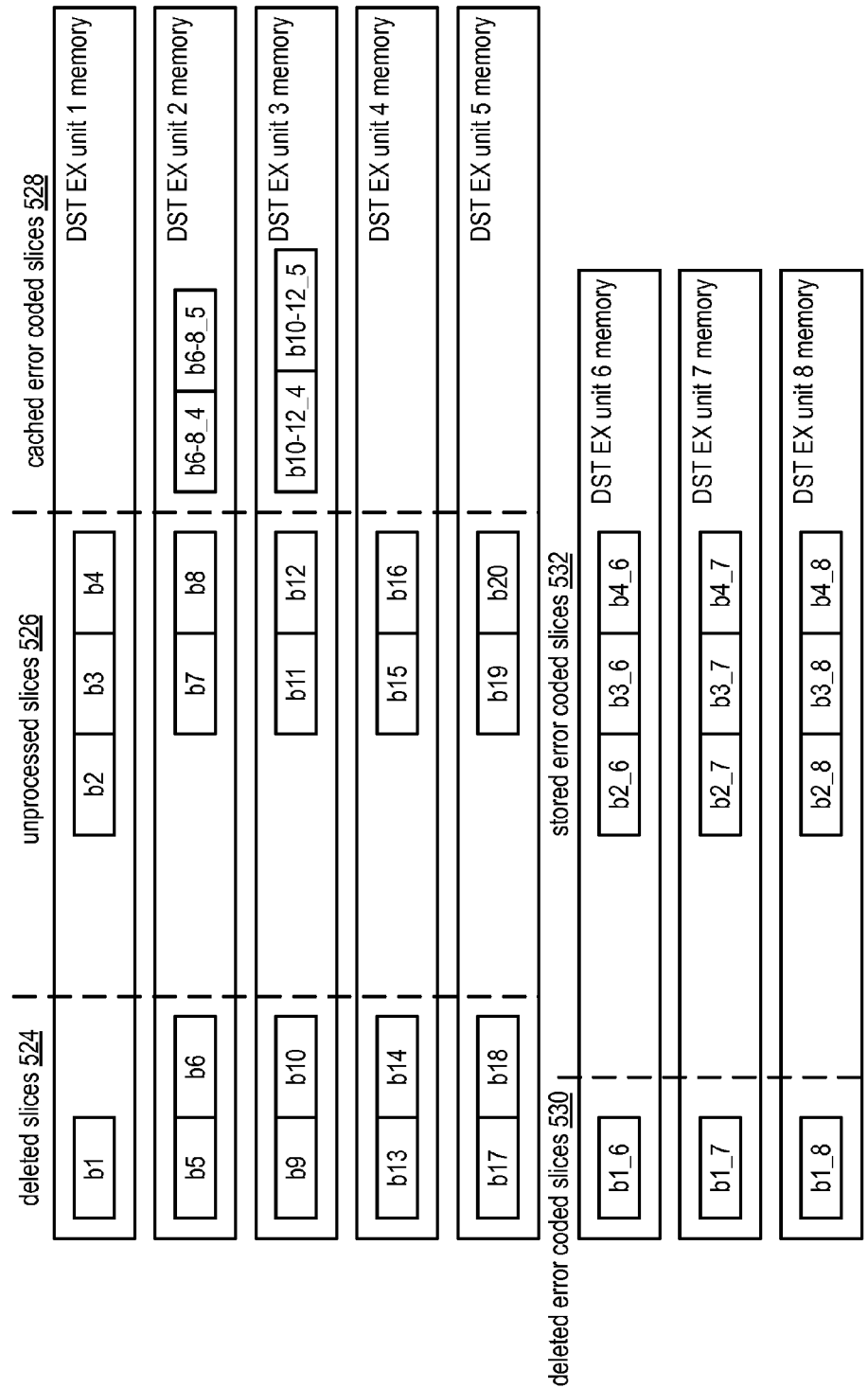
FIG. 43A is a schematic block diagram of another set of DST execution unit memories in accordance with the present invention.

FIG. 43A is a schematic block diagram of another set of distributed storage and execution (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory) of remaining slices of a pillar width number of slices when the decode threshold number is 5 and a pillar width number is 8.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2, b3, and b4 of DST execution unit 1 memory remain unprocessed as unprocessed slices 526 and slice b1 has been processed and deleted, as part of deleted slices 524, in accordance with a partial task that indicates slices are to be processed to produce partial results and are no longer required for further processing. As such, a slice stored in a DST execution unit memory may be deleted to provide more storage capacity when no further processing is required on the slice and the slice is not required to rebuild another slice that is still required for processing. For example, at time t1, each data slice (e.g., b1, b5, b9, b13, b17) of a first data segment has been processed and deleted, as deleted slices 524, since there is no requirement to store the data segment after it has been processed.

When a data slice has been processed, the data slice may be deleted in accordance with a data slice deletion policy. The policy may include a requirement to maintain at least a decode threshold number of data slices and/or error coded slices of a common data segment to enable rebuilding any one of the data slices. The policy may further include an indicator enabling generation and storage of additional error coded slices corresponding to processed data slices such that the processed slices may be deleted from a DST execution unit memory. For example, at time t1, data slices b6, b10, b14, and b18 of a second common data segment have been processed, data slices b6 and b10 have been utilized in encoding of additional error coded slices, the additional error coded slices have been stored in DST execution unit memories 2 and 3 as cached error coded slices 528, and data slices b6, b10, b14, and b18 have been deleted from DST execution units 2-5 leaving a decode threshold plus 1 number of recoverable slices enabling rebuilding of any data slice of the common data segment. The recoverable slices includes one or more of data slices, additional error coded slices, and error coded slices. For example, the data slices includes slice b2 stored in DST execution unit 1 memory as part of unprocessed slices 526, the additional error coded slices includes additional error coded slices b6-8_4 and b6-8_5 stored in DST execution unit 2 memory as part of cached error coded slices 528 (e.g. which may be utilized to rebuild slice b6 or b7) and additional error coded slices b10-12_4 and b10-12_5 stored in DST execution unit 3 memory as part of cached error coded slices 528 (e.g. which may be utilized to rebuild slice b10 or b11), and the error coded slices includes error coded slices b2_6, b2_7, and b2_8 stored in DST execution units 6-8 as stored error coded slices 532. In an instance of rebuilding, data slice b6 is rebuilt from additional error coded slices b6-8_4 and b6-8_5, data slice b10 is rebuilt from additional error coded slices b10-12_4 and b10-12_5, and data slice b2 is rebuilt utilizing data slices b6 and b10 and error coded slices b2_6, b2_7, and b2_8 when data slice b2 is in a slice error condition (e.g., a missing slice, a corrupted slice) and data slice b2 is still required for processing a sub-task.

Error coded slices that correspond to slices of a data segment that have not been deleted are maintained in corresponding DST execution unit memories 6-8 as the error coded slices may be required to rebuild one or more data slices of the common data segment when the one or more data slices are in the slice error condition. Error coded slices that correspond to slices of a deleted data segment may also be deleted as deleted error coded slices 530. For example, error coded slices b1_6 through b1_8 are deleted, and included in the deleted error coded slices 530, when corresponding data slices (e.g., b1, b5, b9, b13, b17) have been deleted subsequent to processing of the data slices. A method to process sub-tasks on data slices that includes deleting the data slices is described in greater detail with reference to FIG. 43B.

Figure 43B:
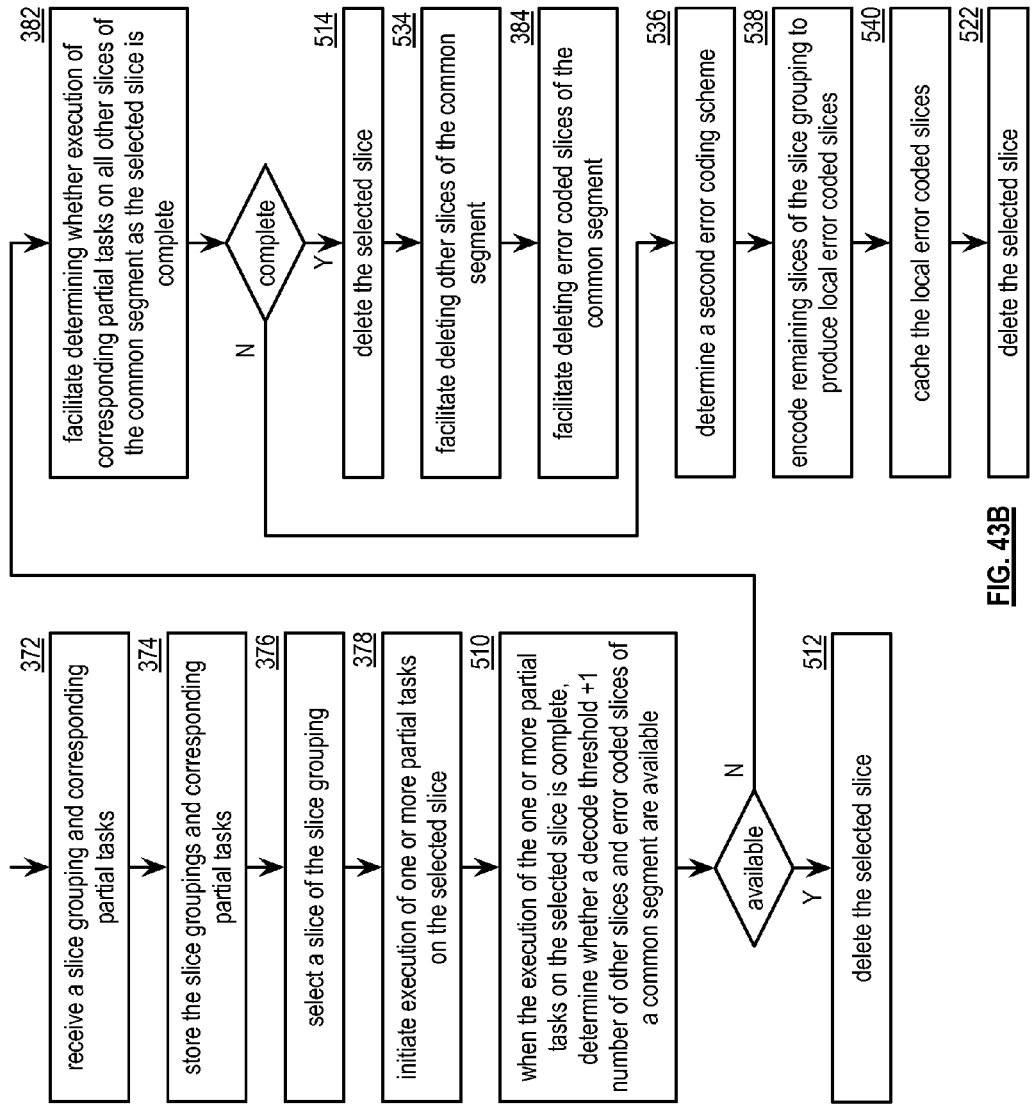
FIG. 43B is a flowchart illustrating another example of processing sub-tasks on a slice in accordance with the present invention.

FIG. 43B is a flowchart illustrating another example of processing sub-tasks on a slice, which includes similar steps to FIGS. 40D and 42B. The method begins with steps 372-378 of FIG. 40D where a processing module (e.g., of a distributed storage and task (DST) execution module) receives a slice grouping and corresponding partial tasks, stores the slice grouping and corresponding partial tasks (e.g., in a local memory), selects a slice of the slice grouping, and initiates execution of one or more partial tasks on the selected slice.

When execution of the one or more partial tasks on the selected slice is complete, the method continues with step 510 of FIG. 42B where the processing module determines whether a decode threshold plus 1 number of other data slices and/or error coded slices of a common data segment of the selected slice are available. The method branches to step 382 of FIG. 40D when the processing module determines that the decode threshold plus 1 number of other slices and error coded slices of the common data segment are not available. The method continues to step 512 of FIG. 42B when the processing module determines that the decode threshold plus 1 number of other slices and error coded slices of the common data segment are available. The method continues with step 512 of FIG. 42B where the processing module deletes the selected slice. The processing module may repeat the method for a different selected slice of the slice grouping.

The method continues with step 382 of FIG. 40D where the processing module facilitates determining whether execution of corresponding partial tasks on all other slices of the common data segment is complete when the processing module determines that the decode threshold plus 1 number of other slices and error coded slices of the common data segment are not available. The method branches to step 536 when the processing module determines that the execution of corresponding partial tasks on all other slices of the common data segment is not complete. The method continues to step 514 of FIG. 42B when the processing module determines that the execution of corresponding partial tasks on all other slices of the common data segment is complete.

The method continues with step 514 of FIG. 42B where the processing module deletes the selected slice. The method continues at step 534 where the processing module facilitates deleting other slices of the common data segment, where the other slices includes additional error coded slices generated by encoding remaining slices of a common slice grouping. The facilitating includes one or more of outputting a query to other DST execution units associated with the other data slices of the common data segment, outputting a delete slice request to the other DST execution units, and sending a request to delete the slices to a DST client module. The method continues with step 384 of FIG. 40D where the processing module facilitates deleting error coded slices (e.g., stored in DST execution units associated with the error coded slices) of the common data segment.

The method continues at step 536 where the processing module determines a second error coding scheme when the processing module determines that the execution of corresponding partial tasks on all other slices of the common data segment is not complete. The determining may be based on one or more of a number of remaining unprocessed data slices of a slice grouping associated with the selected slice, a processed selected slice pending deletion, a reliability requirement, a storage capacity level indicator, a performance level indicator, an estimated storage time indicator, an availability indicator, a predetermination, and a lookup. For example, the processing module determines the second error coding scheme to include a decode threshold of 3 and a pillar width of 5 when two data slices of the slice grouping remain to be processed and a reliability requirement indicates a need to rebuild at least two of the remaining data slices when a slice error condition exists.

The method continues at step 538 where the processing module encodes the remaining slices of the slice grouping utilizing the second error coding scheme to produce additional local error coded slices. For example, the processing module encodes a processed selected data slice b6, and remaining unprocessed data slices b7 and b8 to produce two additional local error coded slices b6-8_4 and b6-8_5 when the second error coding scheme includes a decode threshold of 3 and a pillar width of 5. The method continues at step 540 where the processing module caches the additional local error coded slices. For example, the processing module stores additional local error coded slices b6-8_4 and b6-8_5 in the local memory. The method continues with step 522 of FIG. 42B where the processing module deletes the selected slice.

Figure 44A:
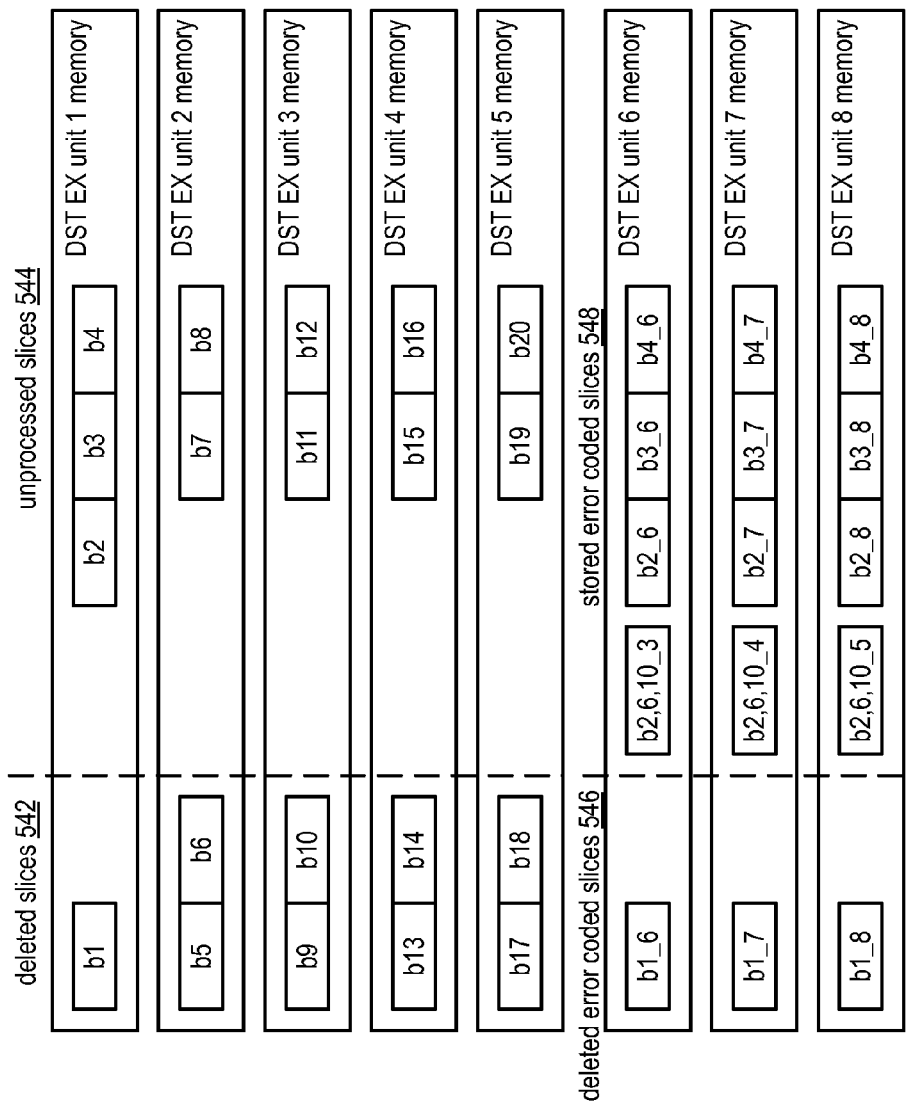
FIG. 44A is a schematic block diagram of another set of DST execution unit memories in accordance with the present invention.

FIG. 44A is a schematic block diagram of another set of distributed storage and execution (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory) of remaining slices of a pillar width number of slices when the decode threshold number is 5 and a pillar width number is 8.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2, b3, and b4 of DST execution unit 1 memory remain unprocessed as unprocessed slices 544 and slice b1 has been processed and deleted, as part of deleted slices 542, in accordance with a partial task that indicates slices are to be processed to produce partial results and are no longer required for further processing. As such, a slice stored in a DST execution unit memory may be deleted to provide more storage capacity when no further processing is required on the slice and the slice is not required to rebuild another slice that is still required for processing. For example, at time t1, each data slice (e.g., b1, b5, b9, b13, b17) of a first data segment has been processed and deleted, as deleted slices 542, since there is no requirement to store the data segment after it has been processed.

When a data slice has been processed, the data slice may be deleted in accordance with a data slice deletion policy. The policy may include a requirement to maintain at least a decode threshold number of data slices and/or error coded slices of a common data segment to enable rebuilding any one of the data slices. The policy may further include an indicator enabling generation and storage of additional error coded slices corresponding to processed and unprocessed data slices such that the processed slices may be deleted from a DST execution unit memory. For example, at time t1, data slices b6, b10, b14, and b18 of a second common data segment have been processed, data slices b2, b6, and b10 have been utilized in encoding of additional error coded slices, the additional error coded slices have been stored in DST execution unit memories 6-8 as part of stored error coded slices 548, and data slices b6, b10, b14, and b18 have been deleted from DST execution units 2-5, as part of deleted slices 542, leaving a decode threshold plus 1 number of recoverable slices enabling rebuilding of any data slice of the common data segment.

The recoverable slices include one or more of data slices, additional error coded slices, and error coded slices. For example, the data slices includes slice b2 stored in DST execution unit 1 memory, the additional error coded slices includes additional error coded slices b2,6,10_3, b2,6,10_4, and b2,6,10_5 stored in DST execution unit memories 6-8 (e.g. which may be utilized to rebuild slice b2, b6 or b10), and the error coded slices includes error coded slices b2_6, b2_7, and b2_8 stored in DST execution units 6-8. In an instance of rebuilding, data slice b6 is rebuilt from additional error coded slices b2,6,10_3, b2,6,10_4, and b2,6,10_5, data slice b10 is rebuilt from additional error coded slices b2,6, 10_3, b2,6,10_4, and b2,6,10_5, and data slice b2 is rebuilt utilizing rebuilt data slices b6 and b10 and error coded slices b2_6, b2_7, and b2_8 when data slice b2 is in a slice error condition (e.g., a missing slice, a corrupted slice) and data slice b2 is still required for processing a sub-task. Alternatively, data slice b2 may be rebuilt from additional error coded slices b2, 6, 10_3, b2,6, 10_4, and b2,6, 10_5 when the additional error coded data slices are generated from data slices b2, b6, and b10 utilizing a second error coding scheme that includes a decode threshold of 3 and a pillar width of 6.

Error coded slices that correspond to slices of a data segment that have not been deleted are maintained in corresponding DST execution unit memories 6-8 as the error coded slices may be required to rebuild one or more data slices of the common data segment when the one or more data slices are in the slice error condition. Error coded slices that correspond to slices of a deleted data segment may also be deleted as part of deleted error coded slices 546. For example, error coded slices b1_6 through b1_8 are deleted, and included as deleted error coded slices 546, when corresponding data slices (e.g., b1, b5, b9, b13, b17) have been deleted subsequent to processing of the data slices. A method to process sub-tasks on data slices that includes deleting the data slices is described in greater detail with reference to FIG. 44B.

Figure 44B:
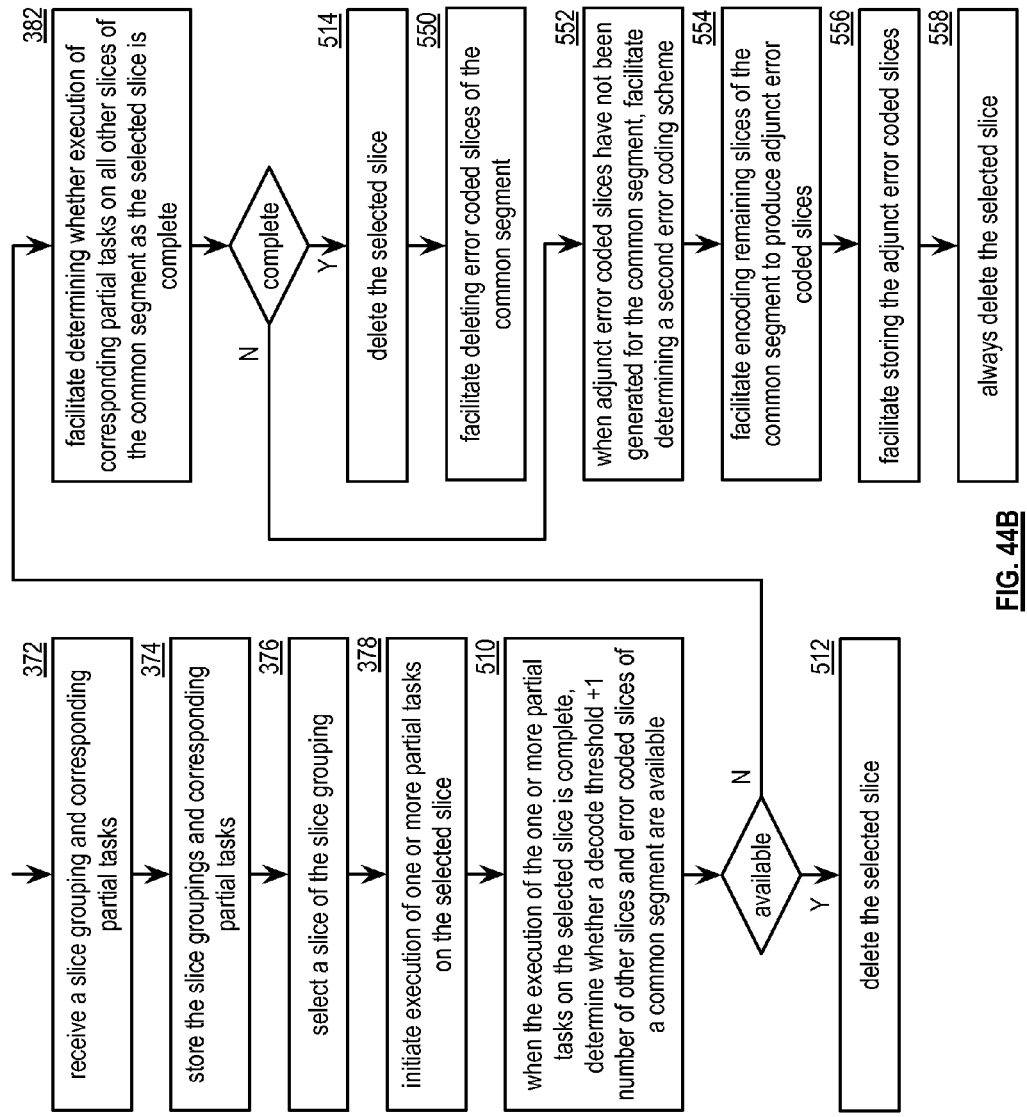
FIG. 44B is a flowchart illustrating another example of processing sub-tasks on a slice in accordance with the present invention.

FIG. 44B is a flowchart illustrating another example of processing sub-tasks on a slice, which includes similar steps to FIGS. 40D and 42B. The method begins with steps 372-378 of FIG. 40D where a processing module (e.g., of a distributed storage and task (DST) execution module) receives a slice grouping and corresponding partial tasks, stores the slice grouping and corresponding partial tasks (e.g., in a local memory), selects a slice of the slice grouping, and initiates execution of one or more partial tasks on the selected slice.

When execution of the one or more partial tasks on the selected slice is complete, the method continues with step 510 of FIG. 42B where the processing module determines whether a decode threshold plus 1 number of other data slices and/or error coded slices of a common data segment of the selected slice are available. The method branches to step 382 of FIG. 40D when the processing module determines that the decode threshold plus 1 number of other slices and error coded slices of the common data segment are not available. The method continues to step 512 of FIG. 42B where the processing module deletes the selected slice when the processing module determines that the decode threshold plus 1 number of other slices and error coded slices of the common data segment are available. The method continues with step 512 of FIG. 42B where the processing module deletes the selected slice. The processing module may repeat the method for a different selected slice of the slice grouping.

The method continues with step 382 of FIG. 40D where the processing module facilitates determining whether execution of corresponding partial tasks on all other slices of the common data segment is complete when the processing module determines that the decode threshold plus 1 number of other slices and error coded slices of the common data segment are not available. The method branches to step 552 when the processing module determines that the execution of corresponding partial tasks on all other slices of the common data segment is not complete. The method continues to step 514 of FIG. 42B when the processing module determines that the execution of corresponding partial tasks on all other slices of the common data segment is complete.

The method continues with step 514 of FIG. 42B where the processing module deletes the selected slice. The method continues at step 550 where the processing module facilitates deleting all error coded slices of the common data segment, where the error coded slices includes adjunct error coded slices generated by encoding remaining slices of a common data segment. The facilitating includes one or more of outputting a query to other DST execution units associated with the error coded data slices of the common data segment, outputting a delete slice request to the other DST execution units, and sending a request to delete the error coded slices to a DST client module.

When the adjunct error coded slices have not been generated for the common data segment (e.g., when processing a previous selected slice), the method continues at step 552 where the processing module facilitates determining a second error coding scheme when the processing module determines that the execution of corresponding partial tasks on all other slices of the common data segment is not complete. The facilitating includes at least one of determining the second error coding scheme and sending a determine second error coded scheme request to a DST client module. The determining may be based on one or more of a number of remaining processed and/or unprocessed data slices of the common data segment associated with the selected slice, a processed selected slice pending deletion, a reliability requirement, a storage capacity level indicator, a performance level indicator, an estimated storage time indicator, an availability indicator, a predetermination, and a lookup. For example, the processing module determines the second error coding scheme to include a decode threshold of 3 and a pillar width of 6 when three data slices of the common data segment remain and a reliability requirement indicates a need to rebuild any of the remaining data slices when a slice error condition exists.

The method continues at step 554 where the processing module facilitates encoding the remaining slices of the common data segment utilizing the second error coding scheme to produce adjunct error coded slices. For example, the processing module encodes processed data slices b6 and b10 and remaining unprocessed data slice b2 of the common data segment utilizing the second error coding scheme to produce three adjunct error coded slices b2,6,10_3, b2,6, 10_4, and b2,6,10_5 when the second error coding scheme includes a decode threshold of 3 and a pillar width of 6. The method continues at step 556 where the processing module facilitates storing the adjunct error coded slices. The facilitating includes at least one of sending the adjunct error coded slices to DST execution units associated with storing error coded slices, sending a store adjunct error coded slices request to a DST client module, and updating a slice location table to indicate that the adjunct error coded slices are stored in the DST execution units associated with storing error coded slices. The method continues at step 558 where the processing module always deletes the selected slice when adjunct error coded slices have not been generated for the common data segment or when adjunct error coded slices have been generated for the common data segment. The deleting includes one or more of deleting the selected slice from the local memory and repeating the process for a different selected slice.

Figure 45A:
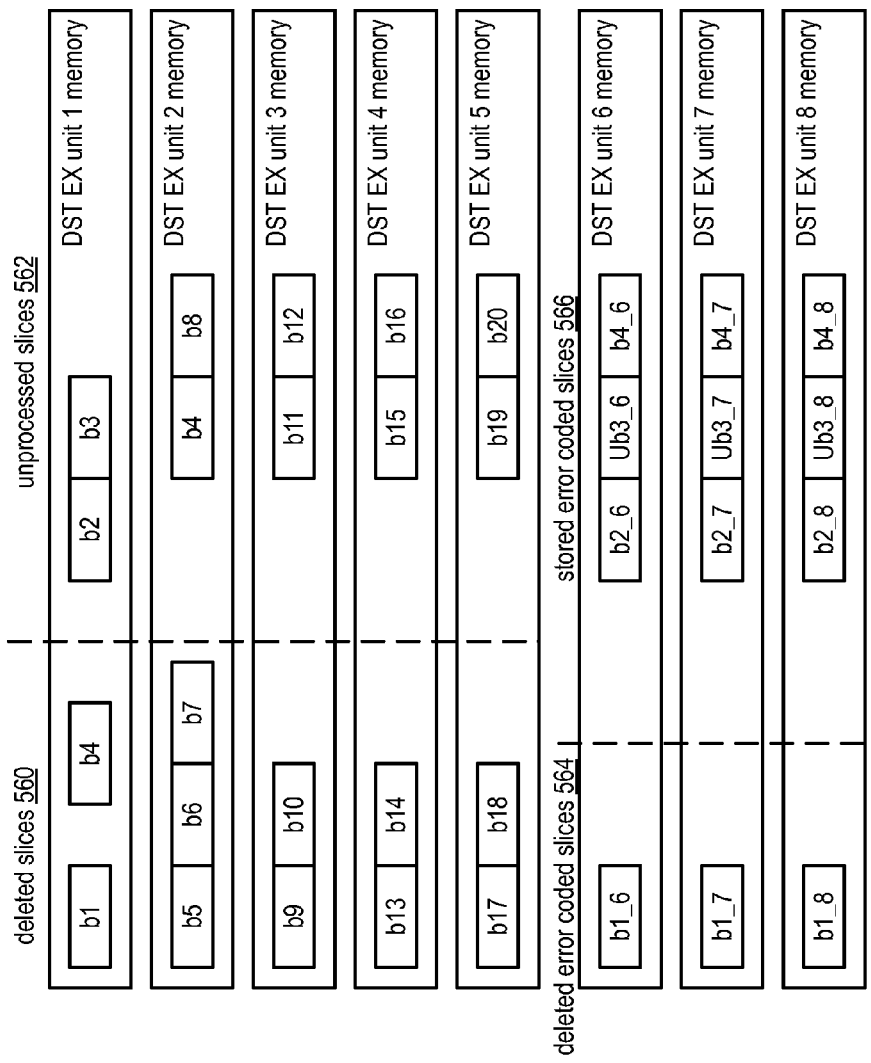
FIG. 45A is a schematic block diagram of another set of DST execution unit memories in accordance with the present invention.

FIG. 45A is a schematic block diagram of another set of distributed storage and execution (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store error coded data slices (e.g., slices b1_6 through b4_6 in DST execution unit 6 memory, slices b1_7 through b4_7 in DST execution unit 7 memory, slices b1_8 through b4_8 in DST execution unit 8 memory) of remaining slices of a pillar width number of slices when the decode threshold number is 5 and a pillar width number is 8.

The DT execution modules may execute one or more corresponding partial tasks on data slices retrieved from a corresponding DST execution unit memory at varying execution rates such that one DT execution module may substantially finish execution of partial tasks assigned to the DT execution module ahead of other DT execution modules. For example, at a time t1, slices b2 and b3 of DST execution unit 1 memory remain unprocessed, as unprocessed slices 562, and slice b1 has been processed and deleted, as part of deleted slices 560, in accordance with a partial task that indicates slices are to be processed to produce partial results and are no longer required for further processing. In addition, slice b4 has been transferred to DST execution unit 2 memory for processing and has been deleted from DST execution unit 1 memory. As such, a slice stored in a DST execution unit memory may be deleted to provide more storage capacity when no further processing is required on the slice by a previously assigned DST execution unit and the slice is not required to rebuild another slice that is still required for processing. For example, at time t1, each data slice (e.g., b1, b5, b9, b13, b17) of a first data segment has been processed and deleted, as part of deleted slices 560, since there is no requirement to store the data segment after it has been processed.

When a data slice has been processed, the data slice may be deleted in accordance with a data slice deletion policy. The policy may include a requirement to maintain at least a decode threshold number of data slices and/or error coded slices of a common data segment to enable rebuilding any one of the data slices. The policy may further include an indicator enabling transfer of a data slice from an unfavorably performing DST execution unit to a favorably performing DST execution unit and updating of associated error coded slices corresponding to a common data segment. For example, at time t1, a favorably performing second DST execution unit has processed partial tasks on slices b5, b6 and b7, has deleted slices b5 and b6, has facilitated transfer of data slice b4 from DST execution unit 1 memory to the DST execution unit 2 memory, has facilitated updating of error coded slices associated with a third data segment based on slices b7 and b4 to produce updated error coded slices Ub3_6, Ub3_7, and Ub3_8, has facilitated storing the updated error coded slices in DST execution unit memories 6-8 as part of stored error coded slices 566, has facilitated overwriting slice b7 with slice b4 of the third data segment in the DST execution unit 2 memory (e.g., and thus deleting slice b7), and has facilitated deleting slice b4 from the DST execution unit 1 memory.

Error coded slices that correspond to slices of a data segment that have not been deleted are maintained in corresponding DST execution unit memories 6-8 as the error coded slices may be required to rebuild one or more data slices of the common data segment when the one or more data slices are in the slice error condition. Error coded slices that correspond to slices of a deleted data segment may also be deleted. For example, error coded slices b1_6 through b1_8 are deleted, and included as part of deleted error coded slices 564, when corresponding data slices (e.g., b1, b5, b9, b13, b17) have been deleted subsequent to processing of the data slices. A method to process sub-tasks on data slices that includes transferring a data slice and updating associated error coded data slices is described in greater detail with reference to FIG. 45B.

Figure 45B:
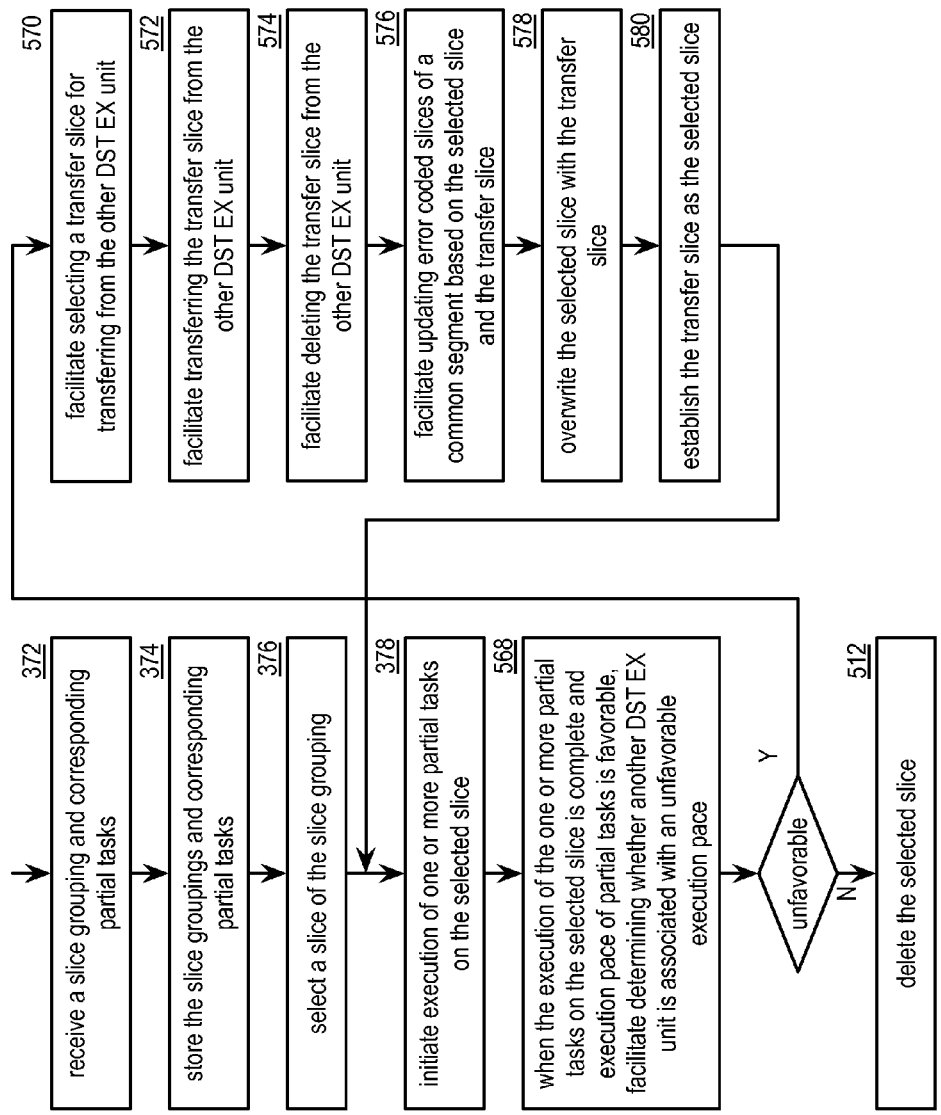
FIG. 45B is a flowchart illustrating another example of processing sub-tasks on a slice in accordance with the present invention.

FIG. 45B is a flowchart illustrating another example of processing sub-tasks on a slice, which includes similar steps to FIGS. 40D and 42B. The method begins with steps 372-378 of FIG. 40D where a processing module (e.g., of a distributed storage and task (DST) execution module) receives a slice grouping and corresponding partial tasks, stores the slice grouping and corresponding partial tasks (e.g., in a local memory), selects a slice of the slice grouping, and initiates execution of one or more partial tasks on the selected slice.

When execution of the one or more partial tasks on the selected slice is complete, and an execution pace of partial tasks on the slice grouping is favorable, the method continues at step 568 where the processing module facilitate determining whether another DST execution unit is associated with an unfavorable execution pace (e.g., partial tasks executed per unit of time and/or data slices processed per unit of time). The determining may further include determining that the execution pace of the partial tasks is favorable based on one or more of a comparison of the execution pace to an execution pace of another DST execution unit and comparison of the execution pace to an execution schedule. For example, the processing module determines that the execution pace of the partial tasks is favorable when the execution pace is faster than an average execution pace of a plurality of other DST execution units. The facilitating includes one or more of a lookup, sending an execution pace query to another DST execution unit, receiving a execution pace response, and comparing the execution pace response to an execution pace threshold. The method branches to step 570 when the processing module determines that another DST execution unit is associated with an unfavorable execution pace. The method continues to step 512 of FIG. 42B when the processing module determines that other DST execution units are associated with a favorable execution pace. The method continues with step 512 of FIG. 42B where the processing module deletes the selected slice. The deleting may include deleting associated error coded slices when processing of associated data slices of a common data segment is complete.

The method continues at step 570 where the processing module facilitates selecting a transfer slice for transferring from the other DST execution unit. For example, the processing module queries the other DST execution unit to identify a data slice scheduled for processing at the end of a list of data slices to be processed for a slice grouping assigned to the other DST execution unit. The method continues at step 572 where the processing module facilitates transferring the transfer slice from the other DST execution unit. For example, the processing module sends a read slice request to the other DST execution unit, wherein the request includes a slice name associated with the transfer slice. The method continues at step 574 where the processing module facilitates deleting the transfer slice from the other DST execution unit. For example, the processing module sends a delete slice request to the other DST execution unit, wherein the request includes the slice name associated with the transfer slice.

The method continues at step 576 where the processing module facilitates updating error coded slices of a common segment based on the selected slice and the transfer slice. The facilitating includes generating partial error recovery information, outputting the partial error recovery information to DST execution units storing error coded slices, and facilitating updating previously stored error coded slices of the DST execution units utilizing the partial error recovery information.

The generating partial error recovery information is based on one or more of the selected slice, the transfer slice, update information (e.g., a slice name, a revision number of the transfer slice, a generator matrix, an encoding matrix, a pillar number of the transfer slice, and a dispersed storage error coding function to produce a collection of error coded slices as partial error recovery information). The generating the one of the collection of partial error recovery information includes generating a first term of a corresponding one of the at least some of encoded data slices of the common data segment that includes the error recovery information based on the transfer slice in accordance with the dispersed storage error coding function, generating a second term of the corresponding one of the at least some of the encoded data slices that includes the error recovery information based on the selected slice in accordance with the dispersed storage error coding function, and performing a mathematical function (e.g., subtraction, exclusive OR) on the first and second terms to produce the one of the collection of partial error recovery information.

The generating the first term includes obtaining an encoding matrix of the dispersed storage error coding function, reducing the encoding matrix to produce a square matrix that excludes one or more rows including a row associated with the corresponding one of the at least some of the encoded data slices that includes the error recovery information, inverting the square matrix to produce an inverted matrix, matrix multiplying the inverted matrix by the transfer slice to produce a vector, and matrix multiplying the vector by a row of the encoding matrix corresponding to the corresponding one of the at least some of the encoded data slices that includes the error recovery information to produce the first term. The generating the second term includes matrix multiplying the inverted matrix by the selected slice to produce a second vector and matrix multiplying the second vector by the row of the encoding matrix corresponding to the corresponding one of the at least some of the encoded data slices that includes the error recovery information to produce the second term.

The outputting the partial error recovery information to DST execution units storing error coded slices includes outputting the collection of partial error recovery information for storage (e.g., as a portion of a transfer slice) in at least some of the set of DST execution units, which store the at least some of the error coded slices that include error recovery information.

The facilitating updating previously stored error coded slices of the DST execution units utilizing the partial error recovery information includes sending a update error coded slice request to the DST execution units such that each of the at least some of the set of DST execution units updates the error recovery information of a data slice of the at least some of the encoded data slices that includes the error recovery information based on a corresponding one of the collection of partial error recovery information to produce an updated error coded slice that includes updated error recovery information. The updating the error recovery information includes executing a mathematical function (e.g., summing, exclusive OR) on the error coded slice that includes the error recovery information and the corresponding one of the collection of partial error recovery information to produce the updated error coded slice that includes updated error recovery information. Next, the one of the at least some of the set of DST execution units stores the updated error coded slice that includes updated error recovery information.

The method continues at step 578 where the processing module overwrites the selected slice with the transfer slice. For example, the processing module overwrites the selected slice previously stored in the local memory with the transfer slice. The method continues at step 580 where the processing module establishes the transfer slice as the selected slice. The method repeats back to step 378 of FIG. 40D where the processing module initiates execution of one or more partial tasks on the selected slice and processes another slice of the slice grouping until each slice of the slice grouping has been processed.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for executing a task on data in a distributed computing system, the method comprises:
   encoding the data into pluralities of sets of encoded data slices, wherein a set of encoded data slices of the pluralities of sets of encoded data slices corresponds to a data chunk of a data chunkset, wherein a plurality of sets of encoded data slices of the pluralities of sets of encoded data slices corresponds to the data chunkset, and wherein a decode threshold number of encoded data slices of the set of encoded data slices are needed to recover the data chunk;

outputting the pluralities of sets of encoded data slices to distributed storage and task (DST) units of the distributed computing system, wherein a number of the DST units corresponds to a number of encoded data slices in a set of encoded data slices, and wherein each of the DST units stores a slice grouping of encoded data slices of the plurality of sets of encoded data slices of the corresponding data chunkset;

dividing the task into a decode threshold number of partial tasks;

sending a slice deletion policy to the DST units;

on a data chunkset by data chunkset basis:
  selecting a decode threshold number of DST units from the DST units;
  assigning the decode threshold number of partial tasks to the decode threshold number of DST units;
  executing, by each DST unit of the decode threshold number of DST units on a data chunk by data chunk basis, a corresponding one of the decode threshold number of partial tasks on the corresponding slice grouping of encoded data slices for a given data chunkset to produce a partial result; and
  deleting, by the DST units, the plurality of sets of encoded data slices of the given data chunkset in accordance with the slice deletion policy.

2. The method of claim 1 further comprises:
generating a result for the given data chunkset based on the partial results.

3. The method of claim 1, wherein the executing the corresponding one of the decode threshold number of partial tasks further comprises:
  determining, by a DST unit of the decode threshold number of DST units, that an encoded data slice of the corresponding slice grouping requires rebuilding, wherein the encoded data slice is from a particular set of encoded data slices of the plurality of sets of encoded data slices for the given data chunkset;
  when the encoded data slice requires rebuilding, retrieving, by the DST unit, other encoded data slices of the particular set of encoded data slices;
  utilizing, by the DST unit, the other encoded data slices to rebuild the encoded data slice; and
  executing, by the DST unit, the corresponding one of the decode threshold number of partial tasks on the rebuild encoded data slice to produce the partial result.

4. The method of claim 1, wherein the slice deletion policy comprises one of:
  an indication to delete an encoded data slice when the executing of the task on a corresponding data chunk is completed;
  an indication to delete an encoded data slice when the executing of the corresponding one of the decode threshold number of partial tasks on the encoded data slice is completed and, after deletion, a decode threshold number of encoded data slices of the set of encoded data slices for the corresponding data chunk is currently stored by other DST units; and
  an indication to transfer the encoded data slice to a DST unit not included in the decode threshold number of DST units for temporary storage therein and deleting the encoded data slice.

5. The method of claim 1, wherein the task comprises:
a plurality of sub-tasks, wherein each sub-task of the plurality of sub-tasks is divided into a decode threshold number of partial sub-task.

6. The method of claim 5 further comprises:
executing, by each DST unit of the decode threshold number of DST units, a corresponding one of the decode threshold number of partial sub-tasks on the corresponding slice grouping of encoded data slices for a given data chunkset to produce an intermediate partial result;

processing, by one of the decode threshold number of DST units, the intermediate partial results of each of the DST unit of the decode threshold number of DST units to produce an intermediate result;

encoding, by the one of the decode threshold number of DST units, the intermediate result to produce a set of encoded intermediate result slices;

outputting, by the one of the decode threshold number of DST units, the set of encoded intermediate result slices to at least some of the DST units;

executing, by each DST unit of the decode threshold number of DST units, a next corresponding one of the decode threshold number of partial sub-tasks on a corresponding encoded intermediate result slice of the set of encoded intermediate result slices to produce a second intermediate partial result; and deleting, by the DST units, the set of encoded intermediate result slices in accordance with the slice deletion policy.

7. A nontransitory computer readable storage device comprises:
  a first storage section that stores operational instructions that, when executed by a computing device, causes the computing device to:
    encode data into pluralities of sets of encoded data slices, wherein a set of encoded data slices of the pluralities of sets of encoded data slices corresponds to a data chunk of a data chunkset, wherein a plurality of sets of encoded data slices of the pluralities of sets of encoded data slices corresponds to the data chunkset, and wherein a decode threshold number of encoded data slices of the set of encoded data slices are needed to recover the data chunk;
    output the pluralities of sets of encoded data slices to distributed storage and task (DST) units of the distributed computing system, wherein a number of the DST units corresponds to a number of encoded data slices in a set of encoded data slices, and wherein each of the DST units stores a slice grouping of encoded data slices of the plurality of sets of encoded data slices of the corresponding data chunkset;
    divide the task into a decode threshold number of partial tasks;
    send a slice deletion policy to the DST units;
  a second storage section that stores operational instructions that, when executed by the computing device, causes the computing device to, on a data chunkset by data chunkset basis:
    select a decode threshold number of DST units from the DST units;
    assign the decode threshold number of partial tasks to the decode threshold number of DST units;
  a third storage section that stores operational instructions that, when executed by a DST unit of the decode threshold number of DST units, causes the DST unit to, on a data chunkset by data chunkset basis:

execute a corresponding one of the decode threshold number of partial tasks on the corresponding slice grouping of encoded data slices for a given data chunkset to produce a partial result; and delete the slice grouping of the plurality of sets of encoded data slices of the given data chunkset in accordance with the slice deletion policy.

8. The computer readable storage device of claim 7 further comprises:

a fourth storage section that stores operational instructions that, when executed by the computing device, causes the computing device to:

generate a result for the given data chunkset based on the partial results.

9. The computer readable storage device of claim 7, wherein the third storage section further stores operational instructions that, when executed by the DST unit, causes the DST unit to execute the corresponding one of the decode threshold number of partial tasks bye:

determining that an encoded data slice of the corresponding slice grouping requires rebuilding, wherein the encoded data slice is from a particular set of encoded data slices of the plurality of sets of encoded data slices for the given data chunkset;

when the encoded data slice requires rebuilding, retrieve other encoded data slices of the particular set of encoded data slices;

utilize the other encoded data slices to rebuild the encoded data slice; and execute the corresponding one of the decode threshold number of partial tasks on the rebuild encoded data slice to produce the partial result.

10. The computer readable storage device of claim 7, wherein the slice deletion policy comprises one of:

an indication to delete an encoded data slice when the executing of the task on a corresponding data chunk is completed;

an indication to delete an encoded data slice when the executing of the corresponding one of the decode threshold number of partial tasks on the encoded data slice is completed and, after deletion, a decode threshold number of encoded data slices of the set of encoded data slices for the corresponding data chunk is currently stored by other DST units; and an indication to transfer the encoded data slice to a DST unit not included in the decode threshold number of DST units for temporary storage therein and deleting the encoded data slice.

11. The computer readable storage device of claim 7, wherein the task comprises:

a plurality of sub-tasks, wherein each sub-task of the plurality of sub-tasks is divided into a decode threshold number of partial sub-task.

12. The computer readable storage device of claim 11 further comprises:

the third storage section further stores operational instructions that, when executed by the DST unit, causes the DST unit to:

execute a corresponding one of the decode threshold number of partial sub-tasks on the corresponding slice grouping of encoded data slices for a given data chunkset to produce an intermediate partial result;

a fourth storage section further stores operational instructions that, when executed by a selected one of the decode threshold number of DST units, causes the selected DST unit to:

process the intermediate partial results of each of the DST unit of the decode threshold number of DST units to produce an intermediate result;

encode the intermediate result to produce a set of encoded intermediate result slices;

output the set of encoded intermediate result slices to at least some of the DST units;

the third storage section further stores operational instructions that, when executed by the DST unit, causes the DST unit to:

execute a next corresponding one of the decode threshold number of partial sub-tasks on a corresponding encoded intermediate result slice of the set of encoded intermediate result slices to produce a second intermediate partial result; and delete a corresponding encoded intermediate result slice of the set of encoded intermediate result slices in accordance with the slice deletion policy.

* * * * *